United States Patent

Nishimori et al.

[11] Patent Number: 5,561,641
[45] Date of Patent: Oct. 1, 1996

[54] UNDERWATER DETECTION SYSTEM FOR DETERMINING CARRIER FREQUENCIES OF SIGNALS ARRIVING FROM A WIDE AREA

[75] Inventors: Yasushi Nishimori, Sanda; Itsuo Fukuoka; Takashi Yoshioka, both of Kobe; Tatsuo Hayashi, Takarazuka; Masato Kawai, Nishinomiya, all of Japan

[73] Assignee: Furuno Electric, Company, Limited, Hyogo-ken, Japan

[21] Appl. No.: 256,989
[22] PCT Filed: Feb. 4, 1993
[86] PCT No.: PCT/JP93/00141
§ 371 Date: Jul. 29, 1994
§ 102(e) Date: Jul. 29, 1994
[87] PCT Pub. No.: WO93/16399
PCT Pub. Date: Aug. 19, 1993

[30] Foreign Application Priority Data

Feb. 6, 1992 [JP] Japan .................................. 4-021087

[51] Int. Cl.$^6$ .............................. G01S 15/58; G01S 15/96; G01S 7/52; G01S 7/62
[52] U.S. Cl. ................................ 367/90; 367/99; 367/110; 367/125
[58] Field of Search .................... 367/87, 90, 99, 367/101, 110, 125, 103

[56] References Cited

U.S. PATENT DOCUMENTS

| | | | |
|---|---|---|---|
| 3,581,192 | 5/1971 | Miura et al. ........................ | 324/76.31 |
| 3,711,822 | 1/1973 | Muller ................................. | 367/90 |
| 4,282,589 | 8/1981 | Evetts et al. ....................... | 367/90 |
| 4,686,659 | 8/1987 | Yamamoto .......................... | 367/87 |
| 5,031,157 | 7/1991 | Anderson et al. .................. | 367/110 |

FOREIGN PATENT DOCUMENTS

| | | |
|---|---|---|
| 57-29975 | 2/1982 | Japan . |
| 57-40664 | 3/1982 | Japan . |
| 63-7350 | 2/1988 | Japan . |
| 63-249071 | 10/1988 | Japan . |

Primary Examiner—Ian J. Lobo

[57] ABSTRACT

The present invention is directed to provide an underwater detection system which can determine frequency components contained in echoes arriving from all azimuthal directions at high speed and enhance target discriminating capabilities by presenting such frequency components.

The underwater detection system rotates a pair of ultrasonic receiving beams having a fixed phase angle difference, measures phase differences between two signals picked up by both ultrasonic receiving beams, determines carrier frequencies contained in target echoes from the phase differences, derives magnitudes and directions of moving velocities of targets from the carrier frequencies, and displays such target data in different colors. Furthermore, it provides such information as over-the-ground velocities of targets themselves upon compensating target velocity data with ship velocity data.

51 Claims, 26 Drawing Sheets

FIG. 2(c) $p_\tau(t)$

UNDERWATER DETECTION SYSTEM FOR DETERMINING CARRIER FREQUENCIES OF SIGNALS ARRIVING FROM A WIDE AREA

FIELD OF THE INVENTION

This invention relates to an underwater detection system which can determine carrier frequencies (including angular frequencies) of ultrasonic signals arriving from a wide area of search and, more particularly, to an underwater detection system capable of presenting detected targets in different colors depending on their moving velocities in accordance with the measured carrier frequencies, for example.

BACKGROUND ART

Conventional sonars which present detected echoes in accordance with echo level information have such drawbacks as:

1. Information on relative echo intensities would be lost due to signal saturation phenomenon;
2. Low-level signals would be masked, or hidden, by high-level signals and become impossible to distinguish; and
3. Nothing could be distinguished from echo signals having the same intensity level.

Various improvements have so far been made to overcome these problems, including the use of a sonar receiver having a wide dynamic range, provision of an automatic gain control (AGC) and development of new signal processing techniques. Despite such efforts, if there is no level difference in received signals as stated in point 3 above, it is by no means possible to discriminate between them by using signal level information alone.

Should there exist a school of swimming fish, ultrasonic echoes returned from the fish school are shifted in frequency due to the so-called Doppler effect. If this shift in frequency (or in phase), known as the Doppler shift, can be detected without jeopardizing the sonar's ability to provide high-speed scanning (or real-time processing) and a wide searching area as well as its bearing and range resolutions, it would be possible to discriminate true targets among ultrasonic echoes from fixed targets such as the sea bottom. It would also be possible to recognize differences in moving velocities of fish schools, resulting in a significant improvement in target discriminating capabilities. For this reason, certain types of conventional sonars provide the ability to determine amounts of Doppler shifts (refer to Japanese Patent Publication No. 57-29975, for example).

Those conventional systems, however, have just been able to measure amounts of Doppler shifts of ultrasonic echoes arriving from only one particular direction and not provide high-speed measurement capabilities for Doppler shifts of ultrasonic echoes arriving from all directions. This is the reason why there has not been available yet a sonar capable of presenting moving velocities of underwater targets based on frequency information. It has long been desired therefore to develop a system that can provide real-time measurements of moving velocities of multiple fish schools throughout a wide searching area.

SUMMARY OF THE INVENTION

This invention is directed to solve the aforementioned problems of the conventional systems. Accordingly, it is an object of the invention to provide an underwater detection system which can derive frequency information from received echoes at high speed and present the frequency information in a manner which would enhance target discriminating capabilities.

An underwater detection system according to the present invention may include a carrier frequency measuring circuit including ultrasonic receiving means for receiving ultrasonic signals arriving from a wide searching area while rotating a first ultrasonic receiving beam accompanied by a second ultrasonic receiving beam, wherein the second ultrasonic receiving beam is delayed by a fixed angular displacement θ relative to the first ultrasonic receiving beam; detector means for detecting individual signals picked up by the two ultrasonic receiving beams produced by the ultrasonic receiving means; delay means for delaying the signal picked up by the first ultrasonic receiving beam, which precedes the second ultrasonic receiving beam by a time period τ due to the angular displacement θ, by the same time period τ at an output stage of the ultrasonic receiving means or the detector means; phase difference calculating means for determining the phase difference between the two signals detected by the detector means; and calculating means for calculating carrier frequency f of the received ultrasonic signals from the phase difference determined by the phase difference calculating means in accordance with the equation $f=\Delta\psi/(2\pi\tau)$; a frequency/color conversion circuit for reading out specific color data depending on individual values of measured carrier frequencies f; and a display unit for presenting the color data.

According to one embodiment of the underwater detection system of the present invention, the carrier frequency measuring circuit causes the first ultrasonic receiving beam to scan through the wide searching area followed by the second ultrasonic receiving beam with the fixed angular displacement θ. The signal picked up by the first ultrasonic receiving beam which precedes the second ultrasonic receiving beam by the time period τ corresponding to the angular displacement θ is delayed by the same time period τ to eliminate the time lag between the signals received by the two ultrasonic receiving beams. Then, the phase difference calculating means determines the phase difference Δψ between both signals, and the carrier frequency f of the received ultrasonic signals is calculated from the phase difference Δψ in accordance with the equation $f=\Delta\psi/(2\pi\tau)$. Operating principles of the carrier frequency measuring circuit and circuit examples thereof will be described later in this specification.

The carrier frequency f thus obtained includes a Doppler frequency attributed to the relative velocity between the target, or the source of the ultrasonic signals, and own ship. With this arrangement, it would be possible to obtain information on the target velocity relative to own ship from the value of the carrier frequency f. Color data corresponding to the carrier frequency f is read out from the frequency/color conversion circuit and presented on the display unit in the form of a target velocity picture.

The underwater detection system of the present invention may further include, in addition to the carrier frequency measuring circuit, a variance calculating circuit for deriving variance data indicating the degree of variations in carrier frequency f fed from the carrier frequency measuring circuit; a variance/color conversion circuit for reading out specific color data depending on individual values of variance data; and a display unit for presenting the color data.

According to the above underwater detection system, variance data representative of the degree of frequency (velocity) variations is determined from individual carrier frequencies obtained by the carrier frequency measuring circuit and presented on the display unit in the form of a variance data picture which is useful for discriminating fish species.

An underwater detection system of the present invention is the variance calculating circuit a frequency-variance/color conversion circuit for reading out specific color data depending on individual values of measured carrier frequencies f and variance data.

According to such an underwater detection system, data on one specific color is read out from the frequency-variance/color conversion circuit depending on the values of each measured carrier frequency f and variance data and presented on the display unit. With this arrangement, it is possible to know target velocity levels (derived from carrier frequencies) and variations in target velocities (derived from variance data).

An underwater detection system according to the present invention may further include, in addition to the carrier frequency measuring circuit, a filter-amplitude/color conversion circuit for selecting from amplitude data derived from the signals detected by the detector means only such amplitude data that lie within a desired frequency range and then reading out specific color data depending on individual values of the selected amplitude data; and a display unit for presenting the color data.

According to such an underwater detection system 4, a filtering function of the filter-amplitude/color conversion circuit makes it possible to color-convert only such amplitude data that lie within a desired frequency range. This frequency range may be selected with reference to the carrier frequency f, for example, so that only such amplitude data a found only within the frequency range are color-converted to reject interference from signals of other frequency bands. Alternatively, by allowing color conversion of only such signals exceeding a specified frequency (velocity), it becomes possible to discriminate between moving objects and stationary objects, by which images of the sea bottom or surface, for example, can be eliminated on the display unit.

In executing the conversion into color data, the color conversion circuits of the aforementioned underwater detection systems may utilize amplitude information included in input data as a reference and convert only such input data that exceed a specified amplitude level. With this arrangement, it is possible to eliminate low-level signals caused by unwanted noise, for example, from on-screen presentation.

An underwater detection system according to the present invention may further include storage means for storing individual carrier frequencies f fed from the carrier frequency measuring circuit; a designating unit for specifying a desired area on the display unit; data readout means for reading out data on carrier frequencies f from such memory locations of the storage means that correspond to the area specified by the designating unit; a frequency histogram generator for generating a histogram upon determining the distribution of carrier frequencies f based on the data read out by the data readout means; and display means for presenting the histogram.

According to such an underwater detection system, a desired area is specified on an amplitude level picture (which shows color-coded amplitude information) or on the aforementioned target velocity picture presented on the display unit and the frequency distribution is determined from the carrier frequencies f read out from the specified area. With this arrangement, the histogram representing the frequency distribution can be displayed in a specified location on the display unit.

According to the present invention, it is possible to simultaneously display more than one pictures such as the aforementioned target velocity picture and variance data picture on one display unit, one picture on the upper half and the other picture on the lower half of the screen, for example. This arrangement allows for a direct comparison between two different pictures, which would serve to further enhance target discriminating capabilities.

An underwater detection system according to the present invention may include, in addition to the carrier frequency measuring circuit, an over-the-ground ship velocity compensation circuit for calculating carrier frequency fe representative of the over-the-ground velocity of a target itself by subtracting frequency f1 attributed to the over-the-ground ship velocity from each carrier frequency f fed from the carrier frequency measuring circuit.

According to such an underwater detection system, it is possible to determine the carrier frequency fe representative of the over-the-ground velocity of the target itself by subtracting (Doppler) frequency f1 attributed to the over-the-ground ship velocity from the carrier frequency f fed from the carrier frequency measuring circuit.

An underwater detection system according to the present invention may include, in addition to the carrier frequency measuring circuit, a through-the-water ship velocity compensation circuit for calculating carrier frequency fw representative of the through-the-water velocity of a target itself by subtracting frequency f2 attributed to the through-the-water ship velocity from each carrier frequency f fed from the carrier frequency measuring circuit.

According to such an underwater detection system, it is possible to determine the carrier frequency fw representative of the through-the-water velocity of the target itself by subtracting (Doppler) frequency f2 attributed to the through-the-water ship velocity from the carrier frequency f fed from the carrier frequency measuring circuit.

In one feature of the present invention, it is possible to determine the frequency f1 attributed to the over-the-ground ship velocity by breaking down a Doppler frequency corresponding to the over-the-ground ship velocity acquired from such external equipment as a navigational aid into each individual azimuthal component.

In another feature of the present invention, it is possible to determine the frequency f2 attributed to the through-the-water ship velocity by breaking down a Doppler frequency corresponding to the through-the-water ship velocity acquired from such external equipment as a water current measuring apparatus into each individual azimuthal component.

In another feature of the present invention, the frequency f1 attributed to the over-the-ground ship velocity is determined for each horizontal direction by once storing individual carrier frequencies f fed from the carrier frequency measuring circuit into a frame memory, specifying a desired readout area of the frame memory, and sequentially reading out carrier frequencies f from the specified readout area in a predefined order of memory addresses.

In another feature of the present invention, the frequency f1 attributed to the over-the-ground ship velocity is determined by reading out carrier frequencies f for individual horizontal directions by the method set forth above, estimating a cosine curve from the read data with the bearing taken on the horizontal axis, and reading out again carrier frequencies f for individual horizontal directions with reference to the estimated cosine curve.

In a further feature of the present invention, whole carrier frequencies f derived from one transmission cycle can be stored in the frame memory and simultaneously compensated with the frequency f attributed to the over-the-ground ship velocity.

In a still further feature of the present invention, individual carrier frequencies f sequentially fed from the carrier frequency measuring circuit can be compensated on a real-time basis with the frequency f1 attributed to the over-the-ground ship velocity.

In another feature of the present invention, the frequency f2 attributed to the through-the-water ship velocity is determined for each horizontal direction by once storing individual carrier frequencies f fed from the carrier frequency measuring circuit into a frame memory, specifying a desired readout area of the frame memory, and sequentially reading out carrier frequencies f from the specified readout area in a predefined order of memory addresses in a similar readout method to that set forth above.

In another feature of the present invention, the frequency f2 attributed to the through-the-water ship velocity is determined by estimating a cosine curve from the data read out for individual horizontal directions with the bearing taken on the horizontal axis, and reading out again carrier frequencies f for individual horizontal directions with reference to the estimated cosine curve in a similar readout method to that including estimating of a cosine curve set forth above.

In a further feature of the present invention, whole carrier frequencies f derived from one transmission cycle can be stored in the frame memory and simultaneously compensated with the frequency f2 attributed to the through-the-water ship velocity in a similar way to that set forth above.

In a still further feature of the present invention, individual carrier frequencies f sequentially fed from the carrier frequency measuring circuit can be compensated on a real-time basis with the frequency f2 attributed to the through-the-water ship velocity in a similar way to that set forth above.

An underwater detection system according to the present invention, may further include a frequency/color conversion circuit for reading out specific color data depending on the value of each carrier frequency fe representative of the over-the-ground velocity of the target itself or each carrier frequency fw representative of the through-the-water velocity of the target itself; and a display unit for presenting the color data.

According to an aspect of the underwater detection system of the present invention, each carrier frequency fe representative of the over-the-ground velocity of the target itself or each carrier frequency fw representative of the through-the-water velocity of the target itself would be shown in a color corresponding to the frequency value in the form of a target velocity picture.

An underwater detection system according to the present invention, may further include a frequency/color conversion circuit for reading out specific color data depending on the value of each compensated carrier frequency fe representative of the over-the-ground velocity of the target or each compensated carrier frequency fw representative of the through-the-water velocity of the target and also depending on whether the Doppler frequency shift is positive or negative; and a display unit for presenting the color data.

According to such an underwater detection system, data on one specific color is read out and displayed on a target velocity picture depending on the value of each compensated carrier frequency fe representative of the over-the-ground velocity of the target or each compensated carrier frequency fw representative of the through-the-water velocity of the target and also depending on whether such carrier frequency fe or fw, whichever applicable, is higher or lower than the transmitted frequency. With this arrangement, it is possible to know over-the-ground or through-the-water target velocity levels and target moving directions from the target velocity picture.

In another feature of the present invention, the color data for a plurality of colors may classified into cool and warm color groups, for example, depending on whether each carrier frequency fe or fw, whichever applicable, is higher or lower than the transmitted frequency, with specific colors assigned in accordance with individual values of carrier frequencies fe or fw in both the cool and warm color groups. With this arrangement, it is possible to know target velocity levels and moving directions from each individual display color.

An underwater detection system according to the present invention, may further include variance calculating means for deriving variance data indicating the degree of variations in compensated carrier frequency fe representative of the over-the-ground velocity of each target or compensated carrier frequency fw representative of the through-the-water velocity of each target.

An underwater detection system of the invention, may further include a variance/color conversion circuit for reading out specific color data depending on individual values of variance data; and a display unit for presenting the color data.

According to such an underwater detection system, a variance data picture can be presented to indicate the variance in carrier frequency fe representative of the over-the-ground velocity of the target itself or compensated carrier frequency fw representative of the through-the-water velocity of each the target itself.

An underwater detection system according to the present invention, may further include a frequency-variance/color conversion circuit for reading out specific color data depending on individual values of compensated carrier frequencies fe or fw and variance data.

According to such a underwater detection system, specific color data corresponding to individual values of compensated carrier frequencies fe or fw and variance data are read out. With this arrangement, it is possible to know the over-the-ground or through-the-water velocity levels of targets themselves as well as their moving directions.

An underwater detection system according to the present invention, may further include a filter-amplitude/color conversion circuit for selecting from amplitude data derived from the signals detected by the detector means only such amplitude data that lie within a desired frequency range and then reading out specific color data depending on individual values of the selected amplitude data; and a display unit for presenting the color data.

According to such an underwater detection system, it becomes possible to reject interference from signals of other frequency bands and to discriminate between moving objects and stationary objects.

In executing the conversion into color data, the color conversion circuits of the aforementioned underwater detection systems may utilize amplitude information included in input data as a reference and convert only such input data that exceed a specified amplitude level. With this arrangement, it is possible to eliminate low-level signals caused by unwanted noise, for example, from on-screen presentation.

An underwater detection system according to the present invention, may further include storage means for storing compensated carrier frequencies fe representative of over-the-ground target velocities or compensated carrier frequencies fw representative of through-the-water target velocities; a designating unit for specifying a desired area on the display unit; data readout means for reading out carrier frequency data from such memory locations of the storage means that correspond to the area specified by the designating unit; a frequency histogram generator for generating a histogram upon determining the distribution of carrier frequencies based on the data read out by the data readout means; and display means for presenting the histogram.

According to such an underwater detection system, a desired area is specified on a ship-velocity-compensated amplitude level picture (which shows color-coded amplitude information) or target velocity picture presented on the display unit and the frequency distribution is determined from the carrier frequencies f read out from the specified area. With this arrangement, the histogram representing the frequency distribution can be displayed in a specified location on the display unit.

According to an underwater detection system of the present invention, it is possible to simultaneously display more than one pictures such as the aforementioned ship-velocity-compensated target velocity picture and variance data picture on one display unit, one picture on the upper half and the other picture on the lower half of the screen, for example. This arrangement allows for a direct comparison between two different pictures, which would serve to further enhance target discriminating capabilities.

According to the present invention, any of the color conversion circuits described above may be configured with a read-only memory (ROM) storing color data corresponding to individual values of input data.

According to the present invention, the ultrasonic receiving means of the underwater detection system described above may be configured with a pair of ultrasonic transducer elements which are rotated mechanically.

According to the present invention, the ultrasonic receiving means of the underwater detection system described above may include a plurality of ultrasonic transducer elements arranged in a circular array, selects a predefined number of adjacent transducer elements while shifting the selection in sequential steps by electrical switching, produces the first ultrasonic receiving beam by synthesizing the phases of signals received by each selection of transducer elements, and further produces the second ultrasonic receiving beam separated by the angular displacement θ from the first ultrasonic receiving beam in a similar manner.

According to the present invention, the ultrasonic receiving means of the underwater detection systems described above may include a plurality of ultrasonic transducer elements arranged in a linear array, selects a predefined number of adjacent transducer elements while shifting the selection in sequential steps by electrical switching, produces the first ultrasonic receiving beam by synthesizing the phases of signals received by each selection of transducer elements, and further produces the second ultrasonic receiving beam separated by the angular displacement θ from the first ultrasonic receiving beam in a similar manner.

According to the present invention, any of the carrier frequency measuring circuits described may include scanning means for steering the first and second ultrasonic receiving beams switchably from full-circle scanning to sector scanning operation. With this switching function, it is possible to provide a higher sampling rate and consequent resolution enhancement.

Alternatively, according to the present invention; any of the carrier frequency measuring circuits described above may further include second delay means which regards the first and second ultrasonic receiving beams as having a mutual angular displacement of $2\pi-\theta$ and introduces a time delay τ2 corresponding to the angular displacement $2\pi-\theta$ into the signal received by one ultrasonic receiving beam which precedes the other ultrasonic receiving beam by τ2; second phase difference calculating means for determining the phase difference Δψ' between the signal outputted from the second delay means and the signal received by the other ultrasonic receiving beam; and frequency calculating means for calculating carrier frequency $f2=\Delta\psi'/(2\pi\tau2)$ from the phase difference ΔΩ' and outputting a true carrier frequency at which the carrier frequency f and the carrier frequency f2 coincide with each other.

When the phase difference Δψ determined by the carrier frequency measuring circuit exceeds 2π, there arises the folding (or zero resetting) phenomenon in angular frequency. As a result, a plurality of carrier frequencies, f1 to f4 for example, will be found within the system frequency bandwidth, making it impossible to find out a unique carrier frequency. If the value of phase difference is lessened to avoid zero resetting of the angular frequency, it would be possible to determine a unique carrier frequency f2', for example, but its accuracy would not be good enough. Nevertheless, it is possible to determine one accurate carrier frequency f2 among the four carrier frequencies f1 to f4 by comparison with the carrier frequency f2'.

Accordingly, in such an arrangement, there may be established two different phase differences θ and $2\pi-\theta$ with the two ultrasonic receiving beams and the carrier frequency is determined from these two phase differences.

Further according to such an arrangement, there may be established two different phase differences θ and $2\pi+\theta$ with the two ultrasonic receiving beams. Also, according to such an arrangement, there may be established two different phase differences θ and 2π with the two ultrasonic receiving beams.

BRIEF DESCRIPTION OF THE DRAWINGS

FIGS. 2a, 2b and 2c are timing chart showing operation of two ultrasonic receiving beams formed by the arrangement of FIG. 1;

DESCRIPTION OF THE EMBODIMENTS

An underwater detection system according to the invention comprises a carrier frequency measuring circuit 50 for measuring the carrier frequency and a signal processing circuit 100 connected to the carrier frequency measuring circuit 50. A first principle upon which carrier frequency measurement is based will be explained at first, referring to FIG. 1.

Figure 1:
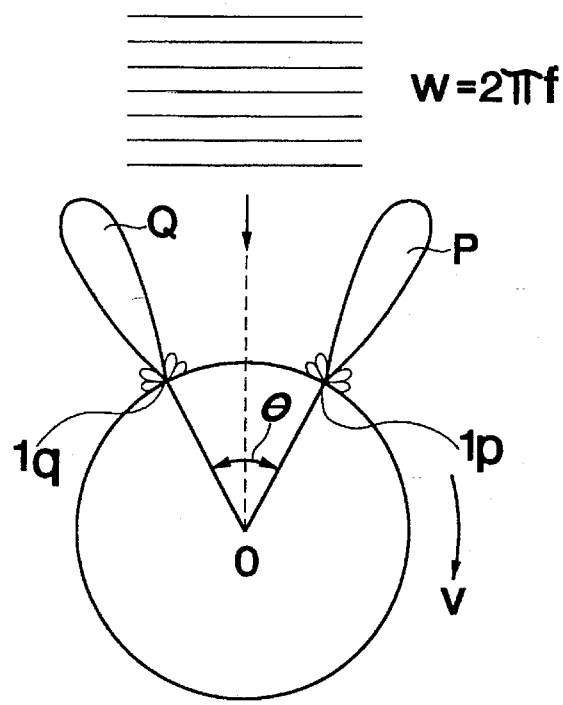
FIG. 1 is a diagram showing a first principle adopted in carrier frequency measuring circuits according to the present invention.

In FIG. 1, there are shown two ultrasonic receiving beams P and Q formed respectively by ultrasonic transducer elements 1p and 1q. Accordingly, the two ultrasonic receiving beams P and Q scan through surrounding water at the same speed around the center of rotation O, maintaining a constant angular separation of θ in the horizontal plane. As a result, the ultrasonic receiving beams P and Q would individually receive ultrasonic echo signals arriving from one direction (y-direction in this example) with a constant time difference τ as can be seen in FIGS. 2(a) and 2(b). It is to be noted here that the rotary motion of the ultrasonic transducer elements 1p and 1q that produce the ultrasonic receiving beams P and Q causes the Doppler effect on the ultrasonic signals arriving from targets.

An ultrasonic signal p(t) picked up by the ultrasonic receiving beam P which precedes the ultrasonic receiving beam Q by time τ in angular position is given by the following equation:

$$p(t)=S(t)\cdot\cos\{\omega t+\alpha+m(t)+\beta\} \quad (1)$$

where S(t) represents the amplitude of the ultrasonic signal determined by directional characteristics of the ultrasonic receiving beam P and the speed of beam scanning in the horizontal plane while $\cos\{\omega t+\alpha+m(t)+\beta\}$ accounts for the phase of the ultrasonic signal, $\omega$ being the angular carrier frequency of the ultrasonic signal arriving from a target, $\alpha$ being the initial phase of the arriving ultrasonic signal, $\beta$ being a displacement of signal phase that occurs in a receiver system, and m(t) denoting a phase shift caused by the Doppler effect as the ultrasonic receiving beam P receives the ultrasonic signal while rotating. It would therefore be understood that m(t)=0 when the ultrasonic receiving beams P and Q are not rotating or when the receiving beam (P in this case) is moving in the x-direction which is perpendicular to the y-direction. In equation (1) above, ωt+α gives the phase of the incident ultrasonic signal while m(t)+β denotes a phase shift caused by the scanning of the ultrasonic receiving beam P.

Regarding an input signal q(t) picked up by the ultrasonic receiving beam Q, the phase of the incident ultrasonic signal is ωt+α which is same as in the case of the ultrasonic signal picked up by the ultrasonic receiving beam P. However, the change in phase that occurs due to the rotational scanning of the ultrasonic receiving beam Q is m(t−τ)+β. Thus, the input signal q(t) of the ultrasonic receiving beam Q is expressed by the following equation:

$$q(t) = S(t-\tau) \cdot \cos\{\omega t + \alpha + m(t-\tau) + \beta\} \quad (2)$$

To eliminate the effect of time difference τ caused by the scanning of the two ultrasonic receiving beams P and Q, a corresponding time delay τ is introduced into the signal p(t) of equation (1), as shown in FIG. 2(c). A resultant signal pτ(t) is then rewritten as $$\begin{aligned} p\tau(t) &= S(t-\tau) \cdot \cos\{\omega(t-\tau) + \alpha + m(t-\tau) + \beta\} \\ &= S(t-\tau) \cdot \cos\{\omega t + \alpha + m(t-\tau) + \beta - \omega\tau\} \end{aligned} \quad (3)$$

As is apparent from a comparison between equations (2) and (3), the phase difference Δψ between the received echo signals q(t) and pτ(t) becomes Δψ=ωτ=2πfτ. Thus, carrier frequency f of the received echo is $$f = \Delta\psi/(2\pi\tau) \quad (4)$$

From equation (4) above, it would be recognized that the phase difference Δψ is directly related to the carrier frequency f of the ultrasonic signal arriving from a target.

It would also be recognized that since the time difference τ has a known value, the carrier frequency f of the received ultrasonic signals can be determined from equation (4) if the phase difference Δψ between the two signals q(t) and pτ(t) is obtained.

Since the phase difference Δψ is measurable only within a maximum range of 2π, the carrier frequency f is calculated from the following equation if the value ωτ lies outside the range [−π, π]:

$$\omega = g\{\Delta\psi - g(\omega t x \cdot \tau)\}/\tau + \omega t x$$

where g is a function for converting angles beyond the limits of [−π, π] into this range [−π, π], and the term ωtx gives the angular frequency of a transmitted ultrasonic signal.

Now, examples of the carrier frequency measuring circuit 50 according to the aforementioned first principle will be described in the following.

CIRCUIT EXAMPLE 1

Figure 3:
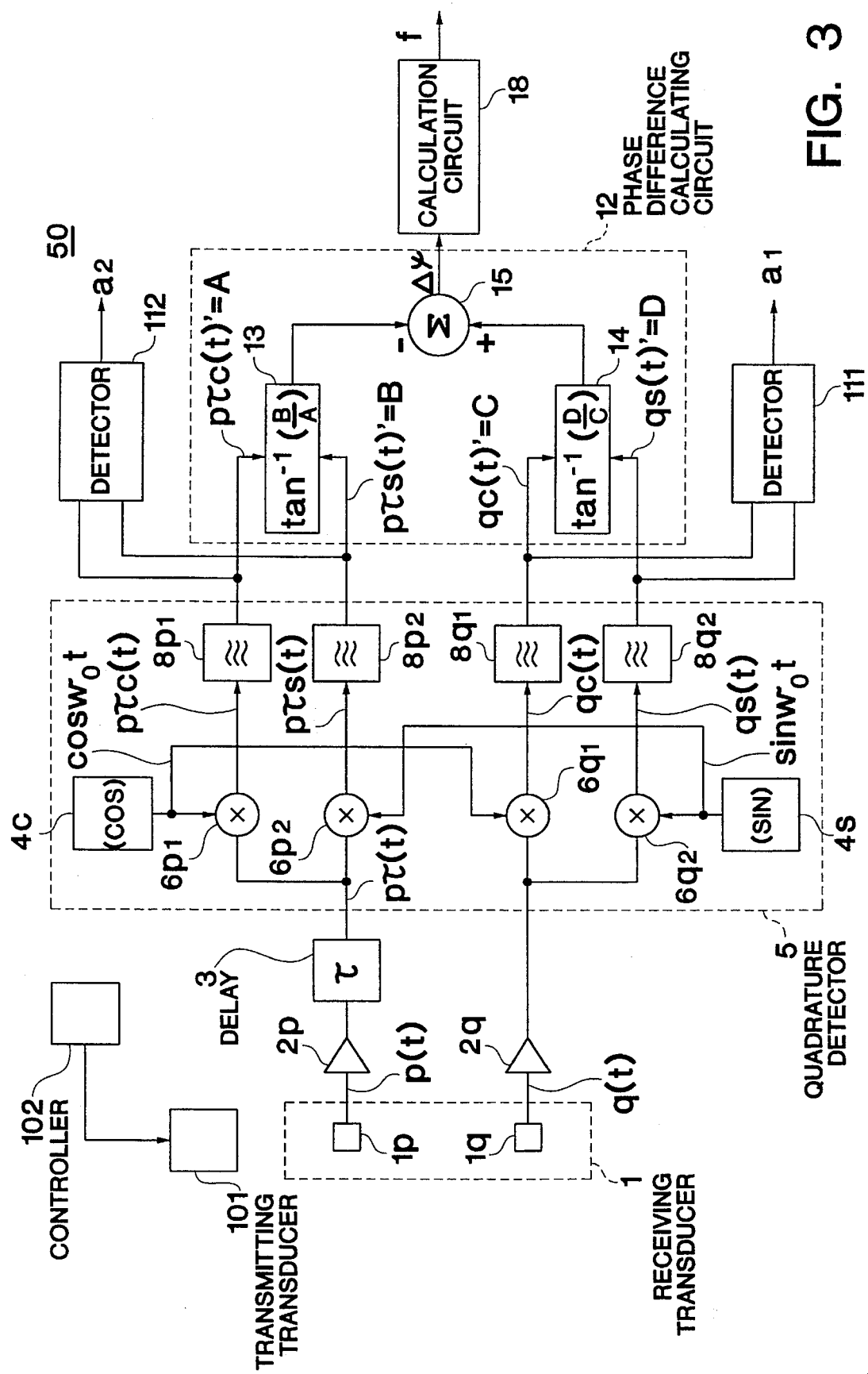
FIG. 3 is a block diagram of a carrier frequency measuring circuit based on the first principle utilizing a pair of rotating ultrasonic transducer elements.

Referring to FIG. 3, a transmitting transducer 101 emits an ultrasonic pulse signal in wide searching directions in response to a timing signal fed from a controller 102. A receiving transducer 1 contains a pair of ultrasonic transducer elements 1p and 1q and, as already discussed in connection with FIG. 1, these two transducer elements 1p and 1q, constantly maintaining a predefined relative angular displacement of θ from each other, are mechanically rotated in a horizontal plane at a fixed speed around a reference point. This causes the receiving beams P and Q formed respectively by the transducer elements 1p and 1q to scan underwater in a horizontal plane. The effect of this dual-beam scanning is that an ultrasonic echo arriving from one direction is received by the individual transducer elements 1p and 1q and resultant signals p(t) and q(t) are outputted with a certain time interval. More specifically, signal q(t) obtained by the transducer element 1q is outputted with a time lag of τ compared to signal p(t) obtained by the transducer element 1p.

Indicated by the reference numerals 2p and 2q are preamplifiers for amplifying echo signals received by the ultrasonic transducer elements 1p and 1q, respectively; a delay circuit 3 introduces the aforementioned time delay τ in the signal received by the transducer element 1p in order to eliminate the time lag between the two input signals due to the angular separation between the transducer elements 1p and 1q; and a quadrature detector 5 separately detects quadrature components of the individual signals p(t) and q(t) obtained by the scanning of the receiving beams P and Q formed respectively by the transducer elements 1p and 1q. The quadrature detector 5 incorporates a pair of reference signal generators 4c and 4s for producing reference signals with a mutual phase difference of 90°, four multipliers 6p1, 6p2, 6q1 and 6q2 for multiplying the received signals by the reference signals fed from the two reference signal generators 4c and 4s, and four low-pass filters 8p1, 8p2, 8q1 and 8q2 for eliminating harmonic components contained in detected signals which are outputted by the individual multipliers 6p1, 6p2, 6q1 and 6q2.

The received echo signals fed into the quadrature detector 5 have a mutual phase difference caused by the Doppler effect on ultrasonic echoes from targets. A phase difference calculating circuit 12 calculates this phase difference from detected signals pτc(t)', pτs(t)', qc(t)' and qs(t)' obtained by quadrature detection. More specifically, a processor 13 determines the phase angle of the received signal p(t) by calculating $\tan^{-1}\{p\tau s(t)'/p\tau c(t)'\}$ while a processor 14 determines the phase angle of the received signal q(t) by calculating $\tan^{-1}\{qs(t)'/qc(t)'\}$. Then, a subtracter 15 calculates the phase difference Δψ between the two received signals. As will be discussed later, a calculating circuit 18 which calculated the carrier frequency based on the phase difference between the two received signals detected by the phase difference calculating circuit 12.

Now, operation of the circuit of FIG. 3 will be explained in further detail.

The transmitting transducer 101 emits an ultrasonic pulse signal and the two ultrasonic transducer elements 1p and 1q that constitute the receiving transducer 1 are rotated in a horizontal plane at a fixed speed while maintaining the predefined separation angle θ as depicted in FIG. 1. When an ultrasonic echo signal arrives from one particular direction, it is received by the individual ultrasonic transducer elements 1p and 1q that from respective ultrasonic receiving beams. Here, the resultant echo signals p(t) and q(t) are given by equations (1) and (2). These signals p(t) and q(t) are amplified by the preamplifiers 2p and 2q. Of these two signals, the received signal p(t) is retarded by the delay circuit 3 by the aforementioned time difference τ and the resultant signal pτ(t) is given by equation (3). The received signals pτ(t) and q(t) are then inputted to the multipliers 6p1−6p2 and 6q1−6q2 of the quadrature detector 5, respectively.

On the other hand, the reference signal generators 4c and 4s of the quadrature detector 5 output reference signals cosω₀t and sinω₀t, respectively, both having the same center frequency with the transmitted ultrasonic frequency but with a mutual phase difference of 90°. One of these reference signals, cos $\omega_0 t$, is sent to the multipliers 6p1 and 6q1 while the other reference signal, sin$\omega_0 t$, is sent to the multipliers 6p2 and 6q2. Consequently, the four multipliers 6p1, 6p2, 6q1 and 6q2 output signals given by equations (5) through (8) below, respectively:

$$p\tau c(t) = p\tau(t) \cdot \cos\omega_0 t \tag{5}$$
$$= \{S(t-\tau)/2\} [\cos\{\omega(t-\tau) + \alpha + m(t-\tau) + \beta + \omega_0 t\} + \cos\{\omega(t-\tau) + \alpha + m(t-\tau) + \beta - \omega_0 t\}]$$

$$p\tau s(t) = p\tau(t) \cdot \sin\omega_0 t \tag{6}$$
$$= \{S(t-\tau)/2\} [\sin\{\omega(t-\tau) + \alpha + m(t-\tau) + \beta + \omega_0 t\} - \sin\{\omega(t-\tau) + \alpha + m(t-\tau) + \beta - \omega_0 t\}]$$

$$qc(t) = q(t) \cdot \cos\omega_0 t \tag{7}$$
$$= \{S(t-\tau)/2\} [\cos\{\omega t + \alpha + m(t-\tau) + \beta + \omega_0 t\} + \cos\{\omega t + \alpha + m(t-\tau) + \beta - \omega_0 t\}]$$

$$qs(t) = q\tau(t) \cdot \sin\omega_0 t \tag{8}$$
$$= \{S(t-\tau)/2\} [\sin\{\omega t + \alpha + m(t-\tau) + \beta + \omega_0 t\} - \sin\{\omega t + \alpha + m(t-\tau) + \beta - \omega_0 t\}]$$

As harmonic components are filtered out from the above signals by the low-pass filters 8p1, 8p2, 8q1 and 8q2 in the succeeding stage, the quadrature detector 5 outputs the following signals:

$$p\tau c(t)' = \{S(t-\tau)/2\} \cdot \cos\{(\omega-\omega_0)t + \alpha + m(t-\tau) + \beta - \omega\tau\} \tag{9}$$

$$p\tau s(t)' = \{S(t-\tau)/2\} \cdot \sin\{(\omega-\omega_0)t + \alpha + m(t-\tau) + \beta - \omega\tau\} \tag{10}$$

$$qc(t)' = \{S(t-\tau)/2\} \cdot \cos\{(\omega-\omega_0)t + \alpha + m(t-\tau) + \beta\} \tag{11}$$

$$qs(t)' = \{S(t-\tau)/2\} \cdot \sin\{(\omega-\omega_0)t + \alpha + m(t-\tau) + \beta\} \tag{12}$$

The individual signals p$\tau$c(t)', p$\tau$s(t)', qc(t)' and qs(t)' obtained by quadrature detection are then delivered to the phase difference calculating circuit 12.

In the phase difference calculating circuit 12, the phase angle of one received signal p(t) is obtained through the arithmetic operation $\tan^{-1}\{p\tau s(t)'/p\tau c(t)'\}$ performed by the processor 13 while the phase angle of the other received signal q(t) is obtained through the arithmetic operation $\tan^{-1}\{qs(t)'/qc(t)'\}$ performed by the processor 14. Then, the subtractor 15 performs subtraction operation to obtain the phase difference $\Delta\psi$ between the two received signals.

As the value of the phase difference, $\Delta\psi$, is sent to the calculating circuit 18, it calculates the carrier frequency f using equation (4) mentioned earlier. On the other hand, the output signals qc(t)'=C and qs(t)'=D of the quadrature detector 5 are sent to a detector 111 to calculate amplitude a1 by the operation (C2+D2)½. Also, the output signals p$\tau$c(t)' and p$\tau$s(t)' of the quadrature detector 5 are sent to a detector 112 to calculate amplitude a2 in a similar manner.

CIRCUIT EXAMPLE 2

In the description of individual circuit examples to follow hereunder, circuit elements performing the same functions as shown in FIG. 3 will be designated by the same reference numerals.

Figure 4:
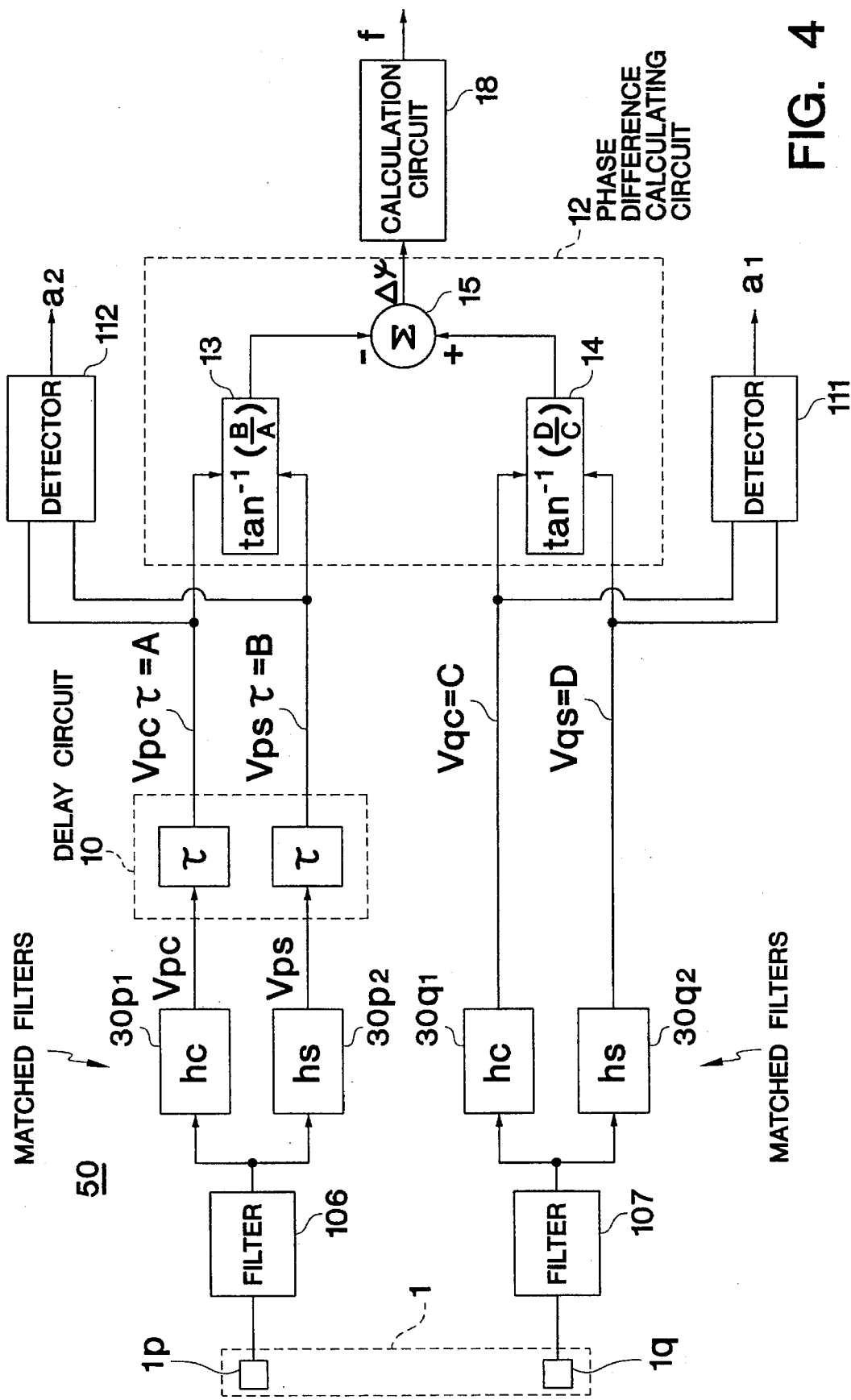
FIG. 4 is a block diagram of a carrier frequency measuring circuit employing matched filters instead of a quadrature detector of FIG. 3.

FIG. 4 is a circuit example employing matched filters instead of the quadrature detector 5 of FIG. 3. A pair of ultrasonic transducer elements 1p and 1q are mechanically rotated at a constant speed around a reference point along the same trajectory in one direction while maintaining a constant time lag $\tau$ in phase angle. Signals p(t) and q(t) picked up by the ultrasonic transducer elements 1p and 1q are sent to a pair of matched filters 30p1 and 30p2 and another pair of matched filters 30q1 and 30q2 via antialiasing filters 106 and 107, respectively. The individual matched filters 30p1, 30p2, 30q1 and 30q2 are configured by finite impulse response (FIR) type digital filters.

As already described, since the ultrasonic receiving beams P and Q formed respectively by the two ultrasonic transducer elements 1p and 1q scan underwater, ultrasonic signals arriving from targets are shifted in frequency due to the Doppler effect. Consequently, signals p(t) and q(t) obtained by the ultrasonic receiving beams P and Q become as expressed by equations (1) and (2). These received signals are linear frequency-modulated (FM) signals of which frequencies vary with the lapse of time. Accordingly, receiving beams are created by way of phase synthesis, or phased array technique, using matched filters (refer to Japanese Patent Publications No. 57-40664 and No. 63-249071) which have reversed time characteristics (impulse responses) with respect to the received signals p(t) and q(t). In other words, the time-sequentially obtained received signals p(t) and q(t) having a mutual phase difference are individually multiplied by certain carrier signals to cause phase shifts in such a manner that the received signals p(t) and q(t) are aligned in phase. Then, the received signals are added together.

More specifically, there are provided four matched filters 30p1, 30p2, 30q1 and 30q2, which are set so that impulse response hc(t) of the matched filters 30p1 and 30q1 becomes $$hc(t) = \cos\{\omega a(-t) - m(-t)\} \tag{13}$$

and impulse response hs(t) of the matched filters 30p2 and 30q2 becomes $$hs(t) = \sin\{\omega a(-t) - m(-t)\} \tag{14}$$

where $\omega a$ is the known angular carrier frequency of an ultrasonic signal produced by a detected target or the angular carrier frequency of a searching pulse signal emitted by the transmitting transducer 101.

With the individual impulse responses set as described above, the received signals that have passed through the individual matched filters 30p1, 30p2, 30q1 and 30q2 become as follows if the value $\omega a$ is close to the detected angular frequency $\omega$:

$$Vpc(t) = \{S'(t)/2\} \cdot \cos\{\omega t + \alpha + m(t) + \beta\} \tag{15}$$

$$Vps(t) = \{S'(t)/2\} \cdot \sin\{\omega t + \alpha + m(t) + \beta\} \tag{16}$$

$$Vqc(t) = \{S'(t-\tau)/2\} \cdot \cos\{\omega t + \alpha + m(t-\tau) + \beta\} \tag{17}$$

$$Vqs(t) = \{S'(t-\tau)/2\} \cdot \sin\{\omega t + \alpha + m(t-\tau) + \beta\} \tag{18}$$

where

S'(t)=(AT/2)·sinc($\mu$0·T$t$/2)

sinc(x)=sinx/x m(t)=−(½)·$\mu$0$t^2$ $\beta$=k0r $\mu$0=k0r·$\omega s^2$

A(t)=amplitude of received signal

T=time duration for which impulse response characteristic is defined r=radius of scanning of ultrasonic receiving beams ωs=angular velocity of scanning of ultrasonic receiving beams
k0=constant
α=initial phase of arriving ultrasonic signal Since the signals Vpc(t) and Vps(t) are delayed by a predefined time period τ, these signals become as follows:

$$Vp \cdot \tau c(t) = \{S'(t-\tau)/2\} \cdot \cos\{\omega t + \alpha + m(t-\tau) + \beta - \omega\tau\} \quad (15)$$

$$Vp \cdot \tau s(t) = \{S'(t-\tau)/2\} \cdot \sin\{\omega t + \alpha + m(t-\tau) + \beta - \omega\tau\} \quad (16)$$

Here, a delay circuit 10 is formed by shift registers.

It is to be noted that equations (15)' and (16)' are equivalent to previously mentioned equations (9) and (10) while equations (17) and (18) are equivalent to previously mentioned equations (11) and (12), respectively. Accordingly, the individual signals Vp·τc(t), Vp·τs(t), Vqc(t) and Vqs(t) have basically the same phase angles as the signals pτc(t)', pτs(t)', qc(t)' and qs(t)' obtained by quadrature detection described referring to FIG. 3. Signal processing in succeeding stages is performed in a similar manner as shown in FIG. 3 and the angular carrier frequency ω of the ultrasonic signal arriving from a target is calculated.

Although the delay circuit 10 is provided in a stage following the matched filters in the circuit example described above, it may be provided in a stage preceding the matched filters. In the latter cases, it would be possible to reduce the number of internal circuit elements of the delay circuit 10.

CIRCUIT EXAMPLE 3

Figure 5:
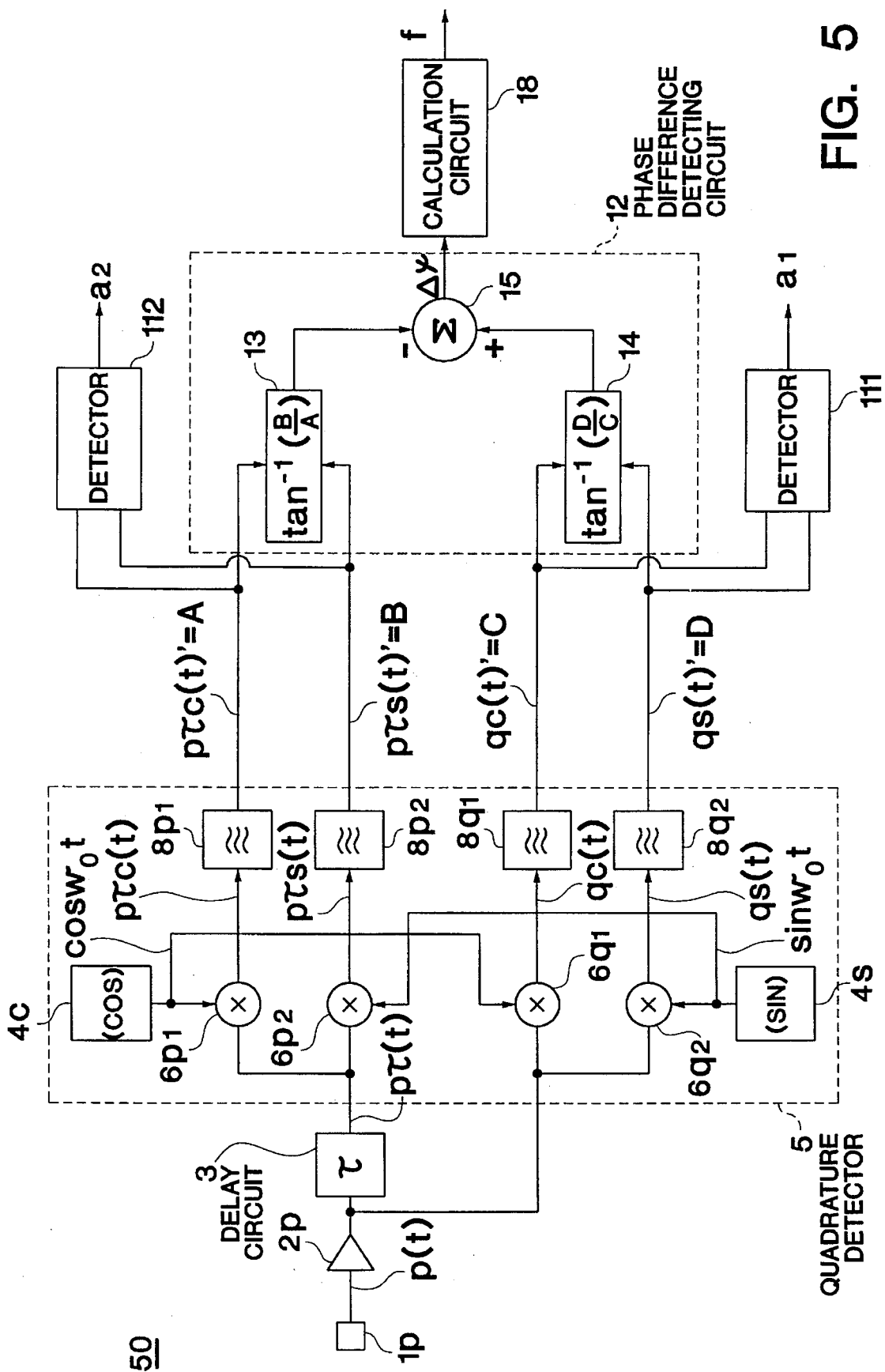
FIG. 5 is a block diagram of a carrier frequency measuring circuit which performs the function of the circuit of FIG. 3 with just a single ultrasonic transducer element.

According to the aforementioned circuit examples, there are provided a pair of ultrasonic transducer elements 1p and 1q, and the angular carrier frequency ω of the ultrasonic signal produced by a target is determined from the signals picked up by the ultrasonic receiving beams P and Q which are formed by the ultrasonic transducer elements. It is also possible to determine the carrier frequency f with a single ultrasonic transducer element 1p. Specifically, a single ultrasonic receiving beam P formed by the ultrasonic transducer element 1p is rotated at a fixed period τ0 and the carrier frequency f is determined based on signals received in a current rotational cycle and a preceding rotational cycle of beam scanning. Shown in FIG. 5 is an example of this type of carrier frequency measuring circuit, which is advantageous in that the circuit configuration can be made much simpler.

CIRCUIT EXAMPLE 4

Figure 6:
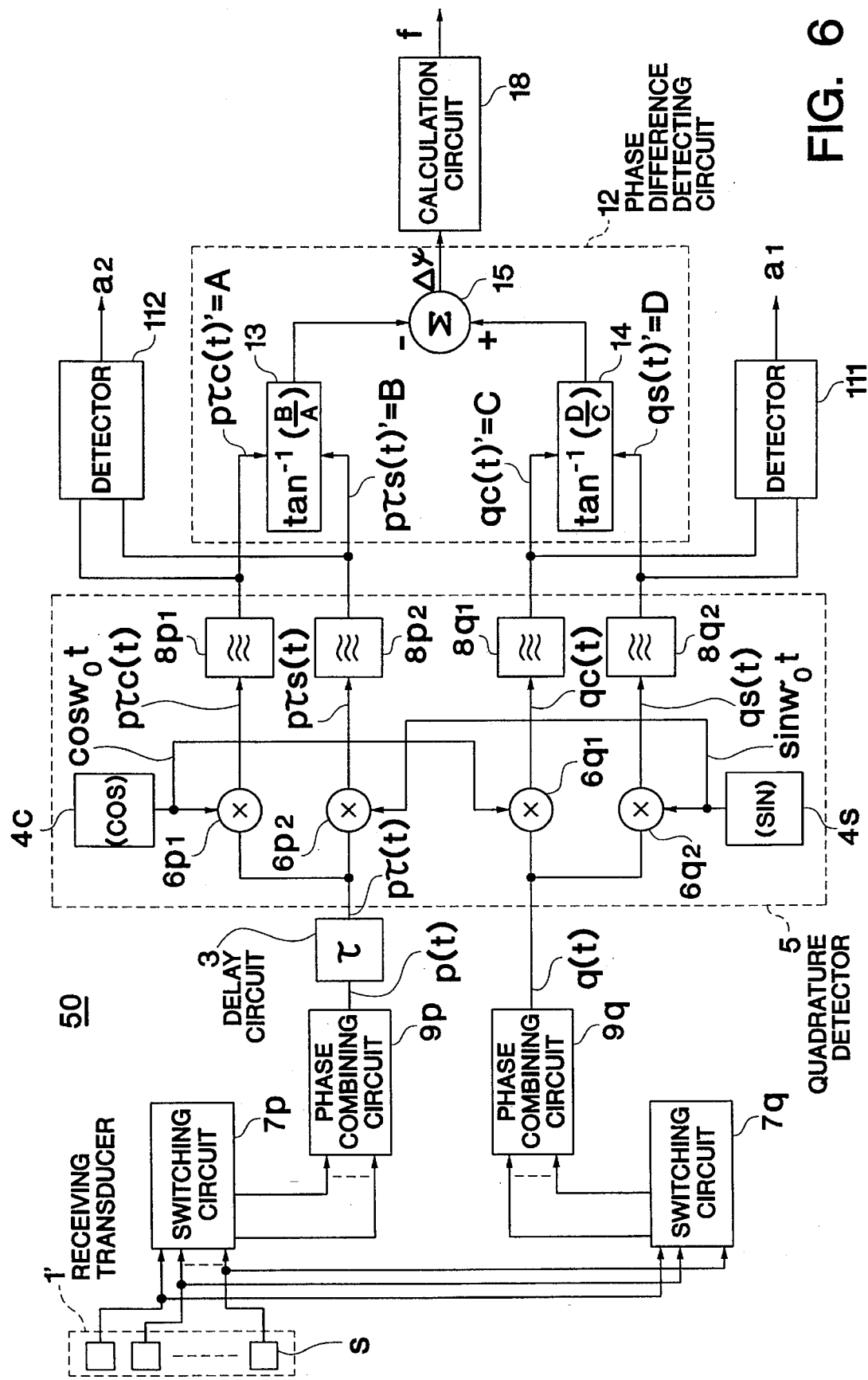
FIG. 6 is a block diagram of a carrier frequency measuring circuit employing a plurality of ultrasonic transducer elements arranged in a circular array.

Referring now to FIG. 6, there is shown a receiving transducer 1' configured with an array of 120 ultrasonic transducer elements s equally spaced around the circular surface of the array, for example. A pair of switching circuits 7p and 7q individually select 30 each adjacent transducer elements s at a time among the 120 transducer elements s arranged in an annular array, shifting the selection of transducer elements in sequential steps around the array. Two groups of 30 transducer elements s selected from the 120 transducer elements s by the switching circuits 7p and 7q are separated from each other by a sector angle of 90°. Controlled by the switching circuits 7p and 7q, signals received by individual groups of 30 transducer elements s are sent to phase synthesis circuits 9p and 9q, respectively. Then, two ultrasonic receiving beams are formed by the phase synthesis circuits 9p and 9q by way of phase synthesis. Furthermore, the operation of the two switching circuits 7p and 7q is controlled in such a manner that they would select individual groups of transducer elements with a time delay corresponding to the already mentioned time difference τ. As the two ultrasonic receiving beams are rotated underwater with a constant time difference of τ, two signals p(t) and q(t) having a mutual phase difference of θ are obtained as in the case of the circuit example shown in FIG. 3.

The succeeding circuit configuration of FIG. 6 is the same as shown in FIG. 3. An advantage of the configuration of FIG. 6 which is based on electric beam forming and scanning technique is that the ultrasonic receiving beams can be rotated at a higher speed compared to the method of FIG. 3 in which a pair of receiving beams formed by two separate ultrasonic transducer elements are scanned by mechanically rotating the ultrasonic transducer elements.

CIRCUIT EXAMPLE 5

Figure 7:
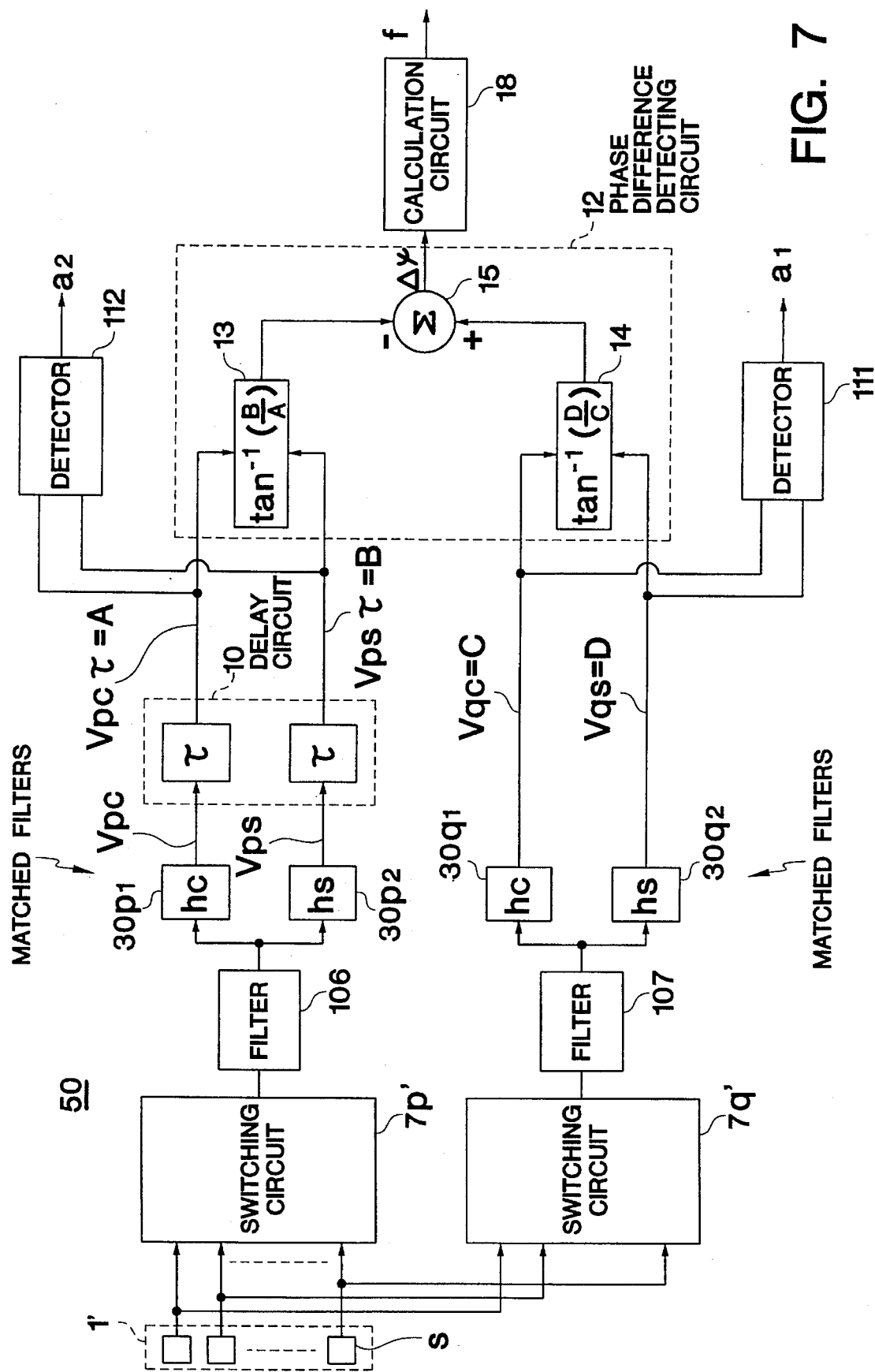
FIG. 7 is a block diagram of a carrier frequency measuring circuit employing matched filters instead of a quadrature detector of FIG. 6.

Shown in FIG. 7 is a circuit example employing matched filters 30p1, 30p2, 30q1 and 30q2 instead of the quadrature detector 5 of FIG. 6. Unlike the switching circuits 7p and 7q of FIG. 6, switching circuits 7p' and 7q' of this example scan through all 120 transducer elements s one after another and individually deliver received signals to the matched filters 30p1, 30p2, 30q1 and 30q2. In this matched filter type circuit example, individual signals successively fed in time sequence are processed so that ultrasonic receiving beams are created by way of phase synthesis.

CIRCUIT EXAMPLE 6

Figure 8:
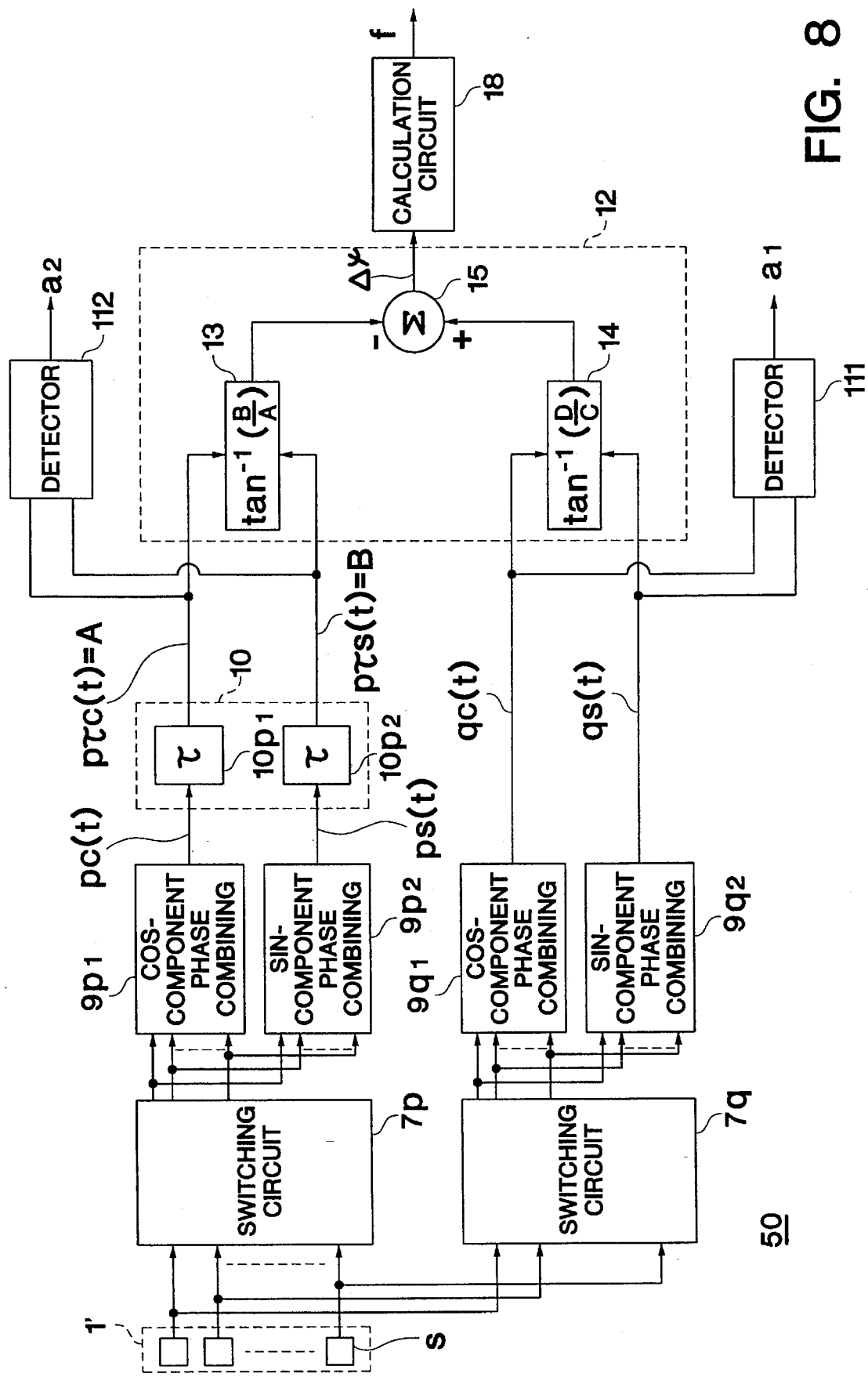
FIG. 8 is a block diagram of a carrier frequency measuring circuit employing phase synthesis circuits instead of the quadrature detector of FIG. 6.

Shown in FIG. 8 is a circuit example employing phase synthesis circuits instead of the quadrature detector 5 of FIG. 6.

Figure 9:
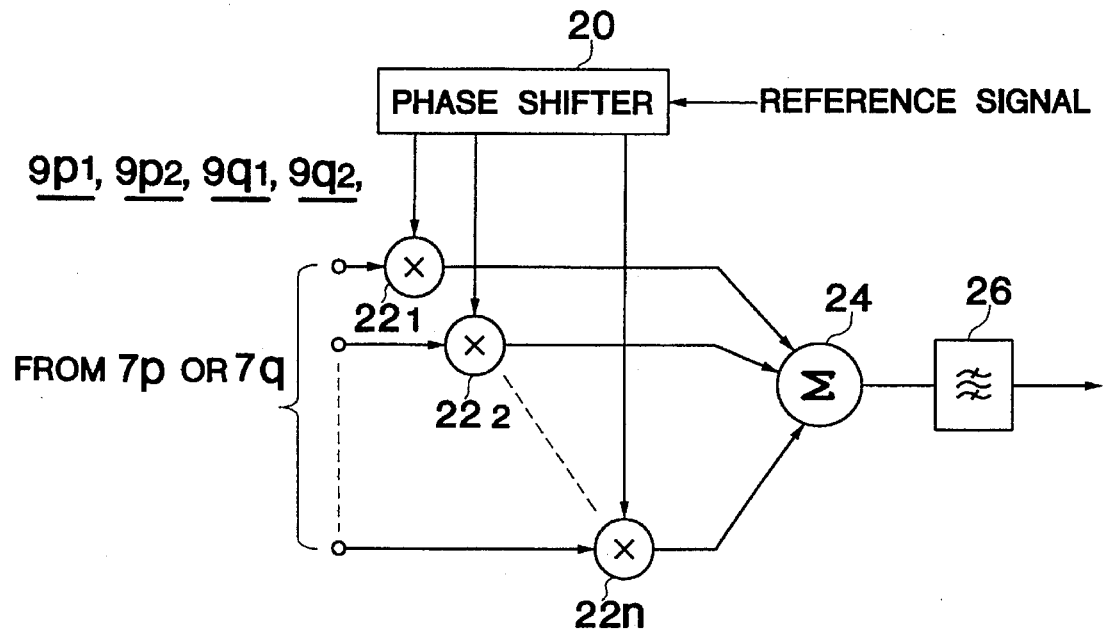
FIG. 9 is a circuit diagram of the phase synthesis circuits of FIG. 8.

These phase synthesis circuits 9p1, 9p2, 9q1 and 9q2 each comprise a phase shifter 20 for shifting the phase of a reference signal fed from an unillustrated oscillator by specified amounts, multipliers 221–22n for multiplying individual received signals fed from a switching circuit 7p or 7q by phase-shifted reference signal inputs from the phase shifter 20, an adder 24 for adding outputs of the multipliers 221–22n and a filter 26 for removing harmonic components contained in an output of the adder 24, as shown in FIG. 9.

In the phase synthesis circuits for cosine components and sine components, designated by the reference numerals 9p1 and 9q1, phase synthesis of individual received signals is performed as their internal multipliers 221–22n multiply the individual outputs of the switching circuit 7p or 7q by reference signals cos(ω0t+θ1) to cos(ω0t+θn) fed from the phase shifter 20. On the other hand, in the phase synthesis circuits for cosine components and sine components, designated by the reference numerals 9p2 and 9q2, phase synthesis of individual received signals is performed as the individual outputs of the switching circuit 7p or 7q are multiplied by reference signals sin(ω0t+θ1) to sin(ω0t+θn) fed from the phase shifter 20, all with a phase shift of 90° from the above-mentioned reference signals.

Output signals of the phase synthesis circuits 9p1 and 9p2 are delayed by delay circuits 10p1 and 10p2. Outputs of the delay circuits 10p1 and 10p2 together with outputs of the phase synthesis circuits 9q1 and 9q2 are the same as given by equations (9) to (12) described earlier. Signal processing in succeeding stages is performed in a similar manner as the second embodiment (circuit example 2) in order to measure the angular carrier frequency (ω−ω0). Since the angular frequency ω0 is already known, it is easy to calculate the carrier angular frequency ω, and then the carrier frequency f, of the incident ultrasonic signal.

The phase synthesis circuit depicted in FIG. 9 employs as means for introducing phase delays the multipliers 22, phase shifter and oscillator to indirectly shift the signals picked up by the corresponding ultrasonic transducer elements. In a varied form of circuit configuration, there may be provided a delay circuit comprising inductors and capacitors to directly introduce necessary time delays to the signals received by the transducer elements.

Figure 10:
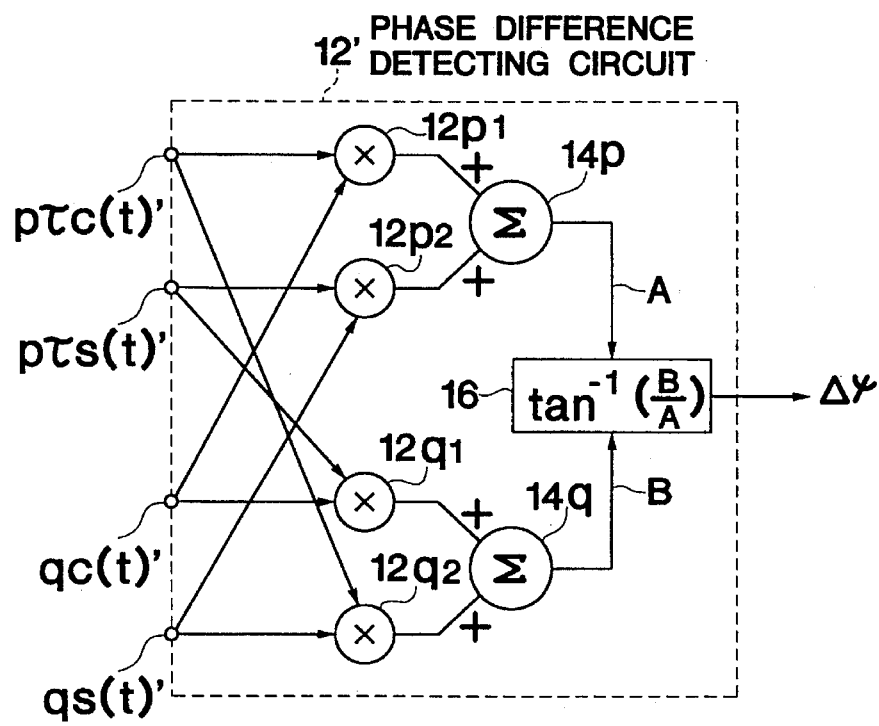
FIG. 10 is a circuit diagram of a phase difference calculating circuit having a modified circuit configuration from those employed in the above carrier frequency measuring circuits.

Furthermore, instead of the phase difference calculating circuit 12 employed in the aforementioned circuit examples, there may be provided a phase difference calculating circuit 12' having a configuration as shown in FIG. 10.

With this phase difference calculating circuit 12', the phase difference ωτ between the received signals p(t) and q(t) obtained from ultrasonic echoes picked up by the two ultrasonic transducer elements 1p and 1q or by the array of ultrasonic transducer elements s is expressed by the following equation, by using signals obtained by quadrature detection:

$$\tan \omega\tau = \{p\tau s(t)' \cdot qc(t)' + p\tau c(t)' \cdot qs(t)'\}/\{p\tau c(t)' \cdot qc(t)' + p\tau s(t)' \cdot qs((t)'\} \quad (19)$$

Accordingly, individual multipliers 12p1, 12p2, 12q1 and 12q2 calculate the values of pτc(t)·qc(t)', pτs(t)·qs(t)', pτs(t)·qc(t)' and pτc(t)·qs(t)', respectively, and adders 14p and 14q in a succeeding stage calculate the following sums: pτc(t)·qc(t)'+pτs(t)·qs(t)'=A, pτs(t)·qc(t)'+pτc(t)·qs(t)'=B, respectively. Subsequently, a processor 16 calculates the value of $\tan^{-1}(B/A)$ from the outputs A and B of the two adders 14p and 14q. From the above operations, $\tan^{-1}(B/A) = \omega\tau = \Delta\psi$, which gives the phase difference $\Delta\psi$ between the signals p(t) and q(t) received by the ultrasonic transducer elements 1p and 1q.

CIRCUIT EXAMPLE 7

Figure 11:
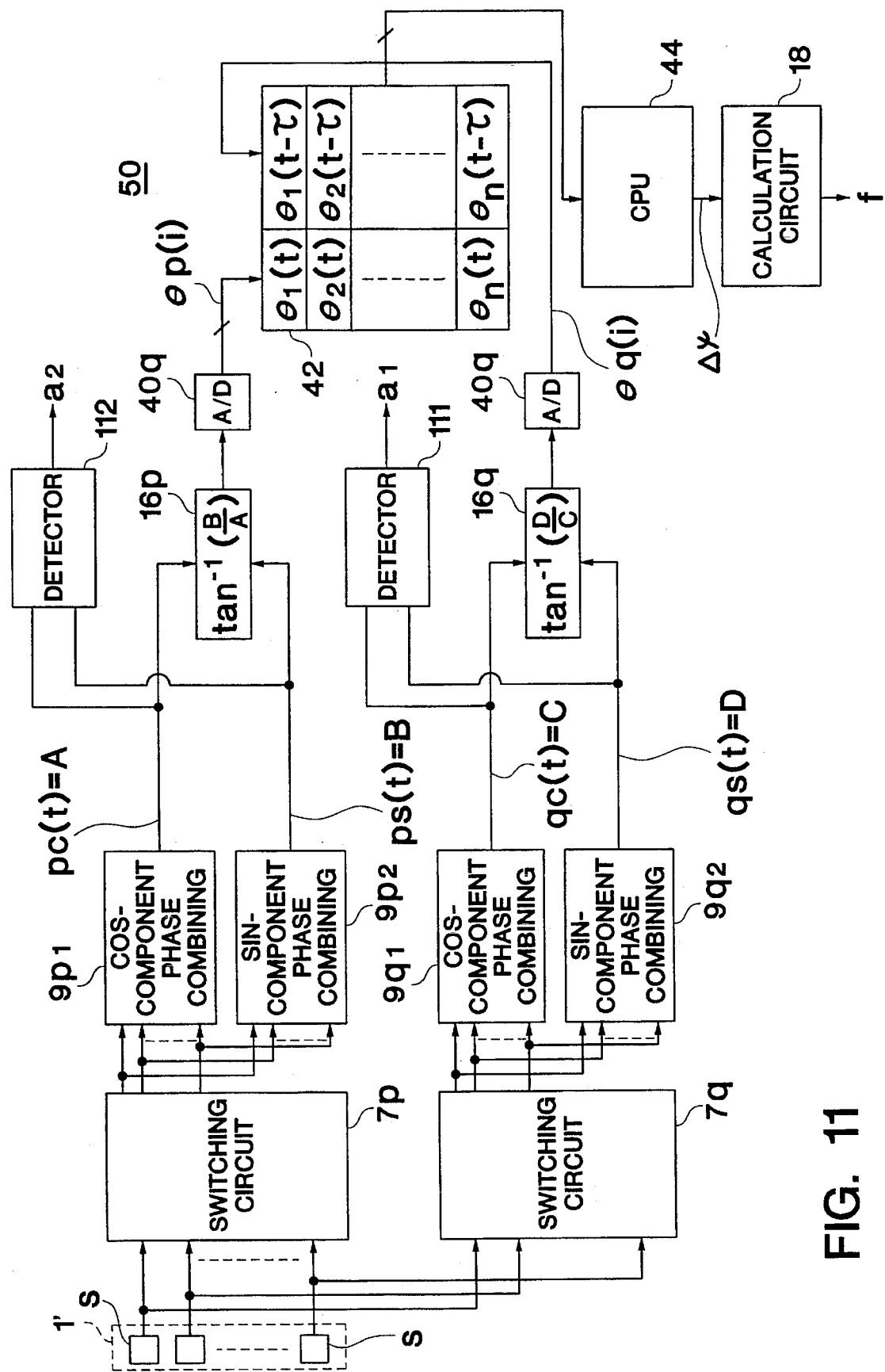
FIG. 11 is a block diagram of a carrier frequency measuring circuit employing a random access memory (RAM) for data storage and a central processing unit (CPU) for data readout instead of a delay circuit of FIG. 8.

FIG. 11 shows another circuit example which employs a memory 42 and a central processing unit (CPU) 44 for reading out data content of the memory 42, instead of the delay circuit 10 of FIG. 8. Furthermore, the circuit of FIG. 11 comprises processors 16p and 16q for detecting a phase difference immediately following the phase synthesis circuits 9p1, 9p2, 9q1 and 9q2.

The memory 42 readily stores data on amounts of phase angles θi(t) and θi(t−τ) mutually related by the time difference τ applied to the ultrasonic receiving beam P when it is scanned (where i=1 to n, n=the number of division of the full-circle angle 360°).

Signals θp(i) and θq(i), corresponding to the amounts of phase angles, obtained by the individual processors 16p and 16q are digitized by analog-to-digital (A/D) converters 40p and 40q, respectively. The digitized signals θp(i) and θq(i) are then entered into the memory 42 as address data. Subsequently, data on amounts of phase angles θi(t) and θi(t−τ) are read from the memory 42 and based on these data the CPU 44 reads out the value of phase difference $\Delta\psi = \theta i(t) - \theta i(t-\tau)$. Further, the calculating circuit 18 calculates the value of carrier frequency f.

CIRCUIT EXAMPLE 8

Figure 12:
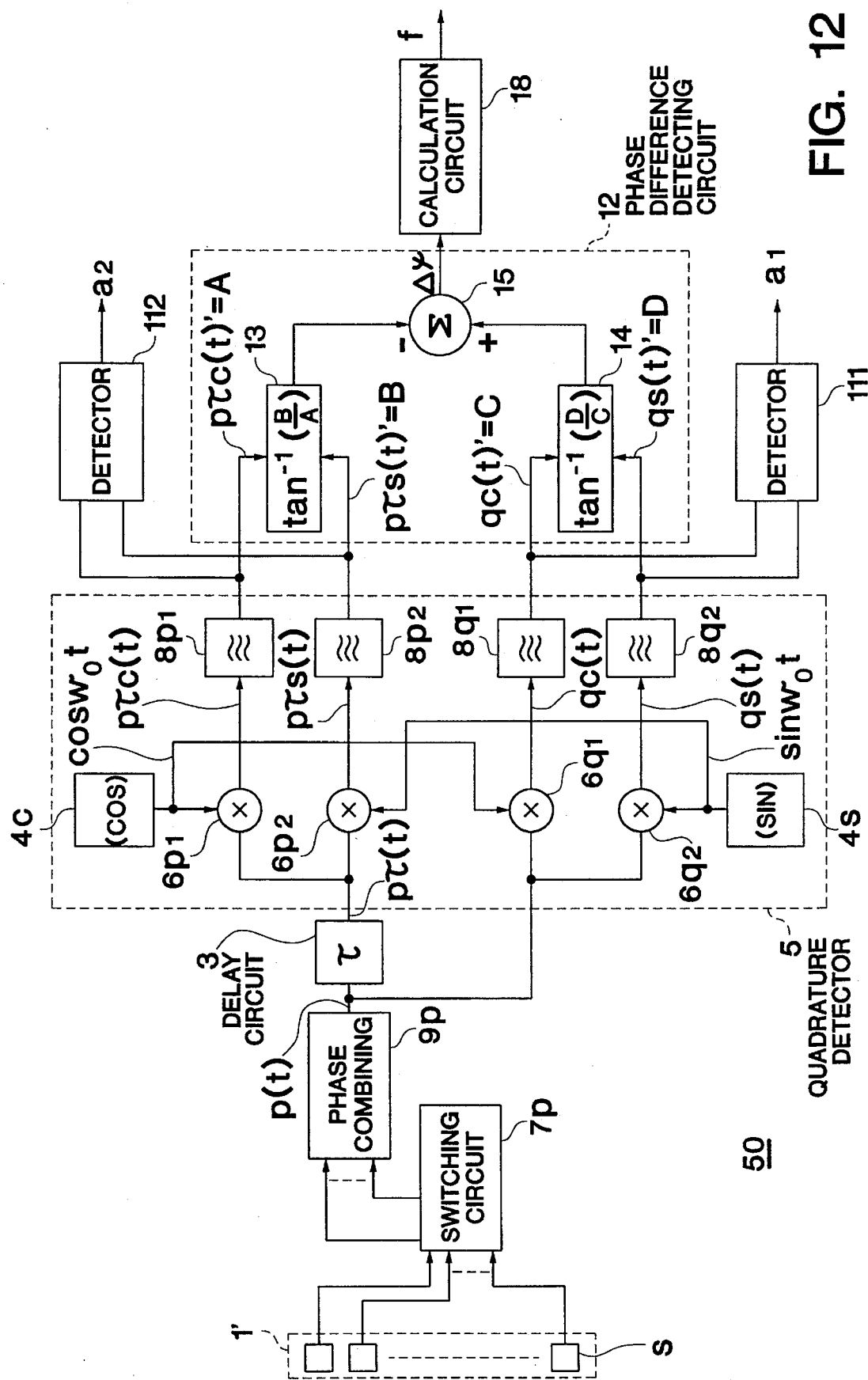
FIG. 12 is a block diagram of a carrier frequency measuring circuit which produces a single ultrasonic receiving beam using the circuit of FIG. 6.
Figure 13:
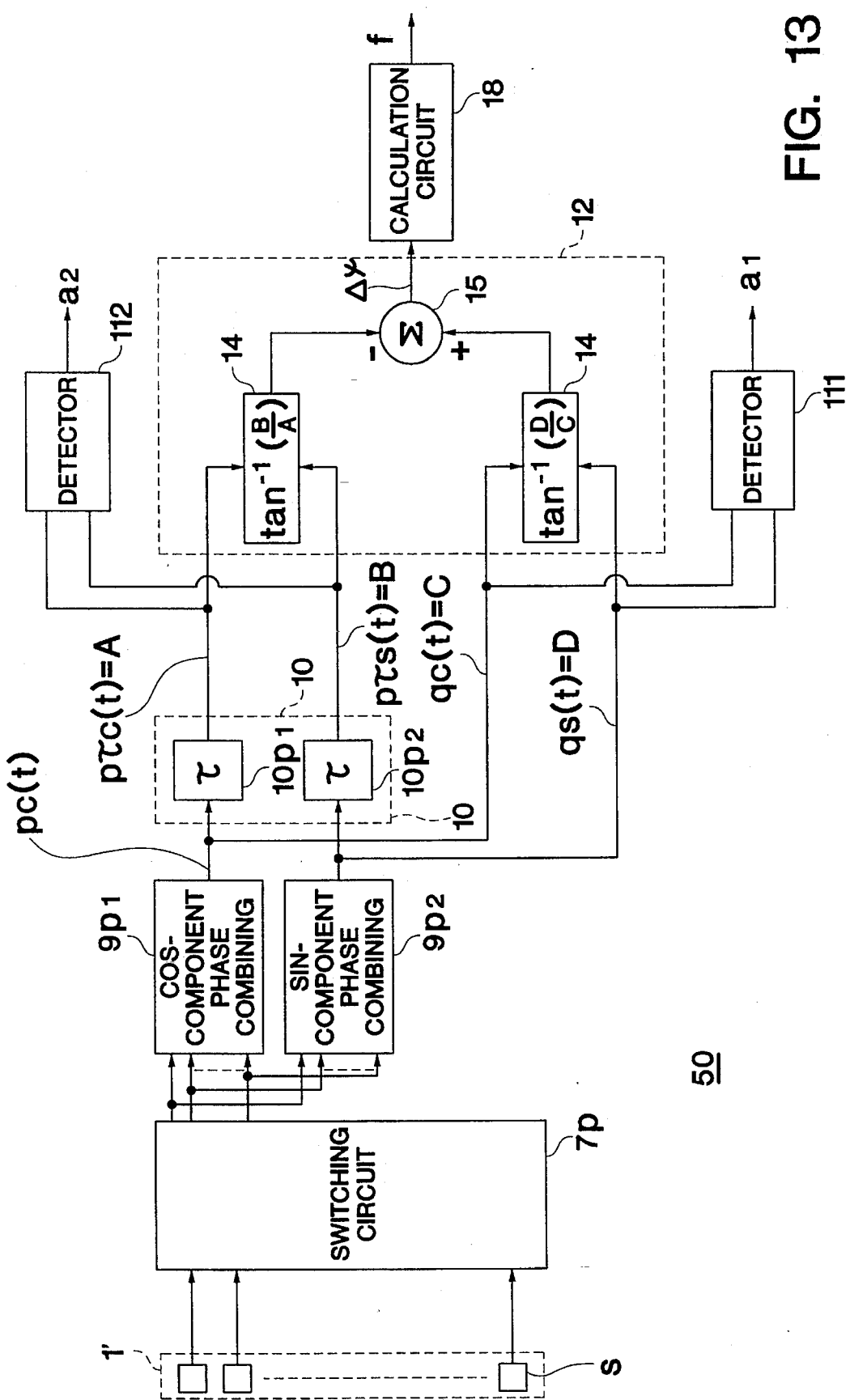
FIG. 13 is a block diagram of a carrier frequency measuring circuit which produces a single ultrasonic receiving beam using the arrangement of FIG. 8.
Figure 14:
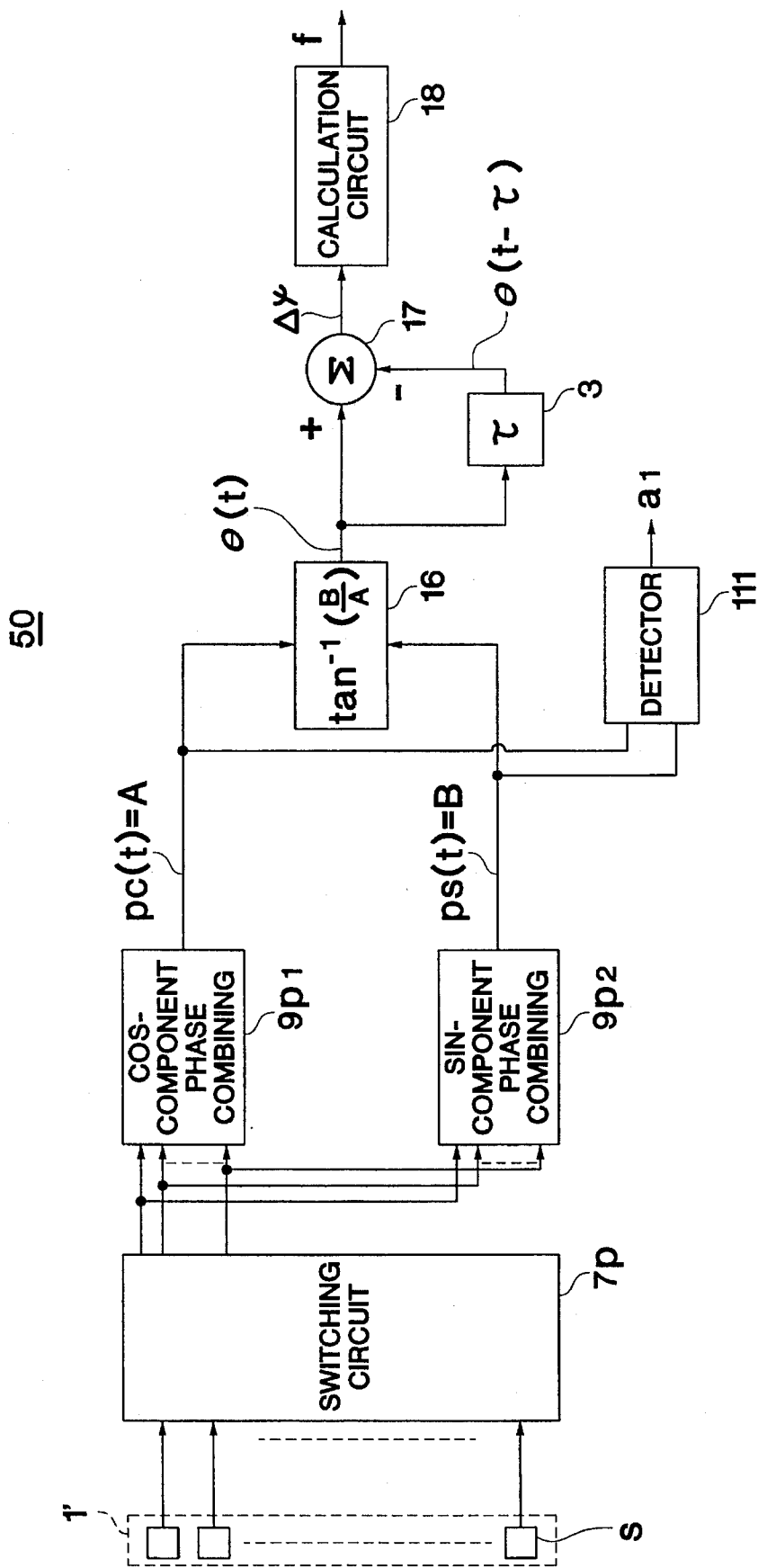
FIG. 14 is a block diagram of a carrier frequency measuring circuit employing a RAM for data storage and a CPU for data readout instead of the delay circuit of FIG. 13.

It is to be recalled that in the circuit example of FIG. 5 two receiving beams having a mutual phase difference are produced by successively rotating a single beam formed by a single ultrasonic transducer element 1p. It is also possible to achieve the operation of two receiving beams having a mutual phase difference by successively rotating a single beam formed by a circular array of ultrasonic transducer elements s as shown in FIG. 6, for example. FIG. 12 shows a circuit configuration based on this type of beam forming, which is advantageous in that the circuit configuration can be much simplified. This beam forming technique can also be applied to the circuit examples of FIGS. 7 and 8. Shown in FIG. 13 is circuit example 9 obtained by applying this beam forming technique to the circuit configuration of FIG. 8. Further, FIG. 14 shows circuit example 10 which would be obtained by moving the delay circuit 10 of FIG. 13 to a succeeding stage of the phase difference calculating circuit 12. What is characteristic of the circuit configuration of FIG. 14 is that it requires only one delay circuits 3. Although the receiving transducer 1' shown in FIGS. 6 to 11 employs an annular array of multiple ultrasonic transducer elements s, it is also possible to arrange a plurality of ultrasonic transducer elements s to form a linear array. With this linear array receiving transducer, the switching circuit switches the individual ultrasonic transducer elements s in such a manner that a single receiving beam or a pair of receiving beams having a mutual angular separation of θτ are produced by way of phase synthesis. The single or dual receiving beams thus produced are steered and the angular frequency ω of the ultrasonic carrier is obtained in a similar way as previously described.

Figure 15:
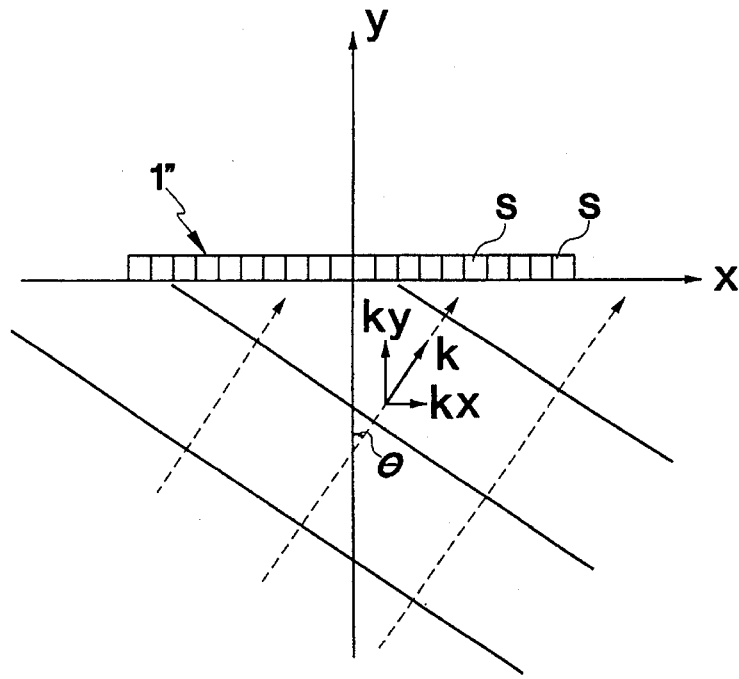
FIG. 15 is a diagram showing a second principle adopted in carrier frequency measuring circuits according to the present invention.

Referring now to FIG. 15, a second principle upon which carrier frequency measurement is based will be explained in the following.

For the purpose of the following discussion, it is assumed that there is a receiving transducer 1" aligned with the x-axis of a two-dimensional plane (x, y) as shown in FIG. 15. The receiving transducer 1" is a linear array constructed with a number of omnidirectional ultrasonic transducer elements s arranged along the x-axis, and a plane-wave ultrasonic signal that advances in a direction intersecting the y-axis at a fixed angle θ arrives upon the receiving transducer 1".

Here, the ultrasonic signal p(x, y, t) that arrives upon the receiving transducer 1" is expressed by the following equation:

$$p(x, y, t) = p0 \cdot \cos \{x \cdot k \cdot \sin \theta + y \cdot k \cdot \cos \theta - \omega \cdot t\} \quad (20)$$

where p0 represents the amplitude (sound pressure) of the arriving ultrasonic signal while cos {x·k·sin θ+y·k·cos θ−ω·t} accounts for the phase of the ultrasonic signal, (x, y) being coordinates, k being a wavelength constant ($=2\pi/\lambda$, where λ is wavelength), ω being the angular carrier frequency of the arriving ultrasonic signal, and t denoting time. In this argument it is assumed that the initial phase of the arriving ultrasonic signal is 0 for simplification. Thus, substituting y=0, instantaneous sound pressure on the x-axis is $$p(x, t) = p0 \cdot \cos (x \cdot k \cdot \sin \theta - \omega \cdot t) \quad (21)$$

If outputs of successive ultrasonic transducer elements s are switched at a constant speed u, position x of a currently selected transducer element is given by $$x = u \cdot t \quad (22)$$

Substituting equation (22) into equation (21), $$p(t) = p0 \cdot \cos \{(u \cdot k \cdot \sin \theta - \omega) \cdot t\} \quad (23)$$

If the receiving transducer 1" produces an output signal v0 when it receives an ultrasonic signal having the sound pressure p0, receiving sensitivity G of the receiving transducer 1" is G=v0/p0. Accordingly, output signal v(t) derived from ultrasonic input signal p(t) is given by G·p(t). Since v(t) is proportional to p(t), equation (23) can be rewritten as $$v(t) = v0 \cdot \cos\{(u \cdot k \cdot \sin\theta - \omega) \cdot t\} \quad (24)$$

It would be noticed from equation (24) above that this expression gives a transducer output signal equivalent to what would be obtained when a single ultrasonic transducer element s receives the incident ultrasonic signal while it is moved along the x-axis at the constant speed u. Here, the spatial frequency of v(t) is given by the equation $2\pi f = u \cdot k \cdot \sin\theta - \omega$. Deriving power spectrum by performing Fourier transform of v(t), and knowing the values of u, k, ω and G, it is possible to calculate the arrival angle θ and amplitude p0 of the ultrasonic signal arriving upon the receiving transducer 1".

Next, based on equation (22), the following discussion deals with a process in which outputs of successive ultrasonic transducer elements s are switched at a constant speed u with a time delay of Δt.

Position x of a currently selected transducer element is expressed by $$x = u \cdot (t - \Delta t) \quad (25)$$

Substituting the above into equation (21), $$\begin{aligned} p(t) &= p0 \cdot \cos\{u \cdot (t - \Delta t) \cdot k \cdot \sin\theta - \omega) \cdot t\} \\ &= p0 \cdot \cos\{(u \cdot k \cdot \sin\theta - \omega) \cdot t - u \cdot \Delta t \cdot k \cdot \sin\theta\} \end{aligned} \quad (26)$$

Expressing the signal received and outputted by each ultrasonic transducer element s by v(t), equation (26) can be rewritten as $$v(t) = v0 \cdot \cos\{(u \cdot k \cdot \sin\theta - \omega) \cdot t - u \cdot \Delta t \cdot k \cdot \sin\theta\} \quad (27)$$

On the other hand, if the received signal v(t) given by equation (24) is delayed by as much as Δt, a resultant signal v(t−Δt) is $$\begin{aligned} v(t - \Delta t) &= v0 \cdot \cos\{(u \cdot k \cdot \sin\theta - \omega) \cdot (t - \Delta t)\} \\ &= v0 \cdot \cos\{(u \cdot k \cdot \sin\theta - \omega) \cdot t - u \cdot \Delta t \cdot k \cdot \sin\theta + \omega \cdot \Delta t\} \end{aligned} \quad (28)$$

Thus, the phase difference Δψ between the received signal v(t) of equation (27) and the received signal v(t−Δt) of equation (28) is $$\Delta\psi = \omega \cdot \Delta t \quad (29)$$

From equation (29) above, it is apparent that the phase difference Δψ is related to the angular carrier frequency ω of the ultrasonic signal arriving from a target.

Here, the time difference Δt may be selected so that it coincides with the time interval at which a cyclical switching sequence of the ultrasonic transducer element s of the receiving transducer 1" is repeated. Since the time difference Δt is known in this case, carrier frequency f is derived from the following equation upon calculating the value of phase difference Δψ:

$$f = \Delta\psi / (2\pi\Delta t) \quad (30)$$

Then, Doppler shifts caused by a moving target can be detected from changes in carrier frequency f.

According to the invention, Fourier transform of the received signal v(t−Δt) given by equation (28) and the received signal v(t) given by equation (27) is executed to obtain their phase spectrums. Phase difference Δψ is calculated by executing subtraction between the phase angles of both signals for every spatial frequency component. Each value of phase difference Δψ is divided by Δt to convert it into corresponding angular frequency ω, from which carrier frequency f of the ultrasonic signal can be determined for every spatial frequency component $2\pi f$ (or for every arrival angle θ of the ultrasonic signal).

Now, examples of carrier frequency measuring circuits 50' according to the aforementioned second principle will be described in the following.

CIRCUIT EXAMPLE 11

Figure 16:
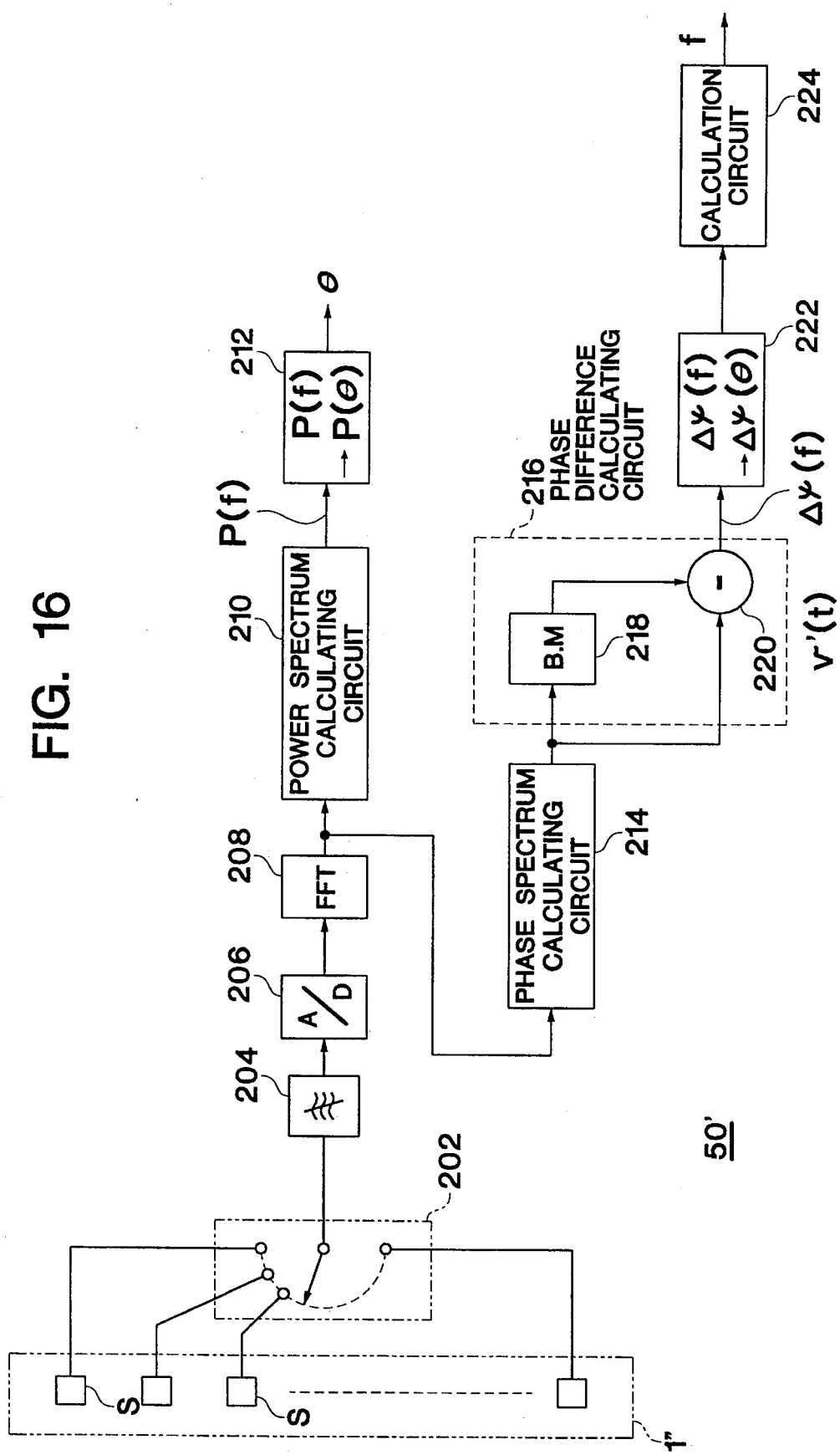
FIG. 16 is a block diagram of a carrier frequency measuring circuit based on the second principle.

Referring to FIG. 16, the receiving transducer 1" of this example comprises a number of ultrasonic transducer elements s arranged to form a linear array and these ultrasonic transducer elements s are switched at regular repetition intervals Δt. Indicated by the reference numeral 202 is a multiplexer for switching received signal outputs of the individual ultrasonic transducer elements s; indicated by the reference numeral 204 is a filter for eliminating switching noise contained in a multiplexed received signal outputted by the multiplexer 202; indicated by the reference numeral 206 is an analog-to-digital (A/D) converter; and indicated by the reference numeral 208 is a Fourier transform circuit for executing Fourier transform of the digitized received signal.

A power spectrum calculating circuit 210 calculates power spectrum of the received signal based on the results of Fourier transform executed by the Fourier transform circuit 208; and a coordinate conversion circuit 212 converts values of spatial frequency $2\pi f$ taken on the axis of abscissas of the power spectrum into values of arrival angle θ of ultrasonic signals arriving upon the receiving transducer 1".

A phase spectrum calculating circuit for determining the phase spectrum of the received signal based on the results of Fourier transform executed by the Fourier transform circuit 208; and a phase difference calculating circuit 216 calculates values of phase difference Δψ by executing subtraction between the phase angles of signals received in a current scanning cycle and a preceding scanning cycle of the ultrasonic transducer elements s for individual spatial frequency components based on phase spectrum obtained by the phase spectrum calculating circuit 214. In this circuit example, the phase difference calculating circuit 216 comprises a buffer memory 218 and a subtracter 220.

A conversion circuit 222 converts values of spatial frequency f into values of arrival angle θ of ultrasonic signals arriving upon the receiving transducer 1". Further, a carrier frequency calculating circuit 224 calculates carrier frequencies f of ultrasonic signals arriving from targets based on phase differences Δψ obtained for individual spatial frequency components of successively received signals.

The following discussion deals with the operation of an underwater detection system having the above-described configuration, focusing particularly on how it determines arrival angle θ and amplitude p0 of an ultrasonic signal arriving from targets as well angular carrier frequency ω of the ultrasonic signal.

As the ultrasonic transducer elements s that construct the receiving transducer 1" are sequentially switched at regular repetition intervals Δt by the multiplexer 202, they receive, or scan, ultrasonic signals arriving from underwater targets. After switching noise has been removed by the filter 204, signals picked up by the individual ultrasonic transducer elements s are digitized by the A/D converter 206 and the Fourier transform circuit 208 performs Fourier transform. Then, the results of Fourier transform are sent to both the power spectrum calculating circuit 210 and phase spectrum calculating circuit 214.

Figure 17A:
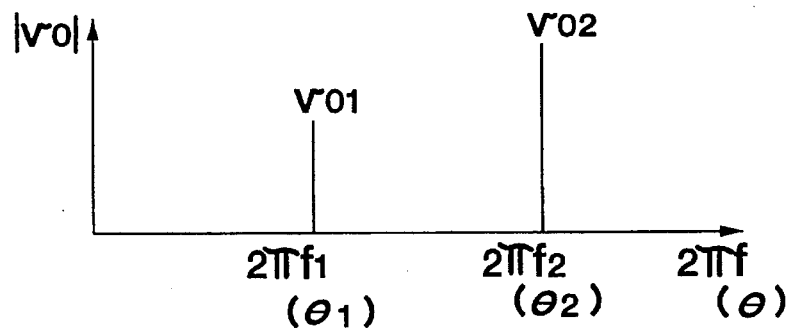
FIG. 17a is a diagram showing power spectrums obtained by a power spectrum calculating circuit of FIG. 16.
Figure 17B:
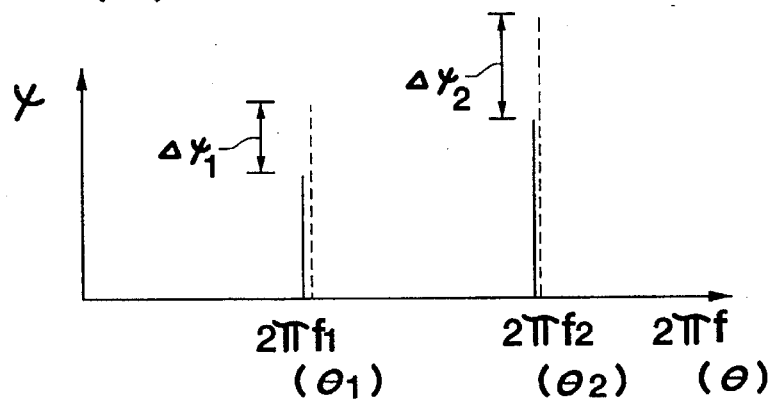
FIG. 17b is a diagram showing phase spectrums obtained by a phase spectrum calculating circuit of FIG. 16.

The power spectrum calculating circuit 210 calculates power spectrum based on the results of Fourier transform, with spatial frequency $2\pi f$ of the received signal taken on the axis of abscissas and output v0 of the received signal taken on the axis of ordinates as shown in FIG. 17(*a*).

Next, the coordinate conversion circuit 212 converts values of spatial frequency $2\pi f$ taken on the axis of abscissas of the power spectrum into values of arrival angle $\theta$ of the ultrasonic signal arriving upon the receiving transducer 1" and outputs the latter values. More specifically, spatial frequency $2\pi f$ of the received signal v(t) is given by $2\pi f = u \cdot k \cdot \sin\theta - \omega$ as shown in connection with equation (24). Since u, k and $\omega$ are known, it is possible to translate the spatial frequency $2\pi f$ into the arrival angle $\theta$ of the ultrasonic signal arriving upon the receiving transducer 1". It would therefore be understood that instantaneous arrival angles ($\theta 1$ and $\theta 2$ in this example) of the ultrasonic signal with respect to the receiving transducer 1" and corresponding output levels v01 and v02 (which depend on the amplitude p0 of the ultrasonic signal) can be calculated.

On the other hand, the phase spectrum calculating circuit 214 gives phase spectrum based on the results of Fourier transform, with spatial frequency $2\pi f$ of the received signal taken on the axis of abscissas and phase $\psi$ of the received signal taken on the axis of ordinates as shown in FIG. 17(*b*).

Phase spectrum data (shown by solid lines in FIG. 17(*b*)) obtained in a current scanning cycle of the ultrasonic transducer elements s is transmitted to the subtracter 220 as well as to the buffer memory 218. At this point, phase spectrum data (shown by dashed lines in FIG. 17(*b*)) obtained in a preceding scanning cycle of the ultrasonic transducer elements s is read from the buffer memory 218 and sent to the subtracter 220. The subtracter 220 performs subtraction between phase angles of two successively received signals, i.e., the signal obtained in the current scanning cycle (corresponding to v(t) of equation (27)) and the signal obtained in the preceding scanning cycle (corresponding to v(t–$\Delta$t) of equation (28)), for individual spatial frequency components ($2\pi f1$ and $2\pi f2$ in this example). Phase difference values $\Delta\psi 1$ and $\Delta\psi 2$ are calculated in this manner.

Subsequently, the conversion circuit 222 converts individual spatial frequencies $2\pi f1$ and $2\pi f2$ into corresponding arrival angles $\theta 1$ and $\theta 2$ of the ultrasonic signal arriving upon the receiving transducer 1". Then, the carrier frequency calculating circuit 224 divides phase differences $\Delta\psi 1$ and $\Delta\psi 2$ of individual input signals by $\Delta$t to calculate carrier frequencies f1 and f2 of ultrasonic signals incident at respective arrival angles $\theta 1$ and $\theta 2$ as shown by equation (30).

Although the aforementioned circuit example is provided with the carrier frequency calculating circuit 224 for calculating angular carrier frequency $\omega$, it is possible to omit the carrier frequency calculating circuit 224 and directly utilize the phase difference signal $\Delta\psi$ outputted by the unit conversion circuit 222 in a case where different colors are used to represent amounts of angular frequency $\omega$, for example. This is because, as is apparent from equation (29), there is the relationship $\omega \propto \Delta\psi$, with the scanning repetition interval $\Delta$t of the ultrasonic receiving beam preset to a fixed value, which means that the phase difference $\Delta\psi$ contains in itself information on the carrier frequency f.

Furthermore, although the aforementioned circuit example is provided with the filter 204 so that signals received by the individual ultrasonic transducer elements s are inputted without intermission, it is also possible to prevent intermittent inputs of received signals in an alternative manner. One of such alternative arrangements is disclosed in Japanese Patent Publication No. 63-7350, for example, in which signals received by two adjacent ultrasonic transducer elements s are input simultaneously, weighted individually by a conversion circuit and then added together so that the received signals can be successively inputted even when the individual ultrasonic transducer elements s are switched in sequence.

In the above-described carrier frequency measuring circuit, ultrasonic signals arriving from a wide area are picked up by receiving beams formed at different times to determine their carrier frequencies. In an alternative arrangement, multiple receiving beams directed in every direction of a wide area may be readily formed in order that ultrasonic signals arriving from all directions can be detected by the individual receiving beams and their carrier frequencies can be determined.

Figure 18:
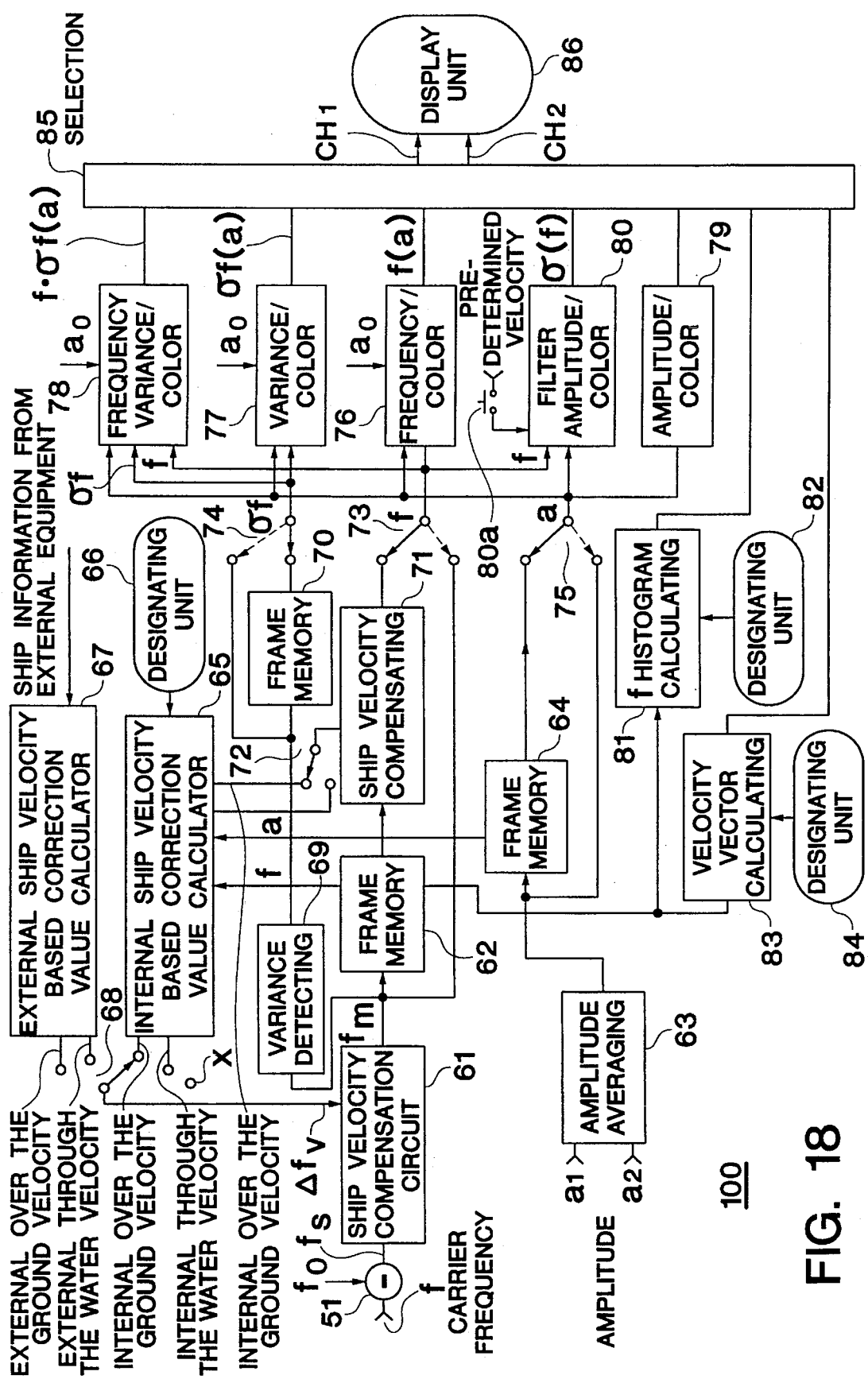
FIG. 18 is a block diagram of a ship velocity compensation/display circuit shown as one embodiment of the invention.

FIG. 18 is a block diagram of a ship velocity compensation/display circuit 100, shown as one embodiment of the invention, to be connected in a succeeding stage of any of the various examples of the carrier frequency measuring circuit 50 described above.

Using input carrier frequency f0 of an ultrasonic transmit signal and carrier frequency f fed from the carrier frequency measuring circuit 50, a subtracter 51 performs the operation fs=f–f0 to determine Doppler frequency shift (velocity) fs.

Since the Doppler frequency shift fs thus obtained provides relative velocity data as viewed from own ship, it is possible to determine whether a target is approaching to or going away from own ship, which would serve as useful information for collision avoidance. It is also important, however, to obtain information on the absolute moving velocity of the target itself assuming that own ship is not moving. This is accomplished by compensating the Doppler frequency shift fs against own ship's velocity (which may be an over-the-ground or through-the-water velocity). (This process is called ship velocity compensation.) Ship velocity compensation circuits 61 and 71 are provided for this purpose. The ship velocity compensation circuit 61 makes ship velocity compensation by subtracting Doppler frequency shift $\Delta$fv attributed to the ship's velocity (over-the-ground or through-the-water) detected by a later-described circuit 65 or by external equipment from the Doppler frequency shift fs time-sequentially obtained by the subtracter 51. Indicated by the reference numeral 62 is a frame memory for storing corrected values of Doppler frequency shift fm obtained after the ship velocity compensation process. The frame memory 62 is constructed in such a manner that one frame of echo data (frequency fm) derived from one transmission cycle can be written simultaneously and these data are updated with new data derived from each successive transmission cycle.

The ship velocity compensation circuits 61 and 71 are configured with a ROM. These circuits are configured in such a manner that when data on the Doppler frequency shift fs is fed from the subtracter 51 and data on the Doppler frequency shift $\Delta$fv (f1 or f2) attributed to the over-the-ground or through-the-water ship velocity is fed from an internal ship velocity based correction value calculator 65 or external ship velocity based correction value calculator 67, a specific signal corresponding to a corrected Doppler frequency is transmitted.

A amplitude averaging circuit 63 for calculating mean value a of echo signal amplitudes a1 and a2 obtained by the carrier frequency measuring circuit 50. If only one echo signal amplitude value is input, the amplitude averaging circuit 63 automatically outputs that value. A frame memory 64 for storing data on average amplitude a obtained by the amplitude averaging circuit 63. The Doppler frequency shift fs and average amplitude a obtained from the same search point (same sound source) via the carrier frequency measuring circuit 50 are written in the same addresses of the frame memories 62 and 64, respectively. The internal ship velocity based correction value calculator 65 is intended to calculate the Doppler frequency shift Δfv attributed to the over-the-ground or through-the-water ship velocity as a correction value to be applied to the ship velocity compensation circuit 61 from the aforesaid Doppler frequency shift fm. Specifically, the internal ship velocity based correction value calculator 65 reads out data from such an area of the frame memory 62 that is specified by a readout area designating unit 66 and calculates Doppler frequency shifts Δfv (f1 or f2) attributed to the over-the-ground or through-the-water ship velocity.

As will be discussed later, the internal ship velocity based correction value calculator 65 contains a processing unit for calculating Doppler frequency shifts f1 or f2 attributed to the over-the-ground or through-the-water ship velocity for individual horizontal directions, a memory unit comprising, for example, 360 memory elements for storing the Doppler frequency shifts f1 or f2 and a readout unit for successively reading out the stored Doppler frequency shifts f1 or f2 and outputting them to the ship velocity compensation circuit 61. The readout area designating unit 66 selects whether to read out the Doppler frequency shifts f1 or f2 attributed to the over-the-ground or through-the-water ship velocity.

Furthermore, the internal ship velocity based correction value calculator 65 obtains amplitude data a of echoes from the same sound source as the Doppler frequency shifts f1 or f2 read out from the frame memory 62 by reading out data from the same memory area of the frame memory 64 as specified for the frame memory 62 by the readout area designating unit 66. The amplitude data a (hereinafter referred to as the amplitude associated with the frequency data) is used to give specific weights (or thresholds) when calculating a ship velocity based correction value.

The external ship velocity based correction value calculator 67 derives a correction value Δfv to be applied to the ship velocity compensation circuit 61 from the over-the-ground ship velocity fed from external equipment (e.g., a system comprising a GPS receiver and a gyrocompass) or from the through-the-water ship velocity fed from other external equipment (e.g., a water current measuring apparatus). More specifically, using externally entered over-the-ground or through-the-water velocity information, the external ship velocity based correction value calculator 67 calculates an over-the-ground or through-the-water ship velocity component in the direction of a sound source from which a particular carrier frequency f has been obtained, and then derives a Doppler frequency shift Δfv (f1 or f2) corresponding to the ship velocity component. The over-the-ground ship velocity and through-the-water ship velocity obtained by the internal ship velocity based correction value calculator 65 (hereinafter referred to as the internal over-the-ground and through-the-water ship velocities, respectively) and the over-the-ground ship velocity and through-the-water ship velocity acquired by the external ship velocity based correction value calculator 67 (hereinafter referred to as the external over-the-ground and through-the-water ship velocities, respectively) give rise to Doppler frequencies f1 and f2. Either f1 or f2 is then chosen by a select switch 68 and transmitted to the ship velocity compensation circuit 61. When the select switch 68 is switched to a unconnected terminal x, the ship velocity compensation circuit 61 does not make any compensation. In this case, the ship velocity compensation circuit 61 outputs the input data as it is and the frame memory 62 stores raw, or unprocessed, data.

When interfaced with a GPS (Global Positioning System) receiver and a gyrocompass, for example, the external ship velocity based correction value calculator 67 transmits Doppler frequency shifts f1 induced by the over-the-ground ship velocity. On the other hand, when interfaced with a water current measuring apparatus which measures water current velocities by transmitting and receiving an ultrasonic signal, the external ship velocity based correction value calculator 67 transmits Doppler frequency shifts f2 induced by the through-the-water ship velocity. The external ship velocity based correction value calculator 67 contains a processing unit for calculating Doppler frequency shifts f1 or f2 attributed to the over-the-ground or through-the-water ship velocity, a memory unit comprising, for example, 360 memory elements for storing the Doppler frequency shifts f1 or f2 and a readout unit for successively reading out the stored Doppler frequency shifts f1 or f2 and outputting them to the ship velocity compensation circuit 61.

It is possible to know irregularities in target velocities by determining a variance of Doppler frequency shifts fm obtained by the ship velocity compensation circuit 61. A variance calculating circuit 69 is provided for this purpose. Variance values obtained by the variance calculating circuit 69 are stored in a frame memory 70 which has the same structure as the frame memory 62.

The ship velocity compensation circuit 61 compensates Doppler frequency shifts on a real-time basis as they are outputted from the subtracter 51 whereas the ship velocity compensation circuit 71 compensates one frame of raw data once stored in the frame memory 62. Indicated by the reference numeral 72 is a select switch for choosing whether to use the internal over-the-ground ship velocity or internal through-the-water ship velocity for compensation. Indicated by the reference numeral 73 is a select switch for choosing Doppler frequency shifts fm output from the ship velocity compensation circuit 61 in real time or frequency data f output from the ship velocity compensation circuit 71 with one-frame delay. Also, a select switch 74 chooses variance values output from the variance calculating circuit 69 in real time or variance data once stored in the frame memory 70. Similarly, a select switch 75 chooses amplitude values outputted from the amplitude averaging circuit 63 in real time or amplitude data once stored in the frame memory 64. The select switches 73–75 are interlocked in operation. So far described in connection with FIG. 18 is circuitry concerned with ship velocity compensation. Now, display circuitry will be explained in the following.

A frequency/color conversion circuit 74 represents frequency data chosen by the select switch 73 in different colors depending on frequency values. In this color conversion process, amplitude data a associated with individual frequency data f received via the select switch 75 are used as threshold values. A variance/color conversion circuit 79 represents variance data σf chosen by the select switch 74 in different colors depending on variance levels. In this color conversion process, amplitude data a associated with individual variance data are used as threshold values. A frequency-variance/color conversion circuit 78 converts each combination of frequency and variance data into a corresponding color referring to both data. An amplitude/color conversion circuit 79 generates a color-coded picture in accordance with amplitude data a. A filter-amplitude/color conversion circuit 80 produces a color signal corresponding to amplitude data a if associated frequency data f falls within a specified frequency range, a background color signal if associated frequency data f lies outside that frequency range.

The frequency/color conversion circuit 76 acquires a Doppler frequency shift signal of an echo signal if it falls within a signal level range established based on a signal fed from a signal level range setter, and converts the acquired signal into a color-coded signal corresponding to the frequency of the signal. Comprising a ROM prestoring a particular relationship between frequencies and various colors, the frequency/color conversion circuit 76 transmits color-coded signals corresponding to frequency signals delivered via the select switch 73.

The variance/color conversion circuit 77 acquires variance data of an echo signal if it falls within a signal level range established based on a signal fed from a signal level range setter, and converts the echo signal into a color-coded signal corresponding to the variance data of the echo signal. Comprising a ROM prestoring a particular relationship between variance data and various colors, the variance/color conversion circuit 77 transmits color-coded signals corresponding to variance data signals delivered via the select switch 74.

The frequency-variance/color conversion circuit 78 generates a color-coded signal corresponding to the frequency and variance of an echo signal if it falls within a signal level range established based on amplitude data a, Doppler frequency shift signal f, variance data and a signal fed from a signal level range setter. The frequency-variance/color conversion circuit 78 comprises a ROM prestoring a particular relationship between combinations of frequency and variance data and various colors.

The filter-amplitude/color conversion circuit 80 acquires an amplitude signal of an echo signal if its Doppler frequency shift falls within a frequency range established based on a signal fed from a frequency range setter, and converts the acquired amplitude signal into a color-coded signal corresponding to the amplitude. Comprising a filter which will pass the amplitude signal when a Doppler frequency shift signal fed through the select switch 73 falls within the set frequency range and a ROM prestoring a particular relationship between signal levels and various colors, the filter-amplitude/color conversion circuit 80 transmits color-coded signals corresponding to amplitude signals delivered via the select switch 75.

The amplitude/color conversion circuit 79 comprises a ROM prestoring a particular relationship between signal levels and various colors.

In the above-described color conversion processes performed by the conversion circuits 76–78, amplitudes a of input data to be converted are referenced and only those input data that lie within the desired amplitude range established by the signal level range setters are subjected to conversion.

A frequency histogram generating circuit 81 generates a histogram representing a frequency distribution based on the frequency data fed from the frame memory 62; and a designating unit 82 for specifying and entering a desired searching area. A velocity vector generating circuit 83 determines a velocity vector for an area specified via a designating unit 84 based on the frequency data fed from the frame memory 64. Further, a selection circuit 85 makes a selection among output signals of the aforementioned circuits and transmits selected signal(s) to a display unit 86.

Now, ship velocity compensation will be described in the following. First, consideration is given to a case where one frame of data is once memorized and then compensated all together. (This type of compensation is hereinafter to as collective compensation.) In this case, the select switch 68 is switched to its unconnected terminal x so that Doppler frequencies fs are stored in the frame memory 62 without any compensation, and the select switches 73–75 are set to the positions shown by solid lines in Figure 18.

Figure 19:
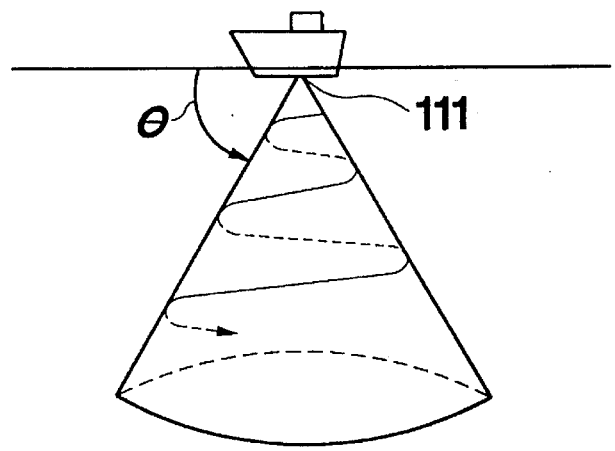
FIG. 19 is a diagram illustrating a search point tracking pattern formed when an ultrasonic receiving beam is rotated.
Figure 20:
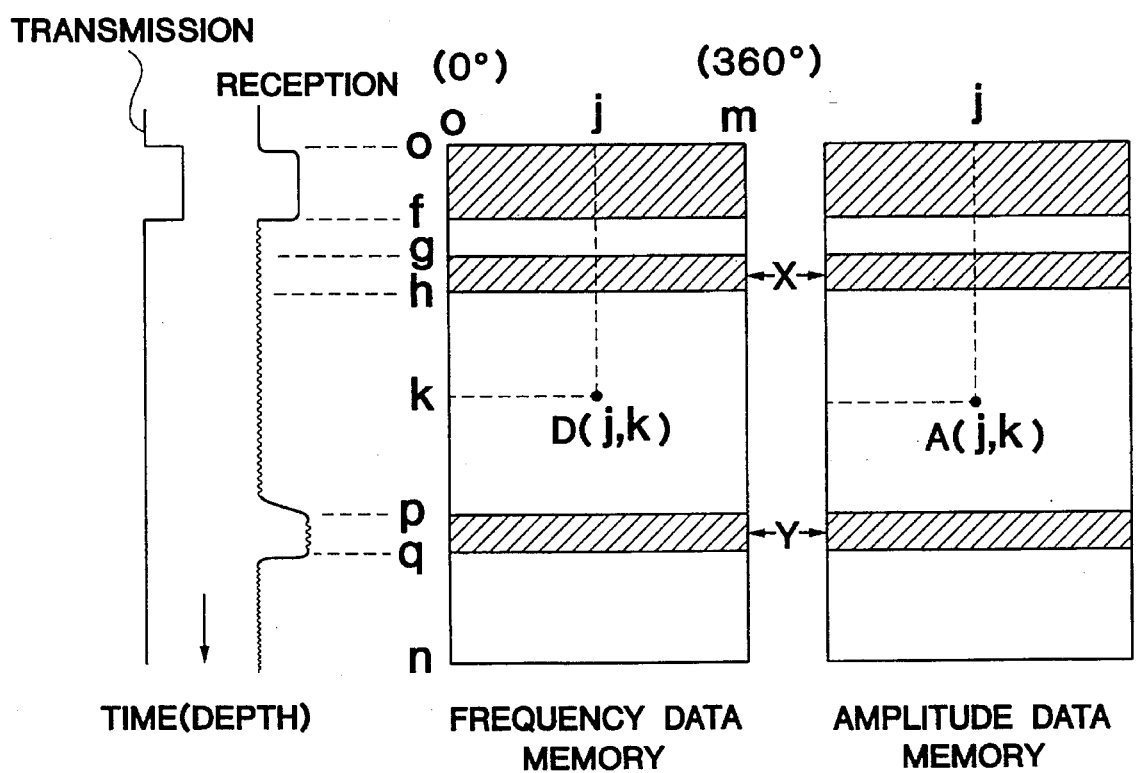
FIG. 20 shows address maps of frame memories employed in FIG. 18.

In an underwater detection sonar, an ultrasonic beam spreading in a cone-shaped form as illustrated in FIG. 19 is transmitted toward the sea bottom by the transmitting transducer 101 shown in FIG. 3 and resultant echoes are detected by the receiving transducer 1 which is rotated or scanned in operation. This means that the receiving transducer 1 scans through search points located along a spiral pattern on the conical surface as shown in FIG. 19. Data sequentially acquired with this form of scanning are written in the frame memory 62 without any compensation in this case. The frame memory 62 has a two-dimensional structure (which is same as the structure of the other frame memories) as shown in FIG. 20, where the bearing is taken in the horizontal direction and the range (or depth) is taken in the vertical direction. The acquired data are successively written in one line after another of the memory structure, starting from the upper-left memory location and proceeding toward the lower-right memory location. Referring to FIG. 20, data written in memory area X was derived from an early part of echoes (i.e., echoes from shallow water) received after one transmission, and it follows that this portion of data represents the Doppler frequency shift f2. On the contrary, data written in memory area Y was derived from an later part of echoes (i.e., echoes from a bottom at a greater depth) received after the transmission, and it follows that this portion of data represents the Doppler frequency shift f1. These memory areas X and Y are specified by the readout area designating unit 66 in this embodiment. In a modified arrangement, the memory area Y may be automatically determined depending on the bottom depth and tilt angle (φ shown in FIG. 19) of a transmitted ultrasonic beam. Although it has been assumed in the foregoing description that the carrier frequency measuring circuit 50 produces a fixed tilt angle, modification is possible to allow for a varying tilt angle. Specifically, in the configuration of FIG. 3 employing a pair of ultrasonic transducer elements 1*p* and 1*q* which are rotated mechanically, it is possible to obtain a desired tilt angle by varying their orientations. Also, in the configuration of FIG. 6 employing a circular array of ultrasonic transducer elements which are switched electrically to perform beam scanning, it is possible to obtain a desired tilt angle by way of phase synthesis, which would be accomplished by a plurality of receiving transducers 1' stacked vertically to construct a cylindrical transducer array with phase shifts applied to columns of transducer elements in every azimuthal direction. Of course, when an ultrasonic receiving beam is aimed in a horizontal direction (i.e., tilt angle zero), there will be no return echo from the sea bottom and it is impossible to obtain Doppler frequency shifts f1 originating from the over-the-ground ship velocity. In such a case, an over-the-ground ship velocity obtained from an external source is used as will be explained later.

Referring to FIG. 20, stored in a memory area corresponding to the range between 0 an f is a carrier signal of frequency f0 transmitted by the transmitting transducer 101. This is because a small part of the transmitted signal leaks through a trap circuit for transmit/receive switching (unillustrated) and is detected by the receiving transducer 1. It follows that the frequency f0 read from this memory area is delivered to the previously described subtracter 51 as a correction signal. With this configuration, adverse effects that may result from variations due to frequency drift of a transmitting crystal oscillator, phase errors in the receiver circuitry or variations in a sampling frequency are canceled out and it would be possible to obtain accurate Doppler frequency shifts fm.

Figure 21:
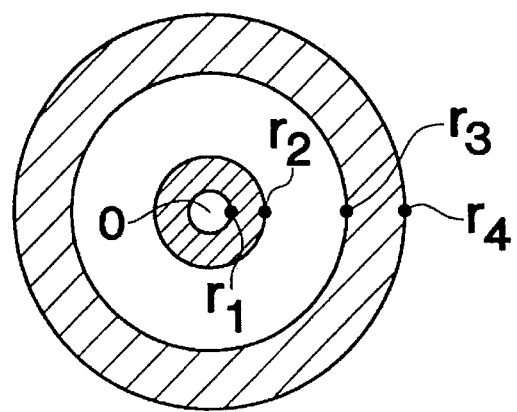
FIG. 21 is a display example presented on a display unit of FIG. 18.

Depicted in FIG. 21 is an example of presentation obtained with the above configuration, where detection results are displayed in a polar coordinate form around own ship at the central point O. The area between radial ranges r1 and r2 represents data within memory area X while the area between radial ranges r3 and r4 represents data within memory area Y. As radii r are specified by the readout area designating unit 66, it is possible to obtain individual Doppler frequency shift data attributed to over-the-ground and through-the-water ship velocities from memory locations of the frame memory 62 illustrated in FIG. 20.

Doppler frequency shifts f1(j) and f2(j) attributed to internal over-the-ground and through-the-water ship velocities in each individual direction are obtained by averaging data read from the memory areas X and Y along the range axis (D(j, k): k=p to q for over-the-ground ship velocity; k=g to h for through-the-water ship velocity) in every horizontal direction (D(j, k): j=0 to m), substituting the data into equations (31) and (32).

$$f1(j) = \frac{\sum_{k=p}^{q} A(j, k) \cdot D(j, k)}{\sum_{k=p}^{q} A(j, k)}$$

or, substituting A(j, k)=1, $$f1(j) = \frac{\sum_{k=g}^{h} D(j, k)}{h - g + 1} \quad (31)$$

$$f2(j) = \frac{\sum_{k=g}^{h} A(j, k) \cdot D(j, k)}{\sum_{k=g}^{h} A(j, k)}$$

or, substituting A(j, k)=1, $$f2(j) = \frac{\sum_{k=p}^{g} D(j, k)}{q - p + 1} \quad (32)$$

If the select switch 72 is set at the internal over-the-ground ship velocity position as shown in FIG. 18, Doppler frequency shift data f1 for compensation by the over-the-ground ship velocity is sent to the ship velocity compensation circuit 71. In this case, Doppler frequency shift fe showing the over-the-ground velocity of a target is obtained by subtracting Doppler frequency shift f1(j) attributed to the over-the-ground ship velocity in a direction corresponding to every raw data D(j, k) (where j=0 to m; k=0 to n) read from the frame memory 62. Thus, $$fe(j, k) = D(j, k) - f1(j) \quad (33)$$

Contrarily, if the select switch 72 is set at the internal through-the-water ship velocity position, Doppler frequency shift fw showing the through-the-water velocity of a target is obtained by subtracting Doppler frequency shift f2(j) attributed to the through-the-water ship velocity in a direction corresponding to every raw data D(j, k) (where j=0 to m; k=0 to n) read from the frame memory 62. Thus, $$fw(j, k) = D(j, k) - f2(j) \quad (34)$$

According to the above-described collective compensation, correction data f1(j) and f2(j) are obtained after acquiring one frame of data D(j, k) and the whole frame of data D(j, k) are compensated with the correction data. In this compensation process, there arises a time delay equal to one transmission cycle. Described next is a ship velocity compensation process where obtained data is successively compensated. (This type of compensation is hereinafter referred to as sequential compensation.)

In the case of sequential compensation, the select switch 68 is set at the internal over-the-ground or through-the-water ship velocity position while the select switch 73 is set at the position shown by a dashed line in FIG. 18. (The interlocked select switches 74 and 75 are also set at the positions shown by dashed lines.) Doppler frequencies fs time-sequentially supplied from the subtracter 51 are compensated in real time by the ship velocity compensation circuit 61 and compensated data are stored in the frame memory 62 while they are outputted directly to the frequency/color conversion circuit 76 via the select switch 73.

If the select switch 68 is set at the internal through-the-water ship velocity position, carrier frequency data f already compensated with a correction value f2[n−1] are sequentially stored in the frame memory 62 starting from its upper-left memory location as already described referring to FIG. 20. When carrier frequency data f affected by the through-the-water ship velocity have been stored up to the memory area X, f2(j) is calculated by substituting those data into equation (32). Then, adding the previous correction value f2[n−1](j) to f2(j), the sum f2[n]=f2(j)+f2[n−1](j) is sent to the ship velocity compensation circuit 61 as new correction data. Accordingly, Doppler frequency shifts fs compensated with the new correction data are that part of input data which occur after the memory area X shown in the address map of FIG. 20 and input data occurring up to the memory area X are compensated with correction data obtained previously (i.e., one transmission cycle earlier).

On the contrary, if the select switch 68 is set at the internal over-the-ground ship velocity position, the internal ship velocity based correction value calculator 65 calculates Doppler frequency shift f1 to be used as correction data based on the over-the-ground ship velocity when frequency data have been stored up to the memory area Y shown in FIG. 20. Accordingly, Doppler frequency shifts fs compensated with the new correction data are that part of input data which occur after the memory area Y shown in the address map of FIG. 20 and input data occurring up to the memory area Y are compensated with correction data obtained in a preceding transmission cycle. It would be understood from the above discussion that although the sequential compensation method provides corrected measurement data on a real-time basis, correction data used for ship velocity compensation is not derived from the latest measurement data. Nevertheless, there is formed a data correcting loop and correction data is continually updated so that reasonably accurate, real-time ship velocity compensation can be expected from the sequential compensation method.

In the collective compensation and sequential compensation methods so far described, the ship velocity compensation/display circuit 100 compensates input data by using correction data derived from its own input data. Described below is a external compensation method in which ship velocity compensation is performed by the use of ship velocity information obtained from external equipment. This compensation method is useful when the over-the-ground or through-the-water velocity can not be obtained internally due to unfavorable measuring conditions, for example.

If the select switch 68 is set at the external over-the-ground ship velocity position, over-the-ground ship velocity V1 (in horizontal direction θ) and ship's heading α are entered from external equipment comprising a GPS receiver and a gyrocompass, for example, into the external ship velocity based correction value calculator 67. Then, using the over-the-ground ship velocity V1, the external ship velocity based correction value calculator 67 calculates an over-the-ground ship velocity component V1(j) for each individual horizontal direction from equation (35) below:

$$V1(j)=V1\cdot\cos(\alpha+2\pi j/m-\theta) \quad (35)$$

where j=0, 1, 2 ... m.

A subsequent mathematical operation derives a Doppler frequency f1(j) corresponding to the over-the-ground ship velocity component V1(j) taken in each individual horizontal direction. Using the Doppler frequency f1(j) as correction data, the ship velocity compensation circuit 61 calculates a Doppler frequency shift fe(j, k) of a target echo due to the over-the-ground ship velocity from previously described equation (33) and the Doppler frequency shift fe(j, k) is sent to the select switch 73. If the tilt angle is β, the over-the-ground ship velocity component VI(j) becomes $$V1(j)=V1\cdot\cos(\alpha+2\pi j/m-\theta)\times\cos\beta \quad (36)$$

If the select switch 68 is set at the external through-the-water ship velocity position, through-the-water ship velocity V2 is entered from external equipment comprising a water current measuring apparatus, for example, into the external ship velocity based correction value calculator 67. A through-the-water ship velocity component V2(j) for each individual horizontal direction is derived from the through-the-water ship velocity V2 in a manner similar to what was explained already and a Doppler frequency f2(j) corresponding to the through-the-water ship velocity component V2(j) is calculated. Then, a carrier frequency fw(j, k) of a target echo attributed to the through-the-water ship velocity is calculated using equation (34). The external compensation method described above enables real-time ship velocity compensation (hereinafter referred to as real-time compensation) since instantaneous ship velocity information is fed from external equipment.

Now, an alternative method of calculating Doppler frequency shifts f1 and f2 will be described in the following.

Doppler frequency shifts f1 and f2 attributed to over-the-ground and through-the-water ship velocities obtained for individual horizontal directions from equations (31) and (32) should vary in accordance with a cosine curve as expressed by equation (35) in theory, but in actuality they do not follow the cosine curve pattern as a result of noise, for example, and accurate frequency shift data is unobtainable in certain cases. Using f1 and f2 values given by equations (31) and (32), it is possible to estimate cosine curves which allow more accurate estimation of f1 and f2.

To estimate a cosine curve from Doppler frequency shifts f1 obtained from equation (31), V(j) is expressed as $$V(j)=V\cdot\cos(2\pi j/m-\theta) \quad (37)$$

where j=0, 1, 2 ... m. Using equation (37), V and θ which minimize the sum Q of squared of differences given by equation (38) below are obtained:

$$Q=\sum_j \omega j\{V1(j)-f1(j)\}^2 \quad (38)$$

where ωj is a weight function expressed by $$\sum_{k=p}^{q} A(j,k)$$

of equation (31), for example.

Substituting results of the above operation into (36), a cosine curve can be estimated. This cosine curve is used to calculate f1(j) for ship velocity compensation. Also, f2(j) is estimated in a similar way.

Doppler frequency shifts fe and fw (hereinafter referred to as frequency data f) corrected against over-the-ground (or through-the-water) ship velocities in any of the above-described compensation modes (collective and sequential compensations) are delivered to the frequency/color conversion circuit 76 via the select switch 73. Using individual values of the frequency data f, it is possible to determine the over-the-ground (or through-the-water) velocity components (hereinafter referred to as velocity) of targets in the direction of own ship as well as their moving directions (i.e., whether they are approaching or receding from own ship). Based on such information, the frequency/color conversion circuit 76 performs a conversion of data into 8 colors according to a scheme shown in the Table 1 below for simultaneous presentation of moving velocities and directions of targets on the display unit 86.

Also used in the above-described color conversion process is amplitude data a associated with the frequency data f. Delivered via the select switch 75, the amplitude data a defines an amplitude range, and only that part of the frequency data f limited by the amplitude range goes through the color conversion process. Similar amplitude range limitation is done in color conversion processes performed by the variance/color conversion circuit 77 and frequency-variance/color conversion circuit 78 as well.

TABLE 1

| Moving velocity: | High | | | 0 | | | | High |
|---|---|---|---|---|---|---|---|---|
| Moving direction: | (Approaching) | | | (Not moving) | | | (Receding) | |
| 8-bit data: | 0 | | ... | 128 | | | ... | 255 |
| Displayed color: | Brown | Red | Orange | Yellow | Green | Blue | Purple | Deep blue |

According to the above Table, if a target is stationary, it appears as yellow or green. If the target is approaching, it is painted in a warm color such as brown, red or orange depending on its moving velocity whereas if the target is receding, it is shown in a cool color such as deep blue, purple or blue depending on its moving velocity. To allow for clear discrimination between moving targets and stationary targets, color assignments may be modified so that stationary targets are represented by a grayish color, for instance.

Figure 22:
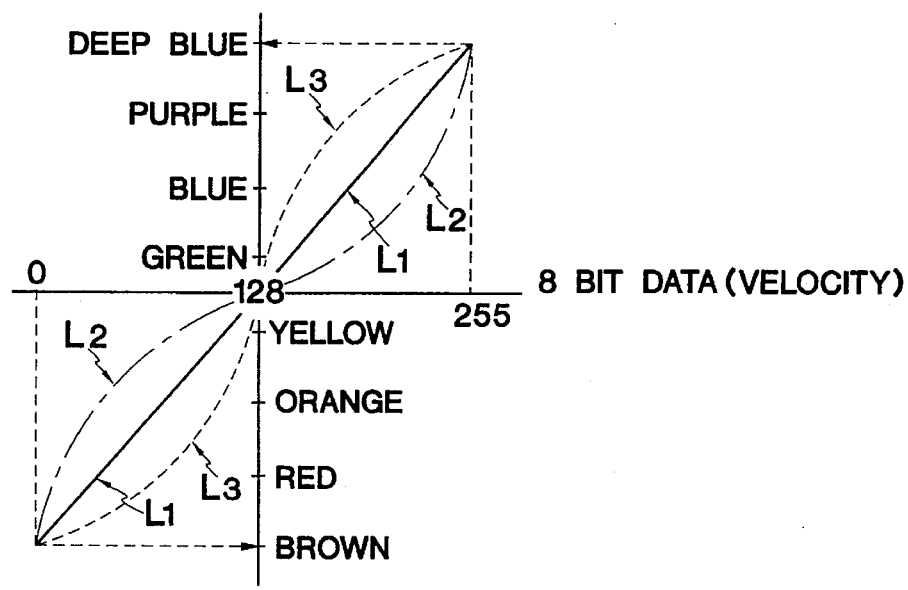
FIG. 22 is a diagram depicting an example of color conversion performed by a frequency/color conversion circuit of FIG. 18.

Furthermore, when using 16 display colors, intermediate colors may be inserted between the above-mentioned color assignments. For 16-color presentation, the frequency data f which is typically expressed by 8-bit data (256 steps) must be converted into 4-bit data (16 steps). Conversion of the 8-bit data into color codes is typically performed using a linear function as depicted by a line L1 in FIG. 22. Alternatively, color conversion may be accomplished in accordance with a parabola L2 or an exponential curve L3 shown in FIG. 20 so that a certain velocity range is enhanced or suppressed. Whichever conversion scheme is used, information about a relationship between 8-bit data and color codes is read from a ROM which stores a color assignment data.

The following discussion deals with variance. As already mentioned, information on moving velocities of a fish schools acquired through an analysis of fish echo frequencies is useful for fishing operation using a sonar or an echo sounder. The moving velocity of a fish school accounts for the average velocity of individual fish in the school. It is to be noted that variations (or deviations in the moving velocities of individual fish in the school also provide important information for recognition of the fish school itself and determination of fish species and lengths. Furthermore, knowing velocity deviations would held discriminate a swarm of underwater targets from absolutely stationary objects (e.g. sea bottom). Circuit configuration of the variance calculating circuit 69 which is intended to derive variance data from the distribution of the aforementioned carrier frequency data f will be described in the following.

Figure 23:
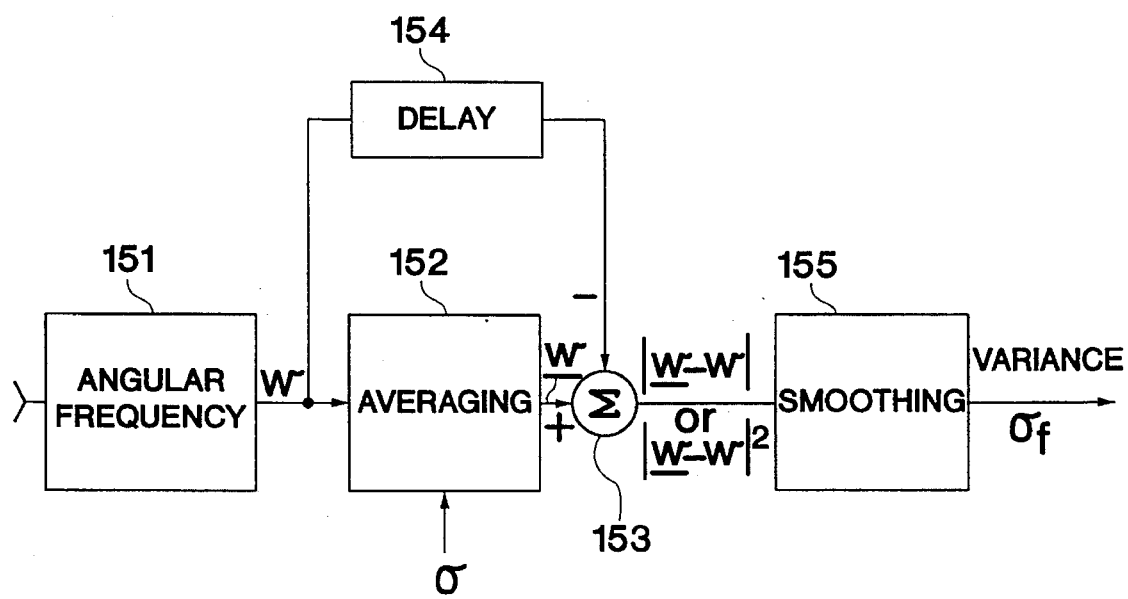
FIG. 23 is a control block diagram of a variance calculating circuit employed in FIG. 18.

Referring to FIG. 23, Doppler frequency shifts fm fed from the ship velocity compensation circuit 61 of FIG. 18 are converted into angular frequencies ω by an angular frequency calculating circuit 151. Next, an averaging circuit 152 calculates an average angular frequency (hereinafter written as $\underline{\omega}$), which is delivered to an adding input of a summing circuit 153. On the other hand, unaveraged angular frequencies ω are retarded by a delay circuit 154 by a time period equivalent to a delay time occurring in the averaging circuit 152 before they are delivered to a subtracting input of the summing circuit 153. The output |ω–$\underline{\omega}$| (or |ω–$\underline{\omega}$|$^2$) of the summing circuit 153 is smoothed out by a smoothing circuit 155 to obtain a variance σf. In the averaging process performed by the averaging circuit 152, input data may be weighted with amplitudes a to produce a weighted average.

Figure 24:
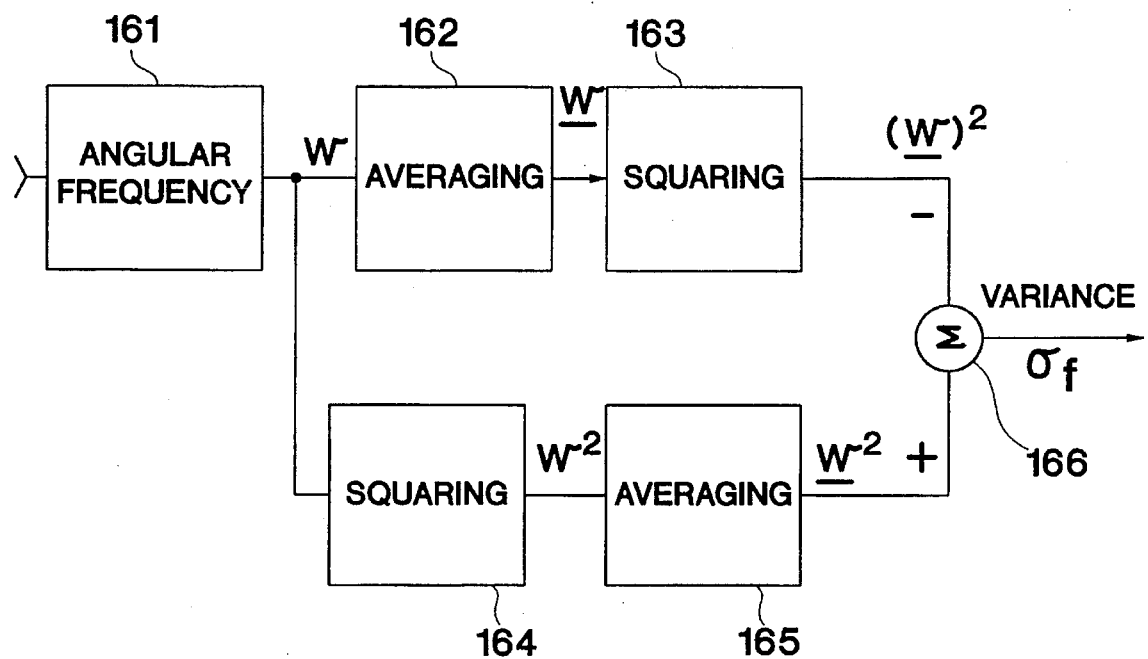
FIG. 24 is another control block diagram of the variance calculating circuit employed in FIG. 18.

FIG. 24 shows an alternative circuit configuration of the variance calculating circuit 69. Doppler frequency shifts fm are converted into angular frequencies ω by an angular frequency calculating circuit 161. An averaging circuit 162 calculates an average angular frequency (hereinafter written as $\underline{\omega}$) and a squaring circuit 163 calculates its square ($\underline{\omega}$)$^2$. On the other hand, a squaring circuit 164 calculates squares ω$^2$ of angular frequencies ω and an averaging circuit 165 averages these squares $\underline{\omega^2}$. Then, a summing circuit 166 performs a subtraction $\underline{\omega^2}$–($\underline{\omega}$)$^2$ no obtain a variance σf.

The variance calculating circuit 69 calculates the variance of Doppler frequency shifts fm (raw data in collective compensation, corrected data in sequential compensation and real-time compensation) outputted from the ship velocity compensation circuit 61 as described above. The variance data thus obtained is transmitted to the select switch 74 while it is written in the frame memory 70. The variance data coming directly from the variance calculating circuit 69 or read from the frame memory 70 is delivered to the variance/color conversion circuit 77 via the select switch 74. At this point, color data is read from a conversion data ROM which is similar to the already described one in accordance with individual variance values and the display unit 86 presents a color-coded variance data picture.

As the frequency-variance/color conversion circuit 78 converts each combination of frequency data f and variance data σf into a corresponding unique color, it is possible to simultaneously evaluate the frequency and variance from one picture presented on the display unit 86. An example of color conversion scheme is shown in the Table below. When the variance is small, the presentation is successively changed in the order of red, . . . gray, . . . and blue corresponding to the maximum approaching velocity, minimum (zero) velocity and maximum receding velocity, respectively, and as the variance grows larger, green is mixed to these colors at an increasingly higher ratio.

TABLE 2

| Moving velocity:<br>Moving direction: | | High<br>(Approaching)<br>Red | | 0<br>(Not moving)<br>Gray | | High<br>(Receding)<br>Blue |
|---|---|---|---|---|---|---|
| | (Small variance) | . | | . | | . |
| Displayed color: | | . | | . | | . |
| | | . | | . | | . |
| | (Large variance) | Yellow | . . . | Green | . . . | Cyan |

The filter-amplitude/color conversion circuit 80 is provided with a filtering function to permit color conversion of only such input data of which frequencies fall within a desired frequency range. This frequency range is determined with reference to Doppler frequency shifts fm. If it is set to the system frequency bandwidth of the underwater detection system, for example, amplitude data a found only within this frequency range are color-converted, in which case interference from signals of other frequency ranges would be rejected. Alternatively, by allowing color conversion of only such signals exceeding a specified frequency (velocity), influence of stationary targets such as the sea bottom can be eliminated.

Figure 25:
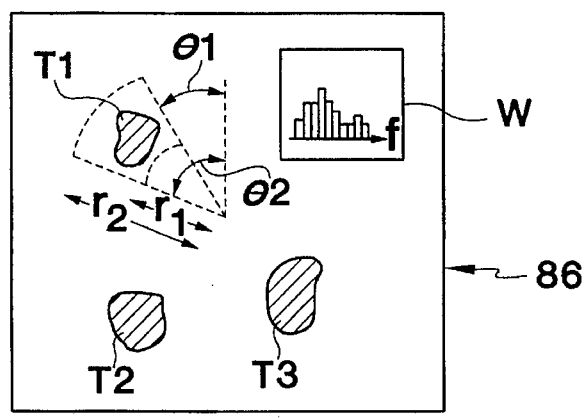
FIG. 25 is a diagram showing a display example where a histogram is inset within a target velocity picture presented on the display unit.
Figure 26:
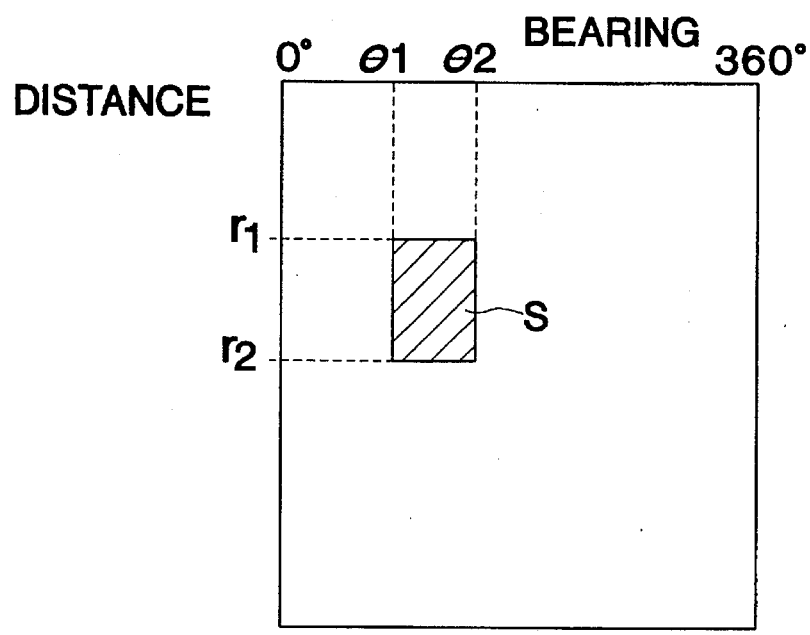
FIG. 26 is a diagram showing addresses within a frame memory corresponding to an area specified in FIG. 25.

The following discussion deals with a histogram presentation. FIG. 25 shows an example of a target velocity picture produced by the frequency/color conversion circuit 76 as presented on the display unit 86. It is assumed that targets T1 and T3 are detected at present. If an operator wants to know a frequency (velocity) distribution of the target T1, he should enter parameters to specify an area (i.e., bearing limits θ1–θ2 and range limits r1–r2) where the target T1 is displayed via the designating unit 82. As a result, the frequency histogram generating circuit 81 reads frequency data f from a memory area S (corresponding to the operator-specified area) of the frame memory 62 as depicted in FIG. 26 and a frequency distribution is derived from the frequency data f. Then, a histogram representing the frequency distribution is displayed as shown in a display window W in FIG. 25.

In the various forms of presentations described above, Doppler frequency shifts fm compensated against own ship's velocity are adopted as input data for the frequency/color conversion circuit 76 and other circuits 77, 78, 81, 83. In an alternative approach, Doppler frequency shifts fm uncompensated against own ship's velocity may be adopted as input data. In this case, the select switch 68 should be set to its unconnected terminal x and raw data outputted from the ship velocity compensation circuit 61 or stored in the frame memory 62 should be used as input data.

The amplitude/color conversion circuit 79 converts its input data into different colors depending on amplitude levels to produce an ordinary amplitude level picture.

Figure 27:
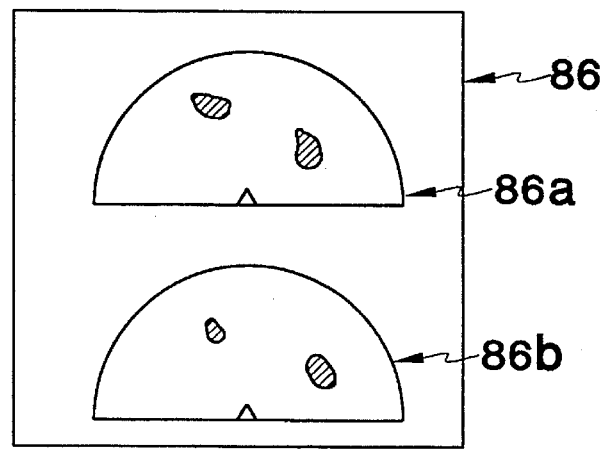
FIG. 27 is a diagram illustrating a display example where an amplitude level picture and a target velocity picture presented simultaneously.

In the aforementioned display examples, the selection circuit 85 selects one of the outputs of the individual conversion circuits 77–80, frequency histogram generating circuit 81 and velocity vector generating circuit 83 and the display unit 86 presents a single picture (single display mode). In a varied form of presentation, the display unit 86 may simultaneously present an amplitude level picture 86a fed from the amplitude/color conversion circuit 79 on an upper half of the screen and a target velocity picture 86b fed from the frequency/color conversion circuit 76 on a lower half of the screen (combination display mode), as shown in FIG. 27, for instance. This arrangement allows for a direct comparison between two different pictures, which would serve to further enhance target discriminating capabilities.

Now, the following discussion deals with a technique for increasing the resolution.

Figure 28:
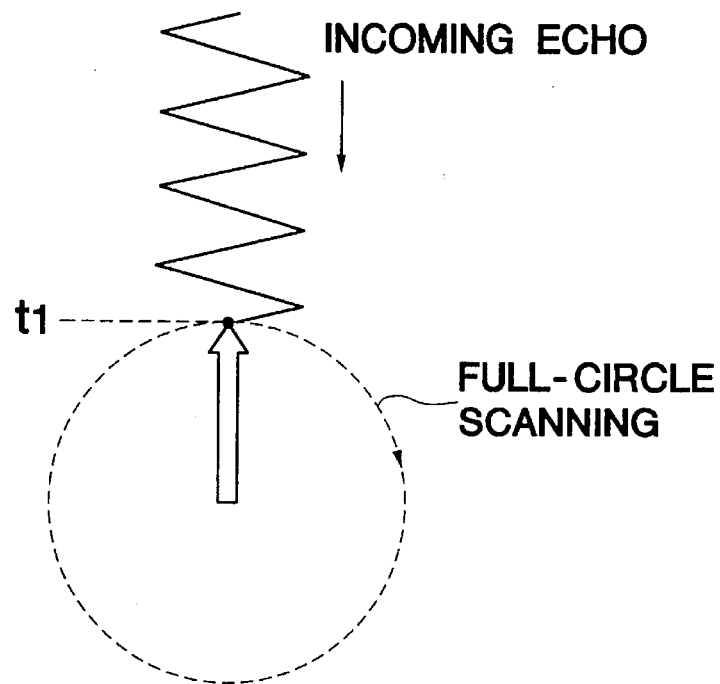
FIG. 28 is a diagram showing the timing of detecting arriving echoes when the ultrasonic receiving beam is rotated throughout a full circle.
Figure 29:
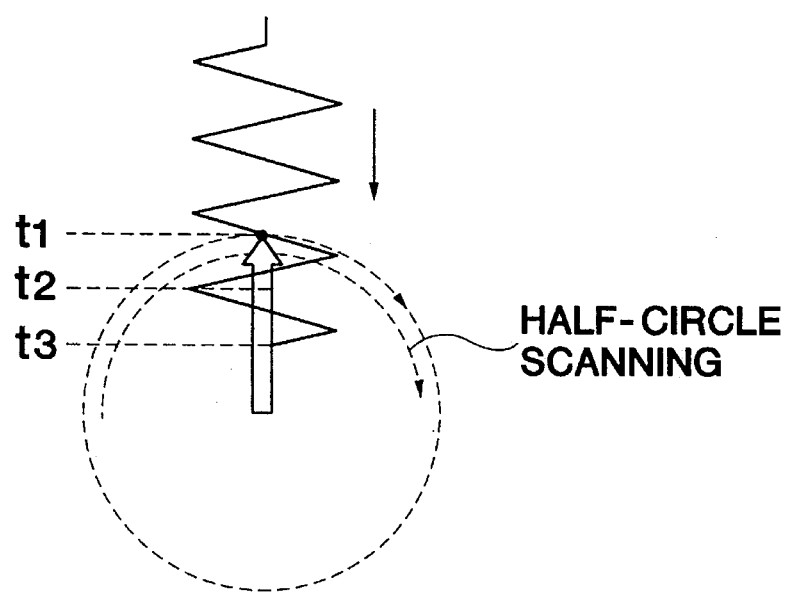
FIG. 29 is a diagram showing the timing of detecting arriving echoes when the ultrasonic receiving beam is rotated throughout a half circle.

Generally, the system resolution for distinguishing between adjacent target echoes depends on the scanning speed of the ultrasonic receiving beam. However, there is a limit to the effort to achieve higher scanning speeds due to limitations in processing speeds of later-stage electric circuitry. Referring to FIG. 28, an arrow Y shows the direction of an ultrasonic receiving beam formed by the receiving transducer 1' of FIG. 6, for example. Here, it is assumed that each successive rotation of the ultrasonic receiving beam Y takes 80 msec. Provided that the ultrasonic receiving beam Y has detected an echo at time t1 in the direction of the arrow, it would detect a succeeding echo 80 msec later, or at time t3, in the same direction as shown in FIG. 29. It would be understood from the above consideration that the ultrasonic receiving beam Y can just detect arriving echoes at 80 msec intervals in each direction, which means that there are certain losses of echo information.

One approach to solve the above problem is to control the switching circuits 7p and 7q to have them switch the ultrasonic transducer elements s in such a way as to provide a narrower searching area as shown in FIG. 29, where half-circle scanning is performed instead of full-circle scanning. This arrangement would reduce echo detecting intervals to 40 msec, resulting in twice as high a sampling rate. In this case, the system resolution is also doubled because an echo arriving at time t2 can additionally be detected. Further, if the searching area is narrowed to a 45° sector, the echo detecting intervals become 10 msec, which would serve to increase the system resolution 8 times as high as obtained with full-circle scanning. Detailed echo information can be obtained by increasing the resolution in the above manner. This would permit an enlarged presentation of detection results, making it possible to further enhance target discriminating capabilities.

Figure 30:
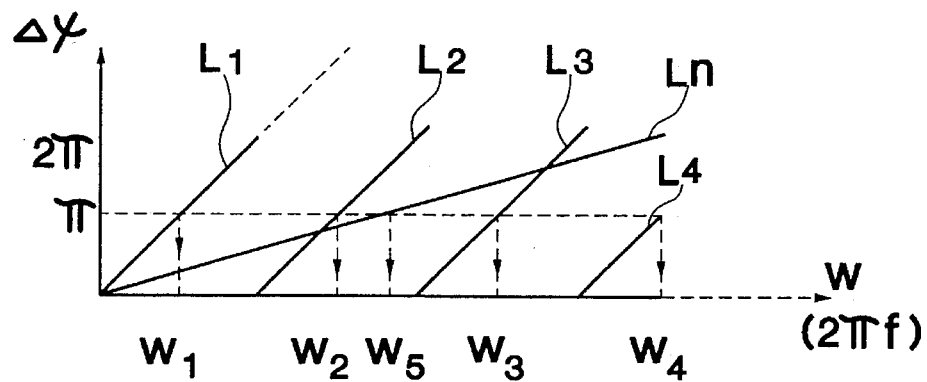
FIG. 30 is a diagram showing a relationship between detected phase differences $\Delta\psi$ and corresponding angular carrier frequencies $\omega$.

In the system of FIG. 3, for example, the phase difference detecting circuit 12 calculates the phase difference $\Delta\psi$ ($0 \leq \Delta\psi \leq 2\pi$) between two signals detected by a pair of ultrasonic receiving beams which are separated by an angular deviation of $\theta$ (which corresponds to a time difference $\tau$) from each other. As is apparent from the relationship $\Delta\psi=\omega\cdot\tau$, the phase difference $\Delta\psi$ is proportional to the angular carrier frequency $\omega$ as shown by line L1 in FIG. 30. However, the phase difference $\Delta\psi$ outputted from the phase difference calculating circuit 12 can just take values within the range $0 \leq \Delta\psi \leq 2\pi$. Therefore, when the phase difference $\Delta\psi$ reaches $2\pi$ with the increase in the angular carrier frequency $\omega$, the phase difference $\Delta\psi$ returns to zero and then increases again along line L2. The phase difference $\Delta\psi$ varies periodically thereafter along lines L3, L4 and so on. It would therefore be recognized that when the outputted phase difference $\Delta\psi$ equals $\pi$, for example, it is not possible to determine whether the actual angular carrier frequency is $\omega_1$, $\omega_2$, $\omega_3$, $\omega_4$ or else. One approach to eliminate this ambiguity is to reduce the value of $\tau$ so that zero resetting of the phase difference $\Delta\psi$ could be avoided as shown by line Ln. This approach will make it possible to determine a unique angular carrier frequency $\omega_5$ corresponding to each individual value of the phase difference $\Delta\psi$. However, as will be discussed later, a smaller value of $\tau$ would act to increase errors contained in the obtained angular carrier frequency $\omega_5$, making accurate measurement results unattainable.

This invention employs the following method to solve the above problem.

A plurality of angular carrier frequencies $\omega x$ resulting from the zero resetting of the phase difference $\Delta\psi$ when there is a time difference of $\tau_1$ between angular positions of the two ultrasonic receiving beams are given by the following equation:

$$\omega x = \Delta\psi_1/\tau_1 \pm n(\omega\tau_1) \tag{39}$$

where $\omega\tau_1 = 2\pi/\tau_1$.

Substituting $\Delta\psi_1 = \Delta\psi_{10} + \Delta\phi_1$ (where $\Delta\psi_{10}$ and $\Delta\phi_1$ are a true value and an error of $\Delta\psi_1$, respectively), $$\omega x = \Delta\psi_{10}/\tau + \Delta\phi_1/\tau_1 + n(\omega\tau_1) \tag{40}$$

Figure 31:
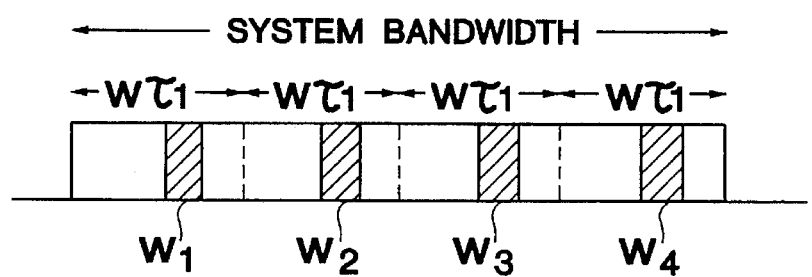
FIG. 31 is a diagram showing the bandwidths of four angular carrier frequencies $\omega 1$ to $\omega 4$ obtained within a system frequency bandwidth as a result of zero resetting of the phase difference $\Delta\psi$ shown in FIG. 30.

Here, it is assumed that four angular carrier frequencies $\omega_1$, $\omega_2$, $\omega_3$ and $\omega_4$ have been found within the system frequency bandwidth as illustrated in FIG. 31. The individual angular carrier frequencies $\omega x$ are shown with certain widths in FIG. 31. This is because they contain certain errors expressed by the second term ($\Delta\phi_1/\tau_1$) of the right side of equation (40).

Angular carrier frequency $\omega_5$ which would be obtained when the time difference between the two ultrasonic receiving beams is set to an appropriate value $\tau_2$ ($<\tau_1$) to avoid zero reset points is given by the following equation:

$$\omega_5 = \Delta\psi_2/\tau_2 \tag{41}$$

Substituting $\Delta\psi_2 = \Delta\psi_{20} + \Delta\phi_2$ (where $\Delta\psi_{20}$ and $\Delta\psi_2$ are a true value and an error of $\Delta\psi$, respectively), $$\omega_5 = \Delta\psi_{20}/\tau + \Delta\phi_2/2 \tag{42}$$

Figure 32:
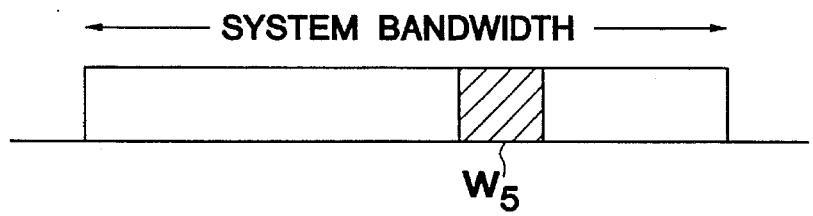
FIG. 32 is a diagram showing the bandwidth of an angular carrier frequency $\omega 5$ obtained within the system frequency bandwidth when the zero resetting shown in FIG. 30 is avoided.

In this case, a unique value of the angular carrier frequency $\omega_5$ can be determined within the system frequency bandwidth as illustrated in FIG. 32. The angular carrier frequency $\omega_5$ thus obtained also contains an error expressed by the second term of the right side of equation (42). This error ($\Delta\phi_2/\tau_2$) is larger than the aforementioned error ($\Delta\phi_1/\tau_1$) since the value $\tau_2$ is smaller than the value $\tau_1$. Thus, although a unique value of the angular carrier frequency $\omega_5$ can be determined using a smaller time difference $\tau_2$, an exact value is not obtainable yet.

However, it would be recognized from a comparison between FIGS. 31 and 32 that among the four angular carrier frequencies ω1, ω2, ω3 and ω4, the true value is ω3 as it alone is contained in the span of the angular carrier frequency ω5. Specifically, the angular carrier frequency ω3 can be determined to be true by passing each combination of the angular carrier frequencies of FIGS. 31 and 32 through an AND gate.

Figure 33:
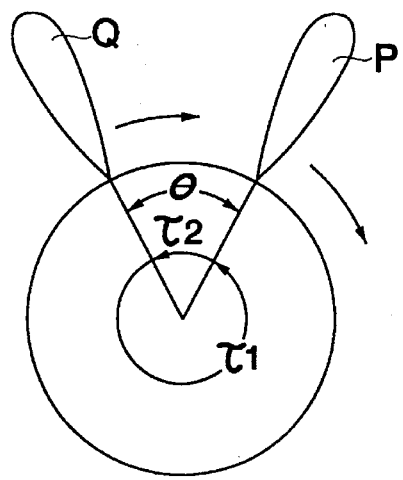
FIG. 33 is a diagram showing two phase differences obtained with two ultrasonic receiving beams.

To obtain two different time differences τ1 and τ2 (<τ1) with the two rotating ultrasonic receiving beams P and Q, a time difference resulting from the angular deviation θ between the two beams should be τ2 and a time difference resulting from the remaining angle (2 π–θ) should be τ1, as shown in FIG. 33. Alternatively, the longer time difference τ1 should be made equal to Tfs or Tfs+τ2, where Tfs is the period of rotation of the individual beams.

Figure 34:
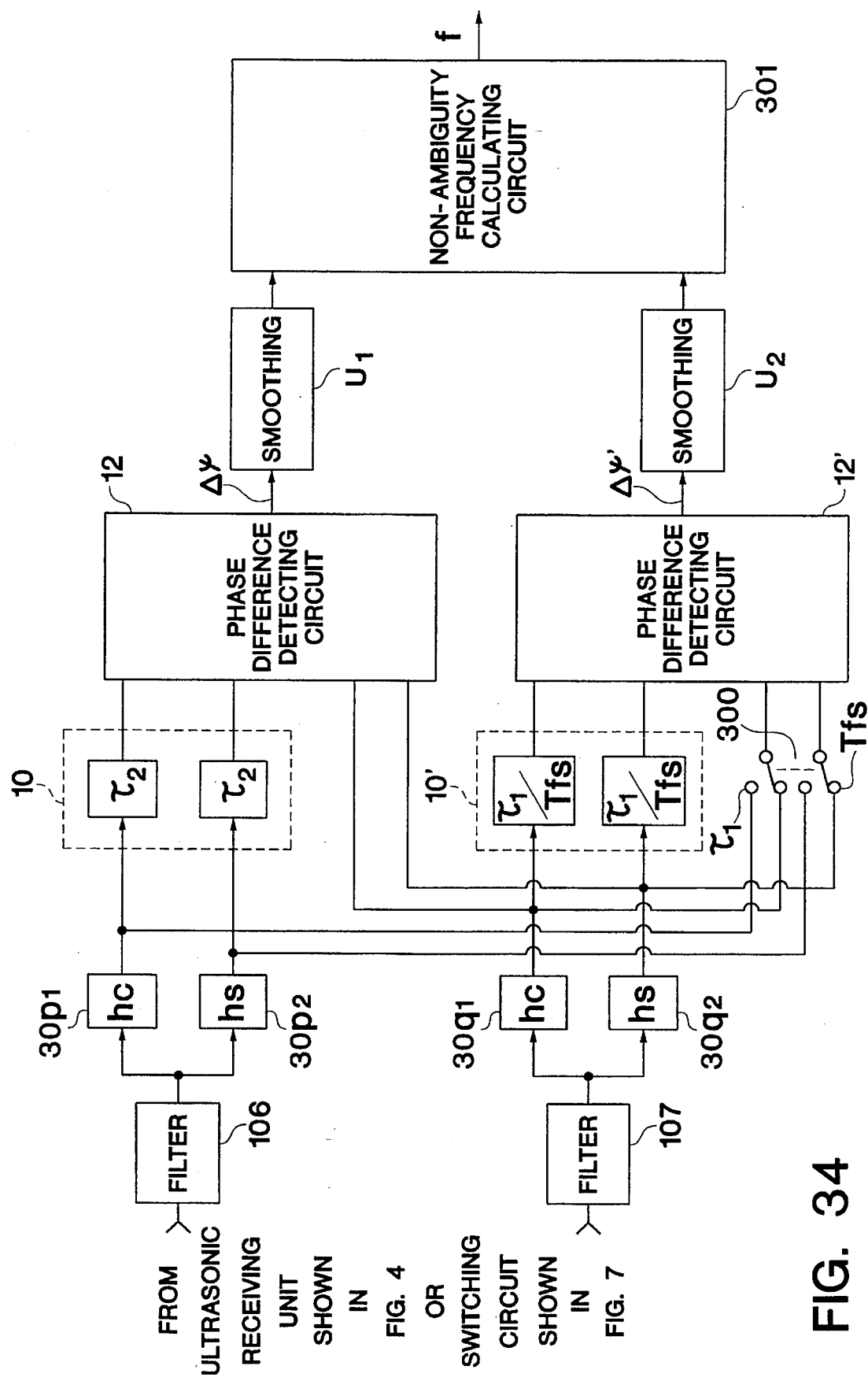
FIG. 34 is a control block diagram showing a circuit configuration for obtaining two phase differences with two ultrasonic receiving beams.

FIG. 34 shows a circuit example which can realize the above arrangement. Although the circuit example of FIG. 34 is typically applicable to a matched filter type carrier frequency measuring circuit shown in FIG. 4 or 7, it is also applicable to other types of carrier frequency measuring circuits. In FIG. 34, there are additionally provided a phase difference calculating circuit 12' and a delay circuit 10 for introducing a time delay of τ1 or Tfs before the phase difference calculating circuit 12'. Furthermore, there is provided a select switch 300 for selecting inputs to the phase difference calculating circuit 12' depending on whether the delay time of the delay circuit 10' is set to τ1 or Tfs. As already described, a unique, but not so accurate, angular carrier frequency ω' is obtained within the system frequency bandwidth from phase difference Δψ outputted from the phase difference calculating circuit 12 of which inputs involve a smaller time difference τ2. On the other hand, a plurality of angular carrier frequencies ωx are obtained from phase difference Δψ' outputted from the phase difference calculating circuit 12' of which inputs involve a larger time difference τ1 or Tfs.

A non-ambiguity frequency calculating circuit 301 calculates a unique angular carrier frequency ω, or carrier frequency f, from each combination of phase differences Δψ and Δψ' by using the above-described technique. Indicated by U1 and U2 are smoothing circuits for averaging successive phase difference values Δψ and Δψ' outputted from the phase difference calculating circuits 12 and 12', respectively. This averaging process serves to increase the measuring accuracy.

In the above-described embodiments, carrier frequency data is converted into a Doppler frequency shift signal by the use of a subtracter before executing various operations such as ship velocity compensation and variance assessment. In a modified form of embodiment, it is possible to execute these operations on the carrier frequency data without converting it into a Doppler frequency shift signal.

Although the above-described embodiments utilize a Doppler frequency shift signal and carrier frequency data, it is obviously possible to utilize an angular Doppler frequency shift and angular carrier frequency data instead.

Now, operation of the velocity vector generating circuit 83 will be explained in the following.

Figure 35:
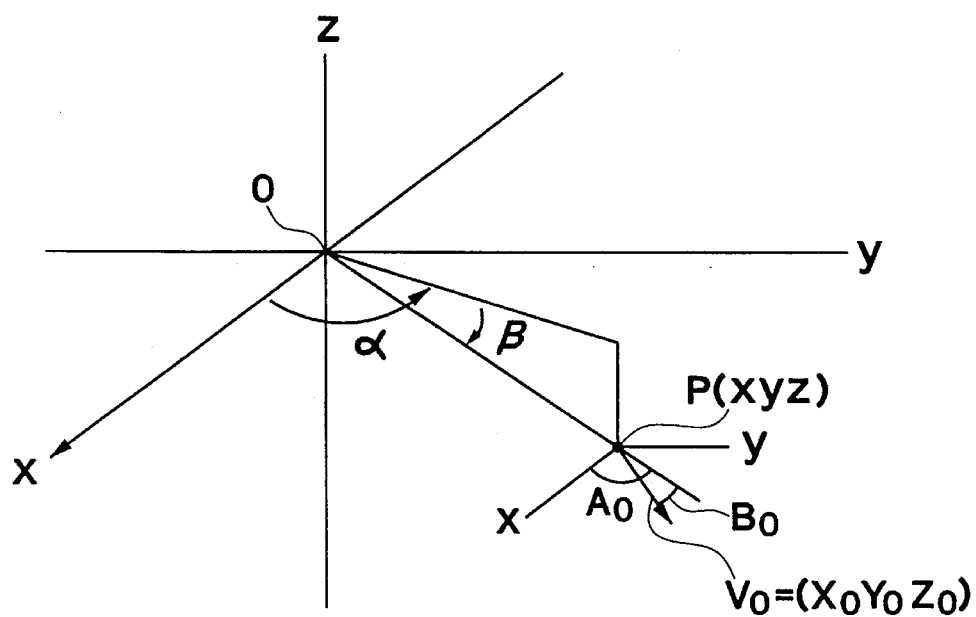
FIG. 35 is a diagram illustrating how a three-dimensional velocity vector is obtained.

Referring to FIG. 35, there is shown a perpendicular coordinate system x-y-z. It is assumed that there is a target moving at a relative velocity of $V_0$ centering close around point P(x, y, z) which is located at a horizontal angle α relative to the x-direction, a tilt angle β, and a distance r from an observation point taken at the origin O. In the following discussion, underscores are used to denote vectors. The velocity $V_0$ has a direction defined by a horizontal angle $A_0$ from the x-axis and a tilt angle $B_0$. Individual coordinates of the point P(x, y, z) and velocity $V_0(X_0, Y_0, Z_0)$ can be expressed as follows using their polar coordinates (r, α, β) and ($V_0$, $A_0$, $B_0$):

$x = r \cdot \cos \beta \cos \alpha$ $y = r \cdot \cos \beta \sin \alpha$ $z = r \cdot \sin \beta$ \hfill (43)

$X_0 = V_0 \cdot \cos B_0 \cos A_0$ $Y_0 = V_0 \cdot \cos B_0 \sin A_0$ $Z_0 = V_0 \cdot \sin B_0$ \hfill (44)

It is assumed that an ultrasonic pulse is emitted from the observation point O, a return echo from the target at point P is picked up by a directional receiving beam aligned in the direction of line OP, and the distance r and Doppler frequency shift are calculated. Velocity v(OP, V0) obtained from the Doppler frequency shift is a projection of the velocity V0 upon the line OP. Thus, $v(OP, V_0) = V_0 \cdot (OP/r) = (xX_0 + yY_0 + zZ_0)/r$ \hfill (45)

where underscores are used to denote vectors and OP/r is a unit vector.

Substituting equations (43) and (44) into equation (45), $v(OP, V_0) = V_0(\cos B_0 \cos A_0 \cos \beta \cos \alpha + \cos B_0 \sin A_0 \cos \beta \sin \alpha + \sin B_0 \sin \beta)$ \hfill (46)

Since v is a function of the directional components α, β of the receiving beam and the relative velocity $V_0$ and directional components $A_0$, $B_0$ of the target, equation (46) is rewritten as follows:

$v(\alpha, \beta, V_0, A_0, B_0) = V_0(\cos B_0 \cos A_0 \cos \beta \cos \alpha + \cos B_0 \sin A_0 \cos \beta \sin \alpha + \sin B_0 \sin \beta)$ \hfill (47)

In equation (57), beam direction parameters α, β are known quantities while target velocity parameters $V_0$, $A_0$, $B_0$ are unknowns.

Should there exist targets distributed in other than the direction of line OP, moving at the same velocity $V_0$, their velocities v could be derived in a similar manner from echo data picked up by a plurality of receiving beams directed in other than the direction of line OP. Then, a set of equations (47) having different values of parameters ($V_0$, α and β) would be produced. Values of $V_0$, $A_0$ and $B_0$ will be obtained by solving this set of equations. This is the basic principle implemented in a water current measuring apparatus operating with three or four beams. Adapting this principle, the invention employs the following technique: A number of velocities v (α, β, $V_0$, $A_0$, $B_0$) are obtained for different values of α and β. Regarding these velocities v as data derived from model equation (47), an estimation of model parameters is made using the least squares method to determine target velocities $V_0$, or $V_0$, $A_0$ and $B_0$.

Figure 36:
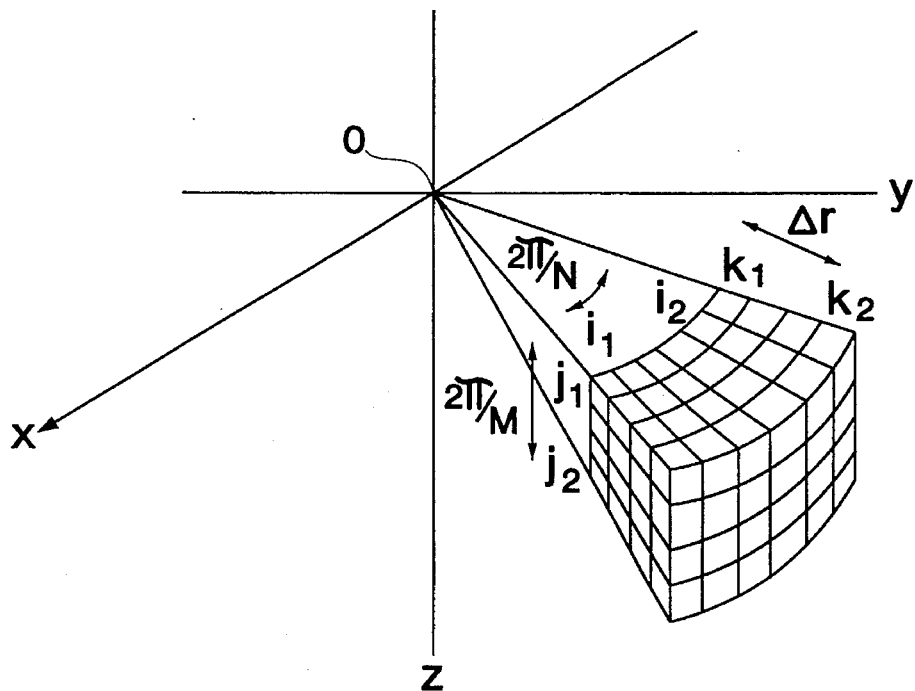
FIG. 36 is a diagram illustrating how velocity vectors are obtained for a desired three-dimensional area.

Referring now to FIG. 36, it is assumed that velocity information v and echo intensity information a on targets throughout a full circle around the observation point O have been obtained in 2 π/N steps of horizontal angle, 2 π/M steps of tilt angle, and Δr steps of radial range. The velocity data and echo intensity data are expressed as v(i, j, k) and am(i, j, k), respectively, where i, j and k designate polar coordinates α=(2 π/N)i, β=(2 π/M)j and k=Δr·k of each individual data point, respectively. Provided that observation is possible all around the observation point O, i, j and k are integers within the following ranges:

i=0 to (N–1)

j=−M/4 to M/4 k=1, 2, 3, . . .

Here, the probability that any targets having the same velocity will be found at a data point (i, j, k) is denoted by the expression w(i, j, k). A method of determining the probability w will be described later.

If targets located in an area containing small cubic segments shown in FIG. 36 (i=i1 to i2, j=j1 to j2, k=k1 to k2) are supposed to have the same velocity, w(i, j, k)=1 within that area while w(i, j, k)=0 outside the area. To fit measurement data v(i, j, k) to model equation (47), α and β of equation (47) are transformed into discrete values in steps of 2 π/M and 2 π/M, respectively. Thus, $$\begin{aligned} y(i, j) &= V_0(\cos B_0 \cdot \cos A_0 \cdot \cos(2\pi/N)i \cdot \cos(2\pi/M)j + \cos B_0 \cdot \cos A_0 \cdot \\ &\quad \sin(2\pi/N)i \cdot \cos(2\pi/M)j + \sin B_0 \cdot \sin(2\pi/M)j) \\ &= a \cdot \cos(2\pi/N)i \cdot \cos(2\pi/M)j + \\ &\quad b \cdot \sin(2\pi/N)i \cdot \cos(2\pi/M)j + \\ &\quad c \cdot \sin(2\pi/M)j \end{aligned} \quad (48)$$

where $$a = V_0 \cos B_0 \cdot \cos A_0, \ b = V_0 \cos B_0 \cdot \sin A_0, \ c = V_0 \sin B_0 \quad (49)$$

y(i, j) thus obtained is used as a fitting model. Here, the difference between measurement data and the fitting model is defined as follows:

$$Q = \sum_k \sum_i \sum_j (v(i, j, k) - y(i, j))^2 \cdot w(i, j, k) \quad (50)$$

Solving simultaneous equations $$\partial Q/\partial a = 0, \ \partial Q/\partial b = 0, \ \partial Q/\partial c = 0 \quad (51)$$

estimates a', b' and c' of a, b and c that minimize the value of Q are obtained. With the substitution of these estimates into equation (49), estimates $V_0'$, $A_0'$ and $B_0'$ of the supposedly same velocity will be obtained.

To determine the previously mentioned probability w, there are available various procedures, of which one example is described in the following.

(

1) In the case of a sonar, for instance, an area (i1-i2, j1-j2, k1-k2) is roughly specified by manual operation referring to a picture showing echo intensity information. Probability w(i, j, k)=1 is assigned to such data points that produce echo intensities am(i, j, k) exceeding a given threshold level within the specified area while probability w(i, j, k)=0 is assigned to all other data points. This method is suited to such cases where the moving velocity of a fish school or large-sized fish is to be determined.

(2) it is assumed that w(i, j, k)=am(i, j, k) within the above-mentioned area and w(i, j, k)=0 outside the area.

(3) The whole measurement area is predivided into several subareas and probabilities w(i, j, k) are assigned to individual subareas in accordance with the method of (1) or (2) above.

(4) If it is desired to determine the current (or flow velocity of sea water) within a specified area, a threshold is used in an opposite manner. That is, probability 1 is assigned to data points producing echo intensities below a certain level within the specified area while probability 0 is assigned to all other data points within the area as well as to the outside of that area.

If it is possible to consider that target velocity $V_0$ has no vertical component (that is, there is no vertical movement) as in the case of water currents or fish schools, the foregoing discussion can be simplified in the following manner.

Substituting $B_0=0$, equations (47) to (51) are rewritten as follows:

$$v(\alpha, \beta, V_0, A_0) = V_0(\cos A_0 \cos \beta \cos \alpha + \sin A_0 \cos \beta \sin \alpha) \quad (52)$$

$$y(i, j) = a \cdot \cos(2\pi/N)i \cdot \cos(2\pi/M)j + b \cdot \sin(2\pi/N)i \cdot \cos(2\pi/M)j \quad (53)$$

$$a = V_0 \cos A_0, \ b = V_0 \sin A_0 \quad (54)$$

$$Q = \sum_k \sum_i \sum_j (v(i, j, k) - y(i, j))^2 \cdot w(i, j, k) \quad (55)$$

$$\partial Q/\partial a = 0, \ \partial Q/\partial b = 0 \quad (56)$$

Now, it is possible to derive target velocity parameters ($V_0'$ and $A_0'$ in this case) from estimates a' and b'.

If the receiving beam tilt angle β is fixed ($\beta_0$), equations (52) to (56) become $$v(\alpha, \beta_0, v_0, A_0) = V_0 \cos \beta_0 (\cos A_0 \cos \alpha + \sin A_0 \sin \alpha) \quad (57)$$

$$y(i) = a \cdot \cos(2\pi/N)i + b \cdot \sin(2\pi/N)i \quad (58)$$

$$a = V_0 \cos \beta \cos A_0, \ b = V_0 \cos \beta \sin A_0 \quad (59)$$

$$Q = \sum_k \sum_i (v(i, k) - y(i))^2 \cdot w(i, k) \quad (60)$$

$$\partial Q/\partial a = 0, \ \partial Q/\partial b = 0 \quad (61)$$

Then, target velocity parameters $V_0'$ and $A_0'$ can be derived from estimates a', b' and $\beta_0$.

If it is desired to reduce computational complexity, velocity v(i, j, k) may be averaged in the k-direction with weight w(i, j, k); then, the velocity would be expressed as va(i, j). If the tilt angle is fixed to $\beta_0$, velocity va(i, k) may be averaged with weight w(i, k); then, the velocity would be given by va(i). With the substitution of these simplified expressions of target velocity, equations (55) and (60) become as follows, respectively, $$Q = \sum_i \sum_j (va(i, j) - y(i, j))^2 \cdot wa(i, j) \quad (62)$$

$$Q = \sum_i (va(i) - y(i))^2 \cdot wa(i) \quad (63)$$

where wa(i, j) and wa(i) are probabilities averaged in the k-direction, or they may take the value 1 or 0 depending on whether the sum of w(i, j, k) as added in the k-direction is larger than a given threshold.

Examples of velocity vector presentations obtained by the above-described procedure will be described in the following.

Figure 37:
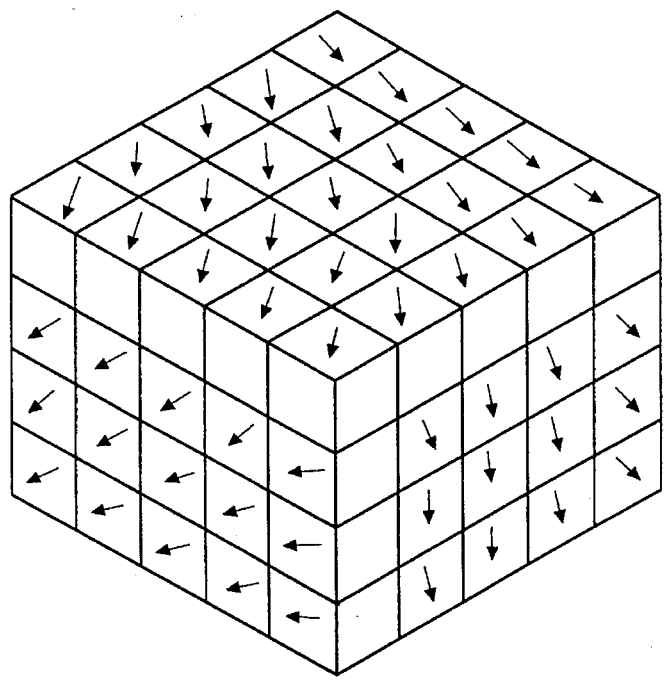
FIG. 37 is a three-dimensional velocity vector diagram.
Figure 38:
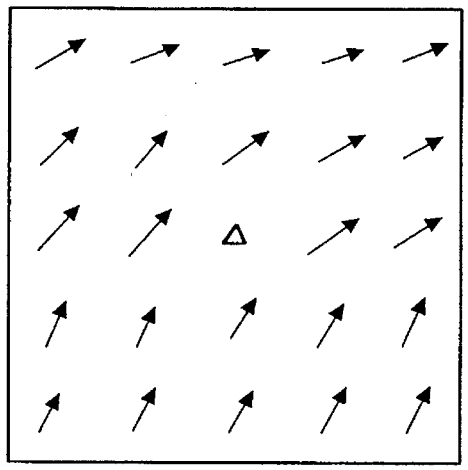
FIG. 38 is a two-dimensional velocity vector diagram.

FIG. 37 is a three-dimensional presentation of target velocities obtained with varying tilt angles β. FIG. 38 is a two-dimensional presentation of horizontal target velocity components taken from just a single layer (of a given depth) of FIG. 37. Although a vector diagram similar to FIG. 38 would be obtained when the tilt angle β is fixed, water depth will increase as the radius of picture coverage around own ship (denoted by a small triangle Δ) becomes larger in this case (refer to FIG. 19).

Figure 39:
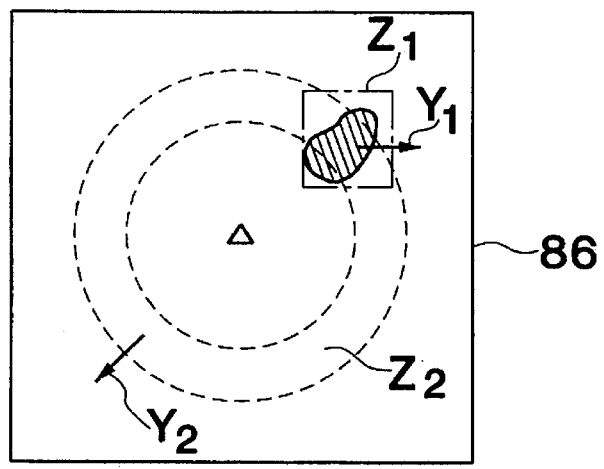
FIG. 39 is a diagram showing an example of velocity vector presentation on the display unit.

FIG. 39 is a diagram showing a velocity vector represented by an arrow Y1 as obtained by averaging velocities measured within a target T4 which is contained in an area (designated Z1) specified via the designating unit 84 referring to the picture presented on the display unit 86. In FIG. 39, there is shown a water current velocity vector Y2 for an area Z2 enclosed by concentric circles.

Advantages of the velocity vector presentation of the present invention are as follows. Should there exist a fish school directly below the bottom of own ship, its echo will act as unwanted noise in a conventional water current measuring apparatus. According to the invention, amplitude information is used to discriminate between reflections from the surrounding water mass and fish school so that it would be possible to present water current velocity data unaffected by fish echoes. Furthermore, it would be possible to measure water current velocities in a surface layer by setting a small transducer tilt angle.

EFFECTS OF THE INVENTION

As described above, this invention makes it possible to quickly measure carrier frequencies of ultrasonic echoes arriving from a wide searching area and provide target velocity information in relation to own ship through an analysis of the measured carrier frequencies. To add, a color presentation of the target velocity information provides a solution to such problems of conventional signal level pictures as the loss of relative signal level information due to saturation phenomenon, masking of weak echoes by strong echoes and inability to distinguish between signals having the same level.

In one aspect of the invention, information on variations in individual target velocities is provided in addition to the target velocity picture. This information is important for recognition of fish schools and determination of fish species and lengths.

In another aspect of the invention, target echo information can be compensated with own ship's over-the-ground or through-the-water velocity so that it becomes possible to obtain information on over-the-ground and through-the-water target velocities, enabling more positive recognition of fish schools.

In still another aspect of the invention, data sampling intervals can be shortened by choosing a sector scanning pattern instead of full-circle scanning of an ultrasonic receiving beam so that targets can be detected at a higher resolution.

In a further aspect of the invention, two different phase differences are derived from the angular deviation between two ultrasonic receiving beams and the carrier frequency is calculated from the two phase differences so that the carrier frequency can be determined with a high accuracy.

In a still further aspect of the invention, either two- or three-dimensional distribution of velocity distribution can be determined from velocity vectors individually calculated for arbitrarily selected fractional areas so that it is possible to know true movements of a fish school. Also, as a fish school in a slant direction of own ship can be detected, it is possible to know its velocity even when the ship is not located just above the fish school.

We claim:

1. An underwater detection system comprising:

a carrier frequency measuring circuit including ultrasonic receiving means for receiving ultrasonic signals arriving from a wide searching area while rotating a first ultrasonic receiving beam and a second ultrasonic receiving beam, wherein the second ultrasonic receiving beam is delayed by a fixed angular displacement θ relative to the first ultrasonic receiving beam and the first ultrasonic receiving beam precedes the second ultrasonic receiving beam by a time period τ due to the angular displacement θ; detector means for detecting individual signals picked up by the two ultrasonic receiving beams produced by said ultrasonic receiving means; delay means for delaying the signal picked up by the first ultrasonic receiving beam by the time period τ at an output stage of one of said ultrasonic receiving means and said detector means; phase difference calculating means for determining the phase difference $\Delta\psi$ between the two signals detected by said detector means; and calculating means for calculating carrier frequency f of the received ultrasonic signals from the phase difference determined by said phase difference calculating means in accordance with the equation $f=\Delta\psi/(2\pi\tau)$;

a frequency/color conversion circuit for reading out specific color data depending on individual values of measured carrier frequencies f; and a display unit for presenting the color data.

2. An underwater detection system comprising:

a carrier frequency measuring circuit including ultrasonic receiving means for receiving ultrasonic signals arriving from a wide searching area while rotating a first ultrasonic receiving beam and a second ultrasonic receiving beam, wherein the second ultrasonic receiving beam is delayed by a fixed angular displacement θ relative to the first ultrasonic receiving beam and the first ultrasonic receiving beam precedes the second ultrasonic receiving beam by a time period τ due to the angular displacement θ; detector means for detecting individual signals picked up by the two ultrasonic receiving beam produced by said ultrasonic receiving means; delay means for delaying the signal picked up by the first ultrasonic receiving beam by the time period τ at an output stage or one of said ultrasonic receiving means and said detector means; phase difference calculating means for determining the phase difference $\Delta\psi$ between the two signals detected by said detector means; and calculating means for calculating carrier frequency f of the received ultrasonic signals from the phase difference determined by said phase difference calculating means in accordance with the equation $f=\Delta\psi/2\pi\tau$;

a variance calculating circuit for deriving variance data indicating the degree of variations in carrier frequency f fed from said carrier frequency measuring circuit;

a variance/color conversion circuit for reading out specific color data depending on individual values of variance data; and a display unit for presenting the color data.

3. An underwater detection system according to claim 1 further comprising: a variance calculating circuit for deriving variance data indicating the degree of variations in carrier frequency f fed from said carrier frequency measuring circuit; and a frequency-variance/color conversion circuit for reading out specific color data depending on individual values of measured carrier frequencies f and variance data.

4. An underwater detection system comprising:

a carrier frequency measuring circuit including ultrasonic receiving means for receiving ultrasonic signals arriving from a wide searching area while rotating a first ultrasonic receiving beam accompanied by a second ultrasonic receiving beam, wherein the second ultrasonic receiving beam is delayed by a fixed angular displacement θ relative to the first ultrasonic receiving beam and the first ultrasonic receiving beam precedes the second ultrasonic receiving beam by a time period τ due to the angular displacement θ; detector means for detecting individual signals picked up by the two ultrasonic receiving beam produced by said ultrasonic receiving means; delay means for delaying the signal picked up by the first ultrasonic receiving beam by the time period τ at an output stage of one of said ultrasonic receiving means and said detector means; phase difference calculating means for determining the phase difference Δψ between the two signals detected by said detector means; and calculating means for calculating carrier frequency f of the received ultrasonic signals from the phase difference determined by said phase difference calculating means in accordance with the equation $f=\Delta\psi/(2\pi\tau)$;

a filter-amplitude/color conversion circuit for selecting from amplitude data derived from the signals detected by said detector means only such amplitude data that lie within a desired frequency range and then reading out specific color data depending on individual values of the selected amplitude data; and a display unit for presenting the color data.

5. An underwater detection system according to claim 1 wherein the conversion circuit utilizes amplitude information included in input data as a reference, whereby only such input data that exceed a specified amplitude level are converted into color data.

6. An underwater detection system according to claim 1 further comprising:

storage means for storing individual carrier frequencies f fed from said carrier frequency measuring circuit;

a designating unit for specifying a desired area on said display unit;

data readout means for reading out data on carrier frequencies f from such memory locations of said storage means that correspond to the area specified by said designating unit;

a frequency histogram generator for generating a histogram upon determining the distribution of carrier frequencies f based on the data read out by said data readout means; and display means for presenting the histogram.

7. An underwater detection system according to claim 1 wherein said display unit can simultaneously present at least two different pictures on a single screen.

8. An underwater detection system comprising:

a carrier frequency measuring circuit including ultrasonic receiving means for receiving ultrasonic signals arriving from a wide searching area while rotating a first ultrasonic receiving beam and a second ultrasonic receiving beam, wherein the second ultrasonic receiving beam is delayed by a fixed angular displacement θ relative to the first ultrasonic receiving beam and the first ultrasonic receiving beam precedes the second ultrasonic receiving beam by a time period τ due to the angular displacement θ; detector means for detecting individual signals picked up by the two ultrasonic receiving beam produced by said ultrasonic receiving means; delay means for delaying the signal picked up by the first ultrasonic receiving beam by the time period τ at an output stage or said ultrasonic receiving means or said detector means; phase difference calculating means for determining the phase difference Δψ between the two signals detected by said detector means; and calculating means for calculating carrier frequency f of the received ultrasonic signals from the phase difference determined by said phase difference calculating means in accordance with the equation $f=\Delta\psi/2\pi\tau$; and an over-the-ground ship velocity compensation circuit for calculating carrier frequency fe representative of the over-the-ground velocity of a target itself by subtracting frequency f1 attributed to the over-the-ground ship velocity from each carrier frequency f fed from said carrier frequency measuring circuit.

9. An underwater detection system comprising:

a carrier frequency measuring circuit including ultrasonic receiving means for receiving ultrasonic signals arriving from a wide searching area while rotating a first ultrasonic receiving beam and a second ultrasonic receiving beam, wherein the second ultrasonic receiving beam is delayed by a fixed angular displacement θ relative to the first ultrasonic receiving beam and the first ultrasonic receiving beam precedes the second ultrasonic receiving beam by a time period τ due to the angular displacement θ; detector means for detecting individual signals picked up by the two ultrasonic receiving beam produced by said ultrasonic receiving means; delay means for delaying the signal picked up by the first ultrasonic receiving beam by the time period τ at an output stage or said ultrasonic receiving means or said detector means; phase difference calculating means for determining the phase difference Δψ between the two signals detected by said detector means; and calculating means for calculating carrier frequency f of the received ultrasonic signals from the phase difference determined by said phase difference calculating means in accordance with the equation $f=\Delta\psi/2\pi\tau$; and a through-the-water ship velocity compensation circuit for calculating carrier frequency few representative of the through-the-water velocity of a target itself by subtracting frequency f2 attributed to the through-the-water ship velocity from each carrier frequency f fed from said carrier frequency measuring circuit.

10. An underwater detection system according to claim 8 wherein the frequency f1 attributed to the over-the-ground ship velocity is obtained by breaking down a Doppler frequency corresponding to the over-the-ground ship velocity acquired from such external equipment as a navigational aid into each individual azimuthal component.

11. An underwater detection system according to claim 8 wherein the frequency f2 attributed to the through-the-water ship velocity is obtained by breaking down a Doppler frequency corresponding to the through-the-water velocity acquired from such external equipment as a water current measuring apparatus into each individual azimuthal component.

12. An underwater detection system according to claim 8 wherein the frequency f1 attributed to the over-the-ground ship velocity is determined for each horizontal direction by storing individual carrier frequencies f fed from said carrier frequency measuring circuit into a frame memory, specifying a desired readout area of said frame memory, and sequentially reading out carrier frequencies f from the specified readout area in a predefined order of memory addresses.

13. An underwater detection system according to claim 8 wherein the frequency f1 attributed to the over-the-ground ship velocity is determined for each horizontal direction by storing individual carrier frequencies f fed from said carrier frequency measuring circuit into a frame memory, specifying a desired readout area of said frame memory, sequentially reading out carrier frequencies f from the specified readout area in a predefined order of memory addresses, estimating a cosine curve from the read data, and reading out again carrier frequencies f for individual horizontal directions with reference to the estimated cosine curve.

14. An underwater detection system according to claim 12 wherein each carrier frequency f stored in said frame memory is compensated with the frequency f1 attributed to the over-the-ground ship velocity.

15. An underwater detection system according to claim 12 wherein each carrier frequency f fed from said carrier frequency measuring circuit is compensated with the frequency f1 attributed to the over-the-ground ship velocity.

16. An underwater detection system according to claim 9 wherein the frequency f2 attributed to the through-the-water ship velocity is determined for each horizontal direction by storing individual carrier frequencies f fed from said carrier frequency measuring circuit into a frame memory, specifying a desired readout area of said frame memory, and sequentially reading out carrier frequencies f from the specified readout area in a predefined order of memory addresses.

17. An underwater detection system according to claim 9 wherein the frequency f2 attributed to the through-the-water ship velocity is determined for each horizontal direction by storing individual carrier frequencies f fed from said carrier frequency measuring circuit into a frame memory, specifying a desired readout area of said frame memory, sequentially reading out carrier frequencies f from the specified readout area in a predefined order of memory addresses, estimating a cosine curve from the read data, and reading out again carrier frequencies f for individual horizontal directions with reference to the estimated cosine curve.

18. An underwater detection system according to claim 16 wherein each frequency f stored in said frame memory is compensated with the frequency f2 attributed to the through-the-water ship velocity.

19. An underwater detection system according to claim 16 wherein each carrier frequency f fed from said carrier frequency measuring circuit is compensated with the frequency f2 attributed to the through-the-water ship velocity.

20. An underwater detection system according to claim 8 further comprising:

a frequency/color conversion circuit for reading out specific color data depending on the value of each carrier frequency fe representative of the over-the-ground velocity of the target itself or each carrier frequency fw representative of the through-the-water velocity of the target itself; and a display unit for presenting the color data.

21. An underwater detection system according to claim 8 further comprising:

a frequency/color conversion circuit for reading out specific color data depending on the value of each compensated carrier frequency fe representative of the over-the-ground velocity of the target or each compensated carrier frequency fw representative of the through-the-water velocity of the target and also depending on whether such carrier frequency fe or fw, whichever applicable, is higher or lower than the transmitted frequency; and a display unit for presenting the color data.

22. An underwater detection system according to claim 21 wherein the color data for a plurality of colors are classified into cool and warm color groups, for example, depending on whether each carrier frequency fe or fw, whichever applicable, is higher or lower than the transmitted frequency, and wherein specific colors are assigned in accordance with individual values of carrier frequencies fe or fw in both the cool and warm color groups.

23. An underwater detection system according to claim 8 further comprising variance calculating means for deriving variance data indicating the degree of variations in compensated carrier frequency fe representative of the over-the-ground velocity of each target or compensated carrier frequency fw representative of the through-the-water velocity of each target.

24. An underwater detection system according to claim 23 further comprising:

a variance/color conversion circuit for reading out specific color data depending on individual values of variance data; and a display unit for presenting the color data.

25. An underwater detection system according to claim 23 further comprising a frequency-variance/color conversion circuit for reading out specific color data depending on individual values of compensated carrier frequencies fe or fw and variance data.

26. An underwater detection system according to claim 8 further comprising:

a filter-amplitude/color conversion circuit for selecting from amplitude data derived from the signals detected by said detector means only such amplitude data that lie within a desired frequency range and then reading out specific color data depending on individual values of the selected amplitude data; and a display unit for presenting the color data.

27. An underwater detection system according to claim 20 wherein the conversion circuit thereof utilizes amplitude information included in input data as a reference, whereby only such input data that exceed a specified amplitude level are converted into color data.

28. An underwater detection system according to claim 20 further comprising:

storage means for storing compensated carrier frequencies fe representative of over-the-ground target velocities or compensated carrier frequencies fw representative of through-the-water target;

a designating unit for specifying a desired area on said display unit;

data readout means for reading out carrier frequency data from such memory locations of said storage means that correspond to the area specified by said designating unit;

a frequency histogram generator for generating a histogram upon determining the distribution of carrier frequencies based on the data read out by said data readout means; and display means for presenting the histogram.

29. An underwater detection system according to claim 20 characterized in that said display unit can simultaneously present at least two different pictures on a single screen.

30. An underwater detection system according to claim 1 wherein the color conversion circuit thereof is configured with a read-only memory (ROM) storing color data corresponding to individual values of input data.

31. An underwater detection system comprising:

a carrier frequency measuring circuit including ultrasonic receiving means for receiving ultrasonic signals arriving from a wide searching area while rotating a first ultrasonic receiving beam accompanied by a second ultrasonic receiving beam, wherein the second ultrasonic receiving beam is delayed by a fixed angular displacement θ relative to the first ultrasonic receiving beam and the first ultrasonic receiving beam precedes the second ultrasonic receiving beam by a time period τ due to the angular displacement θ; detector means for detecting individual signals picked up by the two ultrasonic receiving beams produced by said ultrasonic receiving means; delay means for delaying the signal picked up by the first ultrasonic receiving beam by the time period τ at an output stage of said ultrasonic receiving means or said detector means; phase difference calculating means for determining the phase difference $\Delta\psi$ between the two signals detected by said detector means; and calculating means for determining the phase difference between the two signals detected by said detector means; and calculating means for calculating carrier frequency f of the received ultrasonic signals from the phase difference determined by said phase difference calculating means in accordance with the equation $f=\Delta\psi/(2\pi\tau)$; measuring means for measuring a Doppler frequency shift contained in the carrier frequency determined by said carrier frequency measuring circuit; and a velocity vector generating circuit for providing a velocity vector wherein, when a target at point P(x, y, z) in a rectangular coordinate system of which origin O is taken at the point of observation is moving at a velocity $V_0(X_0, Y_0, Z_0)$ relative to the origin O, said velocity vector generating circuit determines the velocity component V of said target at distance r in the direction of line OP based on the Doppler frequency shift determined by said measuring means, converts coordinates (x, y, z) of the point P and components $(X_0, Y_0, Z_0)$ of the velocity $V_0$ into polar coordinate parameters (r, α, β) and $(V_0, A_0, B_0)$, respectively, produces an equation $v=f(r, α, β, V_0, A_0, B_0)$, further produces similar equations for other targets moving at the same velocity $V_0$ with said target, and estimates target velocity parameters $V_0$, $A_0$ and $B_0$ at the point P from these equations using the least squares method.

32. An underwater detection system according to claim 31 wherein the moving direction of a water current or fish school in each arbitrarily selected fractional area is displayed by way of a graphic symbol like an arrow mark based on the velocity vector.

33. An underwater detection system comprising:
transmitting means for transmitting an ultrasonic signal into a wide area;
receiving means for receiving ultrasonic echo signals arriving from all directions on the wide area;
measuring means for measuring Doppler frequency shifts contained in the ultrasonic echo signals; and
a velocity vector generating circuit for providing a velocity vector wherein, when a target at point P(x, y, z) in a rectangular coordinate system of which origin O is taken at the point of observation is moving at a velocity $V_0(X_0, Y_0, Z_0)$ relative to the origin O, said velocity vector generating circuit;
determines the velocity component v of said target at distance r in the direction of line OP connecting the origin 0 and the P point based on the Doppler frequency shift determined by said measuring means,
produces an equation $v=f(OP, V_0)$,
produces similar equations for other targets moving at the same velocity $V_0$ with said target, and
estimates the target velocity $V_0$ at the point P from these equations using the lease squares method.

34. An underwater detection system according to claim 33 wherein the point P and velocity $V_0$ are expressed in polar coordinates.

35. An underwater detection system according to claim 33 wherein the point P and velocity $V_0$ are expressed in rectangular coordinates.

36. An underwater detection system according to claim 33 wherein the moving direction and velocity level of a water current or fish school in each arbitrarily selected fractional area are displayed based on the velocity vector.

37. An underwater detection system according claim 1 wherein said ultrasonic receiving means is configured with a pair of ultrasonic transducer elements which are rotated mechanically.

38. An underwater detection system according to claim 1 wherein said ultrasonic receiving means includes a plurality of ultrasonic transducer elements arranged in a circular array, selects a predefined number of adjacent transducer elements while shifting the selection in sequential steps by electrical switching, produces the first ultrasonic receiving beam by synthesizing the phases of signals received by each selection of transducer elements, and further produces the second ultrasonic receiving beam separated by the angular displacement θ from the first ultrasonic receiving beam in a similar manner.

39. An underwater detection system according to claim 1 wherein said ultrasonic receiving means includes a plurality of ultrasonic transducer elements arranged in a linear array, selects a predefined number of adjacent transducer elements while shifting the selection in sequential steps by electrical switching, produces the first ultrasonic receiving beam by synthesizing the phases of signals received by each selection of transducer elements, and further produces the second ultrasonic receiving beam separated by the angular displacement θ from the first ultrasonic receiving beam in a similar manner.

40. An underwater detection system according to claim 1 wherein said carrier frequency measuring circuit includes scanning means for steering the first and second ultrasonic receiving beams switchably from full-circle scanning to sector scanning operation and this switching function provides a higher sampling rate and consequent resolution enhancement.

41. An underwater detection system according to claim 1 wherein said carrier frequency measuring circuit further comprises:
second delay means which regards the first and second ultrasonic receiving beams as having a mutual angular displacement of 2π−θ and introduces a time delay τ2 corresponding to the angular displacement 2π−θ into the signal received by one ultrasonic receiving beam which precedes the other ultrasonic receiving beam by τ2;
second phase difference calculating means for determining the phase difference $\Delta\psi'$ between the signal output from said second delay means and the signal received by the other ultrasonic receiving beam; and
frequency calculating means for calculating carrier frequency $f2=\Delta\psi'/(2\pi\tau2)$ from the phase difference $\Delta\psi'$ and outputting a true carrier frequency at which the carrier frequency f and the carrier frequency f2 coincide with each other.

42. An underwater detection system according to claim 1 wherein said carrier frequency measuring circuit further comprises:
second delay means which regards the first and second ultrasonic receiving beams as having a mutual angular displacement of 2π+θ and introduces a time delay τ3 corresponding to the angular displacement 2+θ into the signal received by one ultrasonic receiving beam which precedes the other ultrasonic receiving beam by τ3;

second phase difference calculating means for determining the phase difference Δψ' between the signal outputted from said second delay means and the signal received by the other ultrasonic receiving beam; and frequency calculating means for calculating carrier frequency f2=Δψ'/(2πτ3) from the phase difference Δψ' and outputting a true carrier frequency at which the carrier frequency f and the carrier frequency f2 coincide with each other.

43. An underwater detection system according to claim 1 wherein said carrier frequency measuring circuit further comprises:

second delay means which regards the first or second ultrasonic receiving beam in two successive scanning cycles as two ultrasonic receiving beams having a mutual angular displacement of 2π for introducing a time delay τ4 corresponding to the angular displacement 2π into the signal received by the ultrasonic receiving beam which precedes the other ultrasonic receiving beam by τ4;

second phase difference calculating means for determining the phase difference Δψ' between the signal output from said second delay means and the signal received by the other ultrasonic receiving beam; and frequency calculating means for calculating carrier frequency f2=Δψ'/(2πτ4) from the phase difference Δψ' and outputting a true carrier frequency at which the carrier frequency f and the carrier frequency f2 coincide with each other.

44. An underwater detection system comprising:

transmitting means for transmitting an ultrasonic signal into a wide area;

receiving means for receiving ultrasonic echo signals arriving from all directions of the wide area;

frequency measuring means for determining carrier frequencies of the received ultrasonic echo signals;

frequency conversion means for converting the carrier frequencies into Doppler frequency shifts;

variance calculating means for deriving variance data indicating the degree of variations in Doppler frequency shifts fed from said frequency conversion means;

variance/color conversion means for generating specific color data depending on individual values of variance data; and a display unit for presenting the color data.

45. An underwater detection system comprising:

transmitting means for transmitting an ultrasonic signal into a wide area;

receiving means for receiving ultrasonic echo signals arriving from all directions of the wide area;

frequency measuring means for determining carrier frequencies of the received ultrasonic echo signals;

variance calculating means for deriving variance data indicating the degree of variations in carrier frequencies fed from said frequency measuring means;

variance/color conversion means for generating specific color data depending on individual values of variance data; and a display unit for presenting the color data.

46. An underwater detection system comprising:

transmitting means for transmitting an ultrasonic signal into a wide area;

receiving means for receiving ultrasonic echo signals arriving from all directions of the wide area while rotating a first ultrasonic receiving beam and a second ultrasonic receiving beam;

frequency measuring means for determining carrier frequencies of the received ultrasonic echo signals frequency conversion means for converting the carrier frequencies into Doppler frequency shifts;

detector means for detecting the received ultrasonic echo signals;

selection means for selecting from amplitude data derived from the detected signals fed from said detector means only such amplitude data that are associated with Doppler frequency shifts falling within a desired frequency range;

amplitude/color conversion means for generating specific color-coded signals depending on individual values of the amplitude data selected by said selection means; and a display unit for presenting the color-coded signals.

47. An underwater detection system comprising:

transmitting means for transmitting an ultrasonic signal into a wide area;

receiving means for receiving ultrasonic echo signals arriving from all directions of the wide area;

frequency measuring means for determining carrier frequencies of the received ultrasonic echo signals;

detector means for detecting the received ultrasonic echo signals;

selection means for selecting from amplitude data derived from the detected signals fed from said detector means only such amplitude data that are associated with carrier frequencies falling within a desired frequency range;

amplitude/color conversion means for generating specific color-coded signals depending on individual values of the amplitude data selected by said selection means; and a display unit for presenting the color-coded signals.

48. An underwater detection system comprising:

transmitting means for transmitting an ultrasonic signal into a wide area;

receiving means for receiving ultrasonic echo signals arriving from all directions of the wide area;

carrier frequency measuring means for determining carrier frequencies f of the received ultrasonic echo signals;

storage means for storing individual carrier frequencies f fed from said carrier frequency measuring means;

a display unit; designating means for specifying a desired area on said display unit;

data readout means for reading out data on carrier frequencies f from such memory locations of said storage means that correspond to the area specified by said designating means;

a frequency histogram generator for generating a histogram upon determining the distribution of carrier frequencies f based on the data read out by said data readout means; and display means for presenting the histogram on said display unit.

49. An underwater detection system comprising:

transmitting means for transmitting an ultrasonic signal into a wide area;

receiving means for receiving ultrasonic echo signals arriving from all directions of the wide area;

carrier frequency measuring means for determining carrier frequencies f of the received ultrasonic echo signals;

over-the-ground ship velocity compensation means for calculating carrier frequency fe representative of the over-the-ground velocity of a target itself by subtracting frequency f1 attributed to the over-the-ground ship velocity from each carrier frequency f fed from said carrier frequency measuring means.

50. An underwater detection system comprising:

transmitting means for transmitting an ultrasonic signal into a wide area;

receiving means for receiving ultrasonic echo signals arriving from all directions of the wide area;

carrier frequency measuring means for determining carrier frequencies f of the received ultrasonic echo signals;

through-the-water ship velocity compensation means for calculating carrier frequency fw representative of the through-the-water velocity of a target itself by subtracting frequency f2 attributed to the through-the-water ship velocity from each carrier frequency f fed from said carrier frequency measuring means.

51. An underwater detection system according to claim 43 wherein the frequency f1 attributed to the over-the-ground ship velocity is obtained by breaking down a Doppler frequency corresponding to the over-the-ground ship velocity acquired from an external navigational aid into each individual azimuthal component.

* * * * *